US010069546B2

(12) United States Patent
Fattouche et al.

(10) Patent No.: US 10,069,546 B2
(45) Date of Patent: Sep. 4, 2018

(54) ENHANCED PRE-ORDERED PRE-WEIGHTED TRANSMISSION

(71) Applicant: Taiwan Semiconductor Manufacturing Co., Ltd., Hsinchu (TW)

(72) Inventors: Michel Fattouche, Calgary (CA); David Gell, San Diego, CA (US); Murat Karsi, San Diego, CA (US); Kenneth L. Stanwood, Vista, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 225 days.

(21) Appl. No.: 14/622,687

(22) Filed: Feb. 13, 2015

(65) Prior Publication Data

US 2016/0241316 A1 Aug. 18, 2016

(51) Int. Cl.
  *H04B 7/0456* (2017.01)
  *H04B 7/0452* (2017.01)
(52) U.S. Cl.
  CPC ........ *H04B 7/0456* (2013.01); *H04B 7/0452* (2013.01)
(58) Field of Classification Search
  None
  See application file for complete search history.

(56) References Cited

U.S. PATENT DOCUMENTS 4,615,011 A * 9/1986 Linsker ............... G06F 17/5077
  700/36
5,353,229 A * 10/1994 Tanaka .................. G06Q 10/06
  700/103

(Continued)

FOREIGN PATENT DOCUMENTS

EP       2750475 A1    7/2014
WO   2011/088465 A1    7/2011
(Continued)

OTHER PUBLICATIONS

S. H. Lu, Y. M. Chen and L. C. Wang, "Optimal Beamforming and Scheduling for MIMO-OFDM Uplink Transmissions in Hierarchical Cognitive Radio Systems," Vehicular Technology Conference (VTC Fall), 2013 IEEE 78th, Las Vegas, NV, 2013, pp. 1-5.*

(Continued)

*Primary Examiner* — Ayaz R Sheikh
*Assistant Examiner* — Tarell A Hampton
(74) *Attorney, Agent, or Firm* — JCIPRNET

(57) ABSTRACT

Systems and methods for uplink (UL) and downlink (DL) communications can improve channel capacity between one or more access nodes and one or more terminal nodes. The communications may utilize, for example, multi-user multiple-input multiple-output techniques with cooperation between access nodes. A network node may determine an ordering combination and associated pre-weighting values, provide the pre-weighting values to one or more terminal nodes, receive signals transmitted from the terminal nodes using the pre-weighting values; and process the received signals using the ordering combination and the pre-weighting values. Two constraints can be jointly used: a minimum performance constraint and a maximum transmit power constraint. Example systems search all possible ordering combinations to find a best combination, for example, the ordering combination that maximizes communication rates. The ordering combination may be used with combinations of full or partial successive interference cancellation in receivers and full or partial iterative pre-cancellation pre-coding in transmitters.

22 Claims, 18 Drawing Sheets

(56) References Cited

U.S. PATENT DOCUMENTS

| | | | | |
|---|---|---|---|---|
| 5,410,496 | A * | 4/1995 | Bolon | G02B 7/00 |
| | | | | 700/182 |
| 6,108,658 | A * | 8/2000 | Lindsay | G06F 7/22 |
| 6,587,451 | B1 * | 7/2003 | Kwon | H04B 7/0857 |
| | | | | 370/339 |
| 8,204,442 | B2 | 6/2012 | Sankar et al. | |
| 8,411,806 | B1 * | 4/2013 | Lee | H04L 25/03305 |
| | | | | 375/340 |
| 9,001,802 | B2 * | 4/2015 | Noh | H04B 7/0617 |
| | | | | 370/328 |
| 9,137,688 | B2 | 9/2015 | Karsi | |
| 2003/0189999 | A1 * | 10/2003 | Kadous | H04L 1/0618 |
| | | | | 375/349 |
| 2006/0023624 | A1 * | 2/2006 | Han | H04L 1/0003 |
| | | | | 370/204 |
| 2007/0129992 | A1 * | 6/2007 | Kasper | G06Q 10/06 |
| | | | | 705/7.31 |
| 2008/0051087 | A1 | 2/2008 | Ryu et al. | |
| 2008/0089297 | A1 * | 4/2008 | Seo | H04B 7/0634 |
| | | | | 370/336 |
| 2008/0117833 | A1 | 5/2008 | Borran et al. | |
| 2008/0153428 | A1 * | 6/2008 | Han | H04B 7/0417 |
| | | | | 455/69 |
| 2010/0087221 | A1 | 4/2010 | Srinivasan et al. | |
| 2011/0065447 | A1 | 3/2011 | Hahm et al. | |
| 2011/0124289 | A1 | 5/2011 | Balachandran | |
| 2011/0150114 | A1 * | 6/2011 | Miao | H04B 7/0417 |
| | | | | 375/260 |
| 2011/0201341 | A1 | 8/2011 | Choudhury et al. | |
| 2011/0286341 | A1 * | 11/2011 | Sanayei | H04B 7/024 |
| | | | | 370/252 |
| 2012/0023149 | A1 * | 1/2012 | Kinsman | G06F 7/38 |
| | | | | 708/204 |
| 2014/0180957 | A1 * | 6/2014 | Arunapuram | G06Q 10/08355 |
| | | | | 705/338 |
| 2014/0274096 | A1 | 9/2014 | Stanwood et al. | |
| 2014/0286269 | A1 | 9/2014 | Stanwood et al. | |
| 2014/0286270 | A1 | 9/2014 | Karsi | |
| 2015/0081048 | A1 * | 3/2015 | Tokito | G05B 19/0426 |
| | | | | 700/52 |
| 2015/0280888 | A1 | 10/2015 | Karsi et al. | |
| 2016/0087694 | A1 * | 3/2016 | Vilaipornsawai | H04B 7/024 |
| | | | | 370/329 |

FOREIGN PATENT DOCUMENTS

| | | |
|---|---|---|
| WO | 2011/159042 A2 | 12/2011 |
| WO | 2012/139624 A1 | 10/2012 |
| WO | 2013/029413 A1 | 3/2013 |
| WO | 2013/069627 A1 | 5/2013 |

OTHER PUBLICATIONS

Baker. "From Macro to Small Cells: Enhancements for Small Cells in 3GPP." Alcatel-Lucent. Small Cells Summit 2013, London, UK, 12 pages.

Boudreau et al. "Interference Coordination and Cancellation for 4G Networks." LTE Part II: 3GPP Release 8. IEEE communications Magazine, Apr. 2009 (pp. 74-81).

Brück. "3G/4G Mobile Communications Systems." Qualcomm Corporate R&D Center Germany. Mar. 5, 2012, 19 pages.

Du et al. "Channel Estimation for D-Blast OFDM Systems." School of Electrical and Computer Engineering, Georgia Institute of Technology, Atlanta, GA. Nov. 2002, 5 pages.

Exploring the World of Wireless LTE-Advanced and Coordinated Multi-Point (COMP): What Goes Around, Comes Around. Special Preview Edition. Signals Ahead. 8(5): Apr. 16, 2012.

Hou et al. "Unified View of Channel Estimation in MIMO-OFDM Systems." IEEE 2005, pp. 34-38.

International Search Report and Written Opinion for PCT/US2014/041411, dated Sep. 23, 2014, in 10 pages.

International Search Report and Written opinion for related PCT/US2014/024150, dated Jun. 12, 2014, in 17 pages.

Jia-Ming et al. "A New Channel Estimation Model in OFDM System Based on Improved Pilot Training Sequence." 2004 4th International Conference on Microwave and Millimeter Wave Technology Proceedings. pp. 846-849.

Kottkamp et al. "LTE-Advanced Technology Introduction White Paper." Rohde & Schwarz. Aug. 2012, 41 pages.

Lee et al. "Coordinated Multipoint Transmission and Reception in LTE-Advanced Systems." IEEE Communications Magazine, Nov. 2012 (pp. 44-50).

Lee et al. "Coordinated Multipoint Transmission and Reception in LTE-Advanced: Deployment Scenarios and Operational Challenges." IEEE Communications Magazine, Feb. 2012 (pp. 148-155).

Léost et al. "Interference Rejection Combining in LTE Networks." Bell Labs Technical Journal. 17(1):25-50 (2012).

Li et al. "Channel Estimation for OFDM Systems with Transmitter Diversity in Mobile Wireless Channels." IEEE Journal on Selected Areas in Communications. 17(3):461-471 (Mar. 1999).

Li et al. "Simplified Channel Estimation for OFDM Systems With Multiple Transmit Antennas." IEEE Transactions on Nireless Communications. 1(1):67-75 (Jan. 2002).

Määttänen et al. "System-level performance of LTE-Advanced with joint transmission and dynamic point selection schemes." EURASIP Journal on Advances in Signal Processing 2012, 2012:247 (37 pages).

Nokia. "DL CoMP phase2 simulation results." 3GPP TSG-RAN WG1 Meeting #66, R1-112384. Athens, Greece, Aug. 22-26, 2011. 5 pages.

Nokia. "On cell-edge enhancements via inter-cell orthogonal DM RS." 3GPP TSG-RAN WG1 Meeting #66, R1-112394, Athens, Greece, Aug. 22-26, 2011. 3 pages.

Ozdemir et al. "Channel Estimation for Wireless OFDM Systems." IEEE Communications Surveys & Tutorials. 9(2):18-48 (2nd Quarter 2007).

Panasonic. "Uplink enhancement for Rel.11." 3GPP TSG-RAN WG1 Meeting #66, R1-112367. Athens, Greece, Aug. 22-26, 2011. 4 pages.

Pauli et al. "Heterogeneous LTE Networks and Inter-Cell Interference Coordination." Novel Mobile Radio Research. Dec. 2010, 9 pages.

Pauli et al. "Inter-Cell Interference Coordination for LTE-A." Novel Mobile Radio Research. Sep. 2011, 7 pages Rayal. "An overview of the LTE physical layer." EE Times. May 24, 2010.

Roessler et al. "LTE- Advanced (3GPP Rel.11) Technology Introduction White Paper." Rohde & Schwarz. Jul. 2013, 39 pages.

Samsung. "UL DMRS Enhancements in Rel.11." 3GPP TSG RAN WG1 #66, R1-112520, Athens, Greece, Aug. 22-26, 2011. 3 pages.

Sawashashi et al. "Coordinated Multipoint Transmission/Reception Techniques for LTE-Advanced." IEEE Wireless communications, Jun. 2010 (pp. 26-34).

Taoka et al. "MIMO and CoMP in LTE-Advanced." NTT DOCOMO Technical Journal. 12(2)20-28, Sep. 2010.

Wild et al. "Joint Channel Estimation across Multiple Cells in Coordinated Multi-Point." IEEE 2012, pp. 845-849.

\* cited by examiner

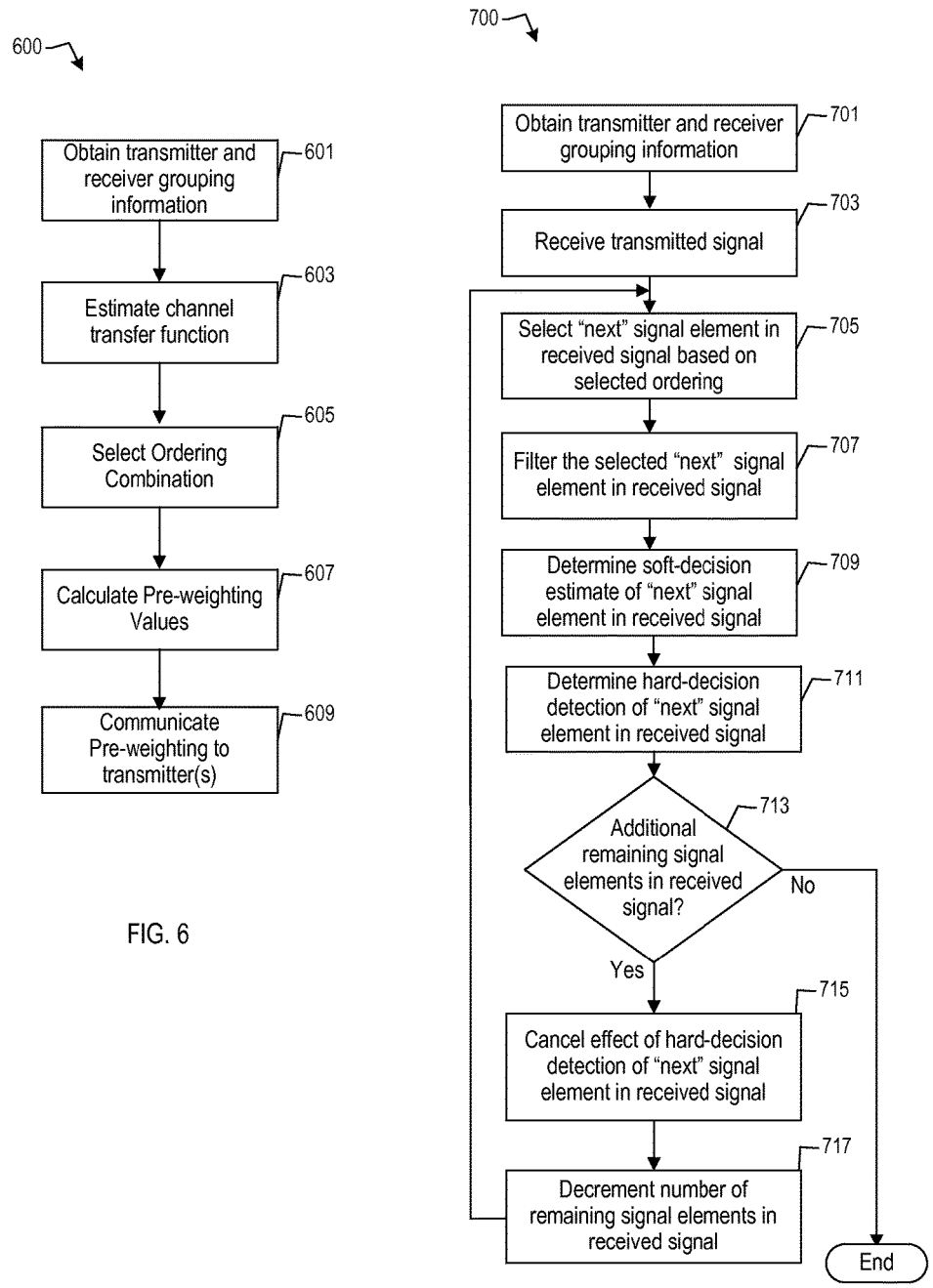

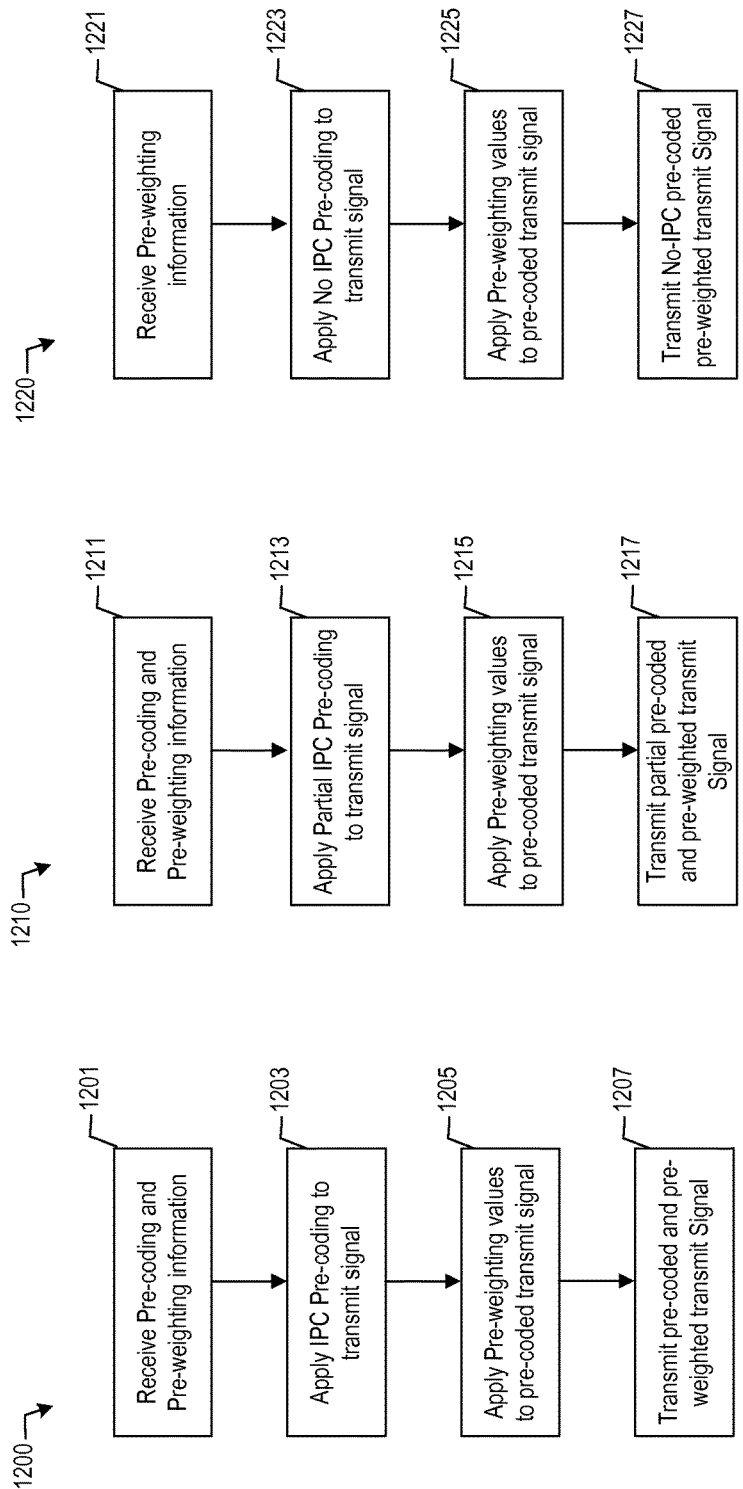

ENHANCED PRE-ORDERED PRE-WEIGHTED TRANSMISSION

FIELD OF THE INVENTION

The present invention relates generally to the field of communications where it is desirable to communicate between a number of wireless devices at the highest possible communication rate using multiple transmit antennas and multiple receive antennas, while reducing the complexity and power consumption of each device.

BACKGROUND

In a wireless communications network, devices intend to communicate with other devices via a communications channel, at the highest possible rate, with the least possible transmitted power and at the lowest possible cost. The cost of a device is usually dictated by its complexity, while the communication rate between any two devices is limited by Shannon Channel capacity as defined by the communication medium between the two devices and by the corresponding transmitted power. Shannon Channel capacity is a theoretical limit on the communication rate, and does not offer an indication on the complexity of the device.

One way to increase Shannon Channel capacity between two devices is to adopt multiple antennas for each device. In the presently disclosed systems, antennas, which belong to one device, are allowed to cooperate. Another way to increase Shannon Channel capacity is to allow a group of devices to transmit simultaneously, to another group of devices. In the presently disclosed systems and methods, when a group of devices, such as a transmitting group or a receiving group, is able to cooperate, we refer to it as a cooperative group, otherwise, it is a non-cooperative group. For example, in a cellular network, a group of access nodes (e.g., LTE Base Stations) is often a cooperative group, however, a group of users (subscriber stations, handsets, nodes) is seldom a cooperative group.

In this description, we refer to the communication channel from a group of access nodes to a group of users as a Downlink (DL) Multi-User (MU) channel, while the communication channel from a group of users to a group of access nodes is referred to as an Uplink (UL) Multi-User (MU) channel. When a device has multiple antennas, we refer to it as a Multiple Input Multiple Output (MIMO) device. When a group of access nodes with multiple antennas transmit to a group of receiving users also with multiple antennas, the network is referred to as a DL MU-MIMO network. On the other hand, when a group of users with multiple antennas transmit to a group of receiving access nodes also with multiple antennas, the network is referred to as a UL MU-MIMO network.

SUMMARY

This disclosure includes systems and methods for UL MU-MIMO and DL MU-MIMO. In both UL and DL MU-MIMO, the presently disclosed systems and methods can utilize the cooperation between a group of access nodes, to improve Shannon Channel capacity between access nodes and a group of users, under two constraints: a minimum performance constraint per user and a maximum transmit power constraint. More specifically, the presently disclosed systems and methods can take advantage of the cooperation between a group of access nodes to simultaneously select pre-weighting values for the transmitted signals and an ordering combination for the received signals in such a way that the network capacity is improved, assuming each access node has some knowledge of the communications Channel between access nodes and terminal nodes. The term Multi-User (MU) can include single user scenarios since the same or similar techniques are generally applicable.

In one aspect, a method for receiving uplink communications in network node of a communication system is provided. The method includes: determining an ordering combination and determining pre-weighting values associated with the ordering combination for use by at least one terminal node, the pre-weighting values being determined based on a transmit power constraint and a minimum performance constraint; providing the pre-weighting values to the at least one terminal node; receiving a signal for each of at least one antenna, each received signal comprising a plurality of transmitted signals from the at least one terminal node based at least in part on the pre-weighting values; and processing the received signal for each of the at least one antenna using the determined ordering combination and the determined pre-weighting values.

In one aspect, an access node is provided. The access node includes: a transceiver module configured to communicate with at least one terminal node including receiving a signal via each of at least one antenna, each received signal comprising a plurality of signals transmitted from the at least one terminal node based at least in part on pre-weighting values; and a processor module coupled to the transceiver module and configured to determine an ordering combination for use in processing at least one of the received signals and determine pre-weighting values associated with the ordering combination for use by the at least one terminal node, the pre-weighting values being determined based on a transmit power constraint and a minimum performance constraint; provide the pre-weighting values to the transceiver module for communication to the at least one terminal node; and process the at least one of the received signals using the determined ordering combination and the determined pre-weighting values.

BRIEF DESCRIPTION OF THE DRAWINGS

The details of the present invention, both as to its structure and operation, may be gleaned in part by studying the accompanying drawings, in which like reference numerals refer to like parts, and in which:

FIG. 6 is a flowchart of Ordering combination selection and Pre-weighting calculation according to an aspect of the invention;

FIG. 7 is a flowchart of Successive Interference Cancellation (SIC) to soft-decision estimate and hard-decision detect of received signals according to an aspect of the invention;

FIG. 12A is a flowchart of the application of the set of Pre-weighting values to a transmit signal according to an aspect of the invention which has applied IPC Pre-coding;

FIG. 12B is a flowchart of the application of the set of Pre-weighting values to a transmit signal according to an aspect of the invention which has applied Partial IPC Pre-coding; and FIG. 12C is a flowchart of the application of the set of Pre-weighting values according to an aspect of the invention which has No IPC Pre-coding.

DETAILED DESCRIPTION

Systems and methods for enhanced pre-weighting transmission are provided.

Figure 1:
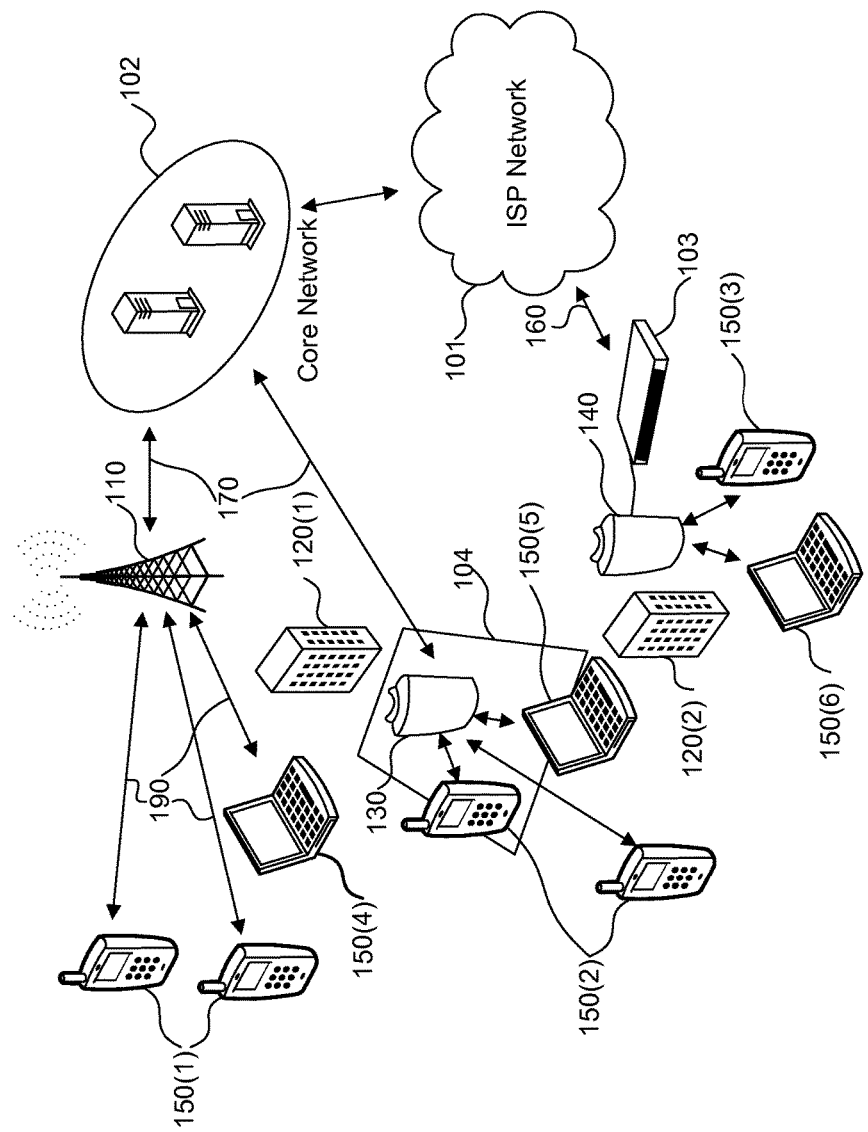
FIG. 1 is a block diagram of a communication network in which systems and methods disclosed herein can be implemented in accordance with aspects of the invention.

FIG. 1 is a block diagram of a communication network in which systems and methods disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Users 150(1) and 150(4) can connect to the core network 102 through the macro base station 110. Wireless links 190 between users 150 and the macro base station 110 are bidirectional point-to-multipoint links, in an embodiment. The direction of the wireless links 190 from the macro base station 110 to the users 150 is referred to as the downlink or downstream direction. The direction of the wireless links 190 from the users 150 to the macro base station 110 is referred to as the uplink or upstream direction. Users are sometimes referred to as user equipment (UE), subscriber stations, user devices, handsets, terminal nodes, user terminals, or similar terms and are often mobile devices such as smart phones or tablets. The users 150 access content over the wireless links 190 using base stations, such as the macro base station 110, as a bridge.

In the network configuration illustrated in FIG. 1, an office building 120(1) causes a coverage shadow 104. A pico station 130 can provide coverage to users 150(2) and 150(5) in the coverage shadow 104. The pico station 130 is connected to the core network 102 via a backhaul connection 170. The users 150(2) and 150(5) may be connected to the pico station 130 via links that are similar to or the same as the wireless links 190 between users 150(1) and 150(4) and the macro base station 110.

In office building 120(2), an enterprise femto base station 140 provides in-building coverage to users 150(3) and 150(6). The enterprise femto base station 140 can connect to the core network 102 via an internet service provider network 101 by utilizing a broadband connection 160 provided by an enterprise gateway 103.

Figure 2A:
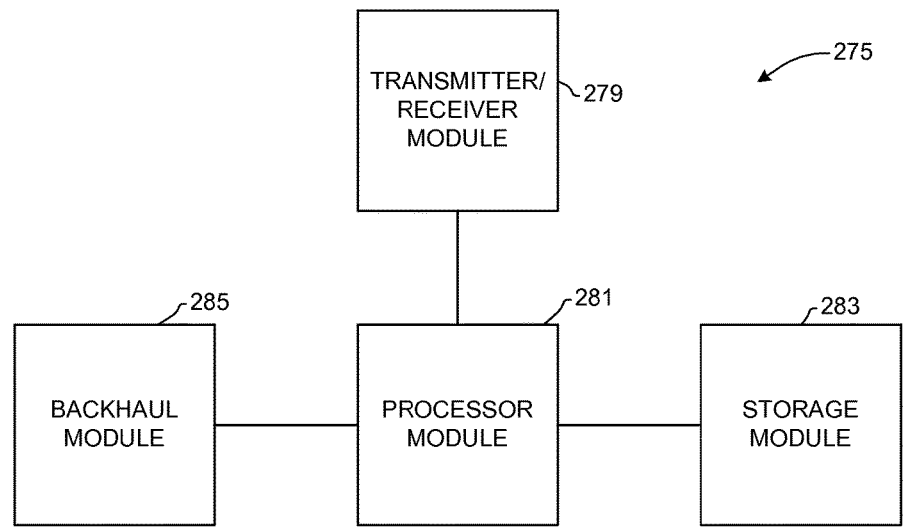
FIG. 2A is a block diagram of an access node in accordance with aspects of the invention.

FIG. 2A is a functional block diagram of an access node 275 in accordance with aspects of the invention. Access nodes may also be referred to as base stations, Node Bs, access points, base transceiver stations, or similar terms. In various embodiments, the access node 275 may be a mobile WiMAX base station, a Universal Mobile Telecommunications System (UMTS) NodeB, an LTE evolved Node B (eNB or eNodeB), or other wireless base station or access point of various form factors. For example, the macro base station 110, the pico station 130, or the enterprise femto base station 140 of FIG. 1 or the macro station 111 may be provided, for example, by the access node 275 of FIG. 2. The access node 275 includes a processor module 281. The processor module 281 is coupled to a transmitter-receiver (transceiver) module 279, a backhaul interface module 285, and a storage module 283.

The transmitter-receiver module 279 is configured to transmit and receive communications wirelessly with other devices. The access node 275 generally includes one or more antennae for transmission and reception of radio signals. The communications of the transmitter-receiver module 279 may be with terminal nodes.

The backhaul interface module 285 provides communication between the access node 275 and a core network. This may include communications directly or indirectly (through intermediate devices) with other access nodes, for example using the LTE X2 interface. The communication may be over a backhaul connection, for example, the backhaul connection 170 of FIG. 1. Communications received via the transmitter-receiver module 279 may be transmitted, after processing, on the backhaul connection. Similarly, communication received from the backhaul connection may be transmitted by the transmitter-receiver module 279.

Although the access node 275 of FIG. 2 is shown with a single backhaul interface module 285, other embodiments of the access node 275 may include multiple backhaul interface modules. Similarly, the access node 275 may include multiple transmitter-receiver modules. The multiple backhaul interface modules and transmitter-receiver modules may operate according to different protocols. Communications originating within the access node 275, such as communications with other access nodes, may be transmitted on one or more backhaul connections by backhaul interface module 285. Similarly, communications destined for access node 275 may be received from one or more backhaul connections via backhaul interface module 285.

The processor module 281 can process communications being received and transmitted by the access node 275. The storage module 283 stores data for use by the processor module 281. The storage module 283 may also be used to store computer readable instructions for execution by the processor module 281. The computer-readable instructions can be used by the access node 275 for accomplishing the various functions of the access node 275. In an embodiment, the storage module 283 or parts of the storage module 283 may be considered a non-transitory machine-readable medium. For concise explanation, the access node 275 or embodiments of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

Figure 2B:
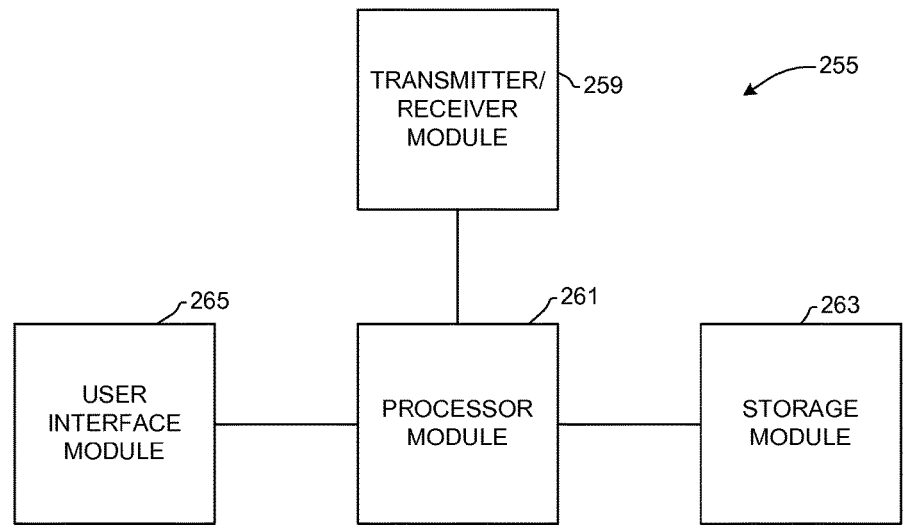
FIG. 2B is a block diagram of a terminal node in accordance with aspects of the invention.

FIG. 2B is a functional block diagram of a terminal node 255 in accordance with aspects of the invention. In various embodiments, the terminal node 255 may be a mobile WiMAX user, a UMTS cellular phone, an LTE user equipment, or other wireless terminal node of various form factors. The users 150 of FIG. 1 may be provided, for example, by the terminal node 255 of FIG. 2B. The terminal node 255 includes a processor module 261. The processor module 261 is coupled to a transmitter-receiver module (transceiver) 259, a user interface module 265, and a storage module 263.

The transmitter-receiver module 259 is configured to transmit and receive communications with other devices. For example, the transmitter-receiver module 259 may communicate with the access node 275 of FIG. 2A via its transmitter-receiver module 279. The terminal node 255 generally includes one or more antennae for transmission and reception of radio signals. Although the terminal node 255 of FIG. 2B is shown with a single transmitter-receiver module 259, other embodiments of the terminal node 255 may include multiple transmitter-receiver modules. The multiple transmitter-receiver modules may operate according to different protocols.

The terminal node 255, in many embodiments, provides data to and receives data from a person (user). Accordingly, the terminal node 255 includes the user interface module 265. The user interface module 265 includes modules for communicating with a person. The user interface module 265, in an embodiment, includes a speaker and a microphone for voice communications with the user, a screen for providing visual information to the user, and a keypad for accepting alphanumeric commands and data from the user. In some embodiments, a touch screen may be used in place of or in combination with the keypad to allow graphical inputs in addition to alphanumeric inputs. In an alternative embodiment, the user interface module 265 includes a computer interface, for example, a universal serial bus (USB) interface, to interface the terminal node 255 to a computer. For example, the terminal node 255 may be in the form of a dongle that can be connected to a notebook computer via the user interface module 265. The combination of computer and dongle may also be considered a terminal node. The user interface module 265 may have other configurations and include functions such as vibrators, cameras, and lights.

The processor module 261 can process communications being received and transmitted by the terminal node 255. The processor module 261 can also process inputs from and outputs to the user interface module 265. The storage module 263 stores data for use by the processor module 261. The storage module 263 may also be used to store computer readable instructions for execution by the processor module 261. The computer-readable instructions can be used by the terminal node 255 for accomplishing the various functions of the terminal node 255. In an embodiment, the storage module 263 or parts of the storage module 263 may be considered a non-transitory machine-readable medium. For concise explanation, the terminal node 255 or embodiments of it are described as having certain functionality. It will be appreciated that in some embodiments, this functionality is accomplished by the processor module 261 in conjunction with the storage module 263, the transmitter-receiver module 259, and the user interface module 265. Furthermore, in addition to executing instructions, the processor module 261 may include specific purpose hardware to accomplish some functions.

Multiple transmissions of independent data streams by using coinciding time-frequency (T/F) resource allocation have been enabled by developments in communication systems. These techniques are a subset of a family of techniques that are called Multiple Input Multiple Output (MIMO) techniques. In MIMO systems more than one antenna at either or both of the receiver and transmitter are used. In a specific class of MIMO techniques called spatial multiplexing, multiple distinct transmissions are resolved from each other through using multiple antennas and associated receiver chains at the receiver. In MIMO spatial multiplexing (MIMO-SM), the transmission data rate is increased by making multiple transmissions at coinciding T/F resources while using multiple transmission and reception antennas. Distinct groups of data to be transmitted are referred to as layers.

Other MIMO techniques include transmitter diversity and receiver diversity. In transmitter diversity, the same information is either directly or in some coded form transmitted over multiple antennas. In receiver diversity, multiple receive antennas are used to increase the received signal quality. Any two or all of the techniques of transmitter diversity, receiver diversity, and spatial multiplexing (SM) may be used simultaneously in a system. For example, a MIMO-SM system may also deploy transmitter diversity in addition to receive diversity.

A pre-coding operation in a MIMO transmitter may be used to transmit pre-weighted combinations of signals associated with each of the transmitted layers by each antenna. Alternately, the pre-coding operation may be designed such that each of the transmit antennas is used for transmitting a unique layer, for example in the LTE standard for uplink. The pre-coding operation may map the layers to antennas in such a manner that the number of transmit antennas is greater that the number of transmitted layers.

MIMO-SM techniques include single-user (SU) MIMO-SM and multi-user (MU) MIMO-SM techniques. In SU-MIMO-SM, multiple layers are transmitted by a transmitter at coinciding T/F resources and received by a receiver. In MU-MIMO-SM, multiple signals using common T/F resources are either transmitted by multiple transmitters and received by a receiver (e.g. uplink transmission in a cellular network), or, transmitted by a single transmitter and received by multiple receivers (e.g. Downlink transmission in a cellular network). We refer to MIMO-SM simply as MIMO and focus generally on MU-MIMO since SU-MIMO forms a subset of MU-MIMO.

Figure 3:
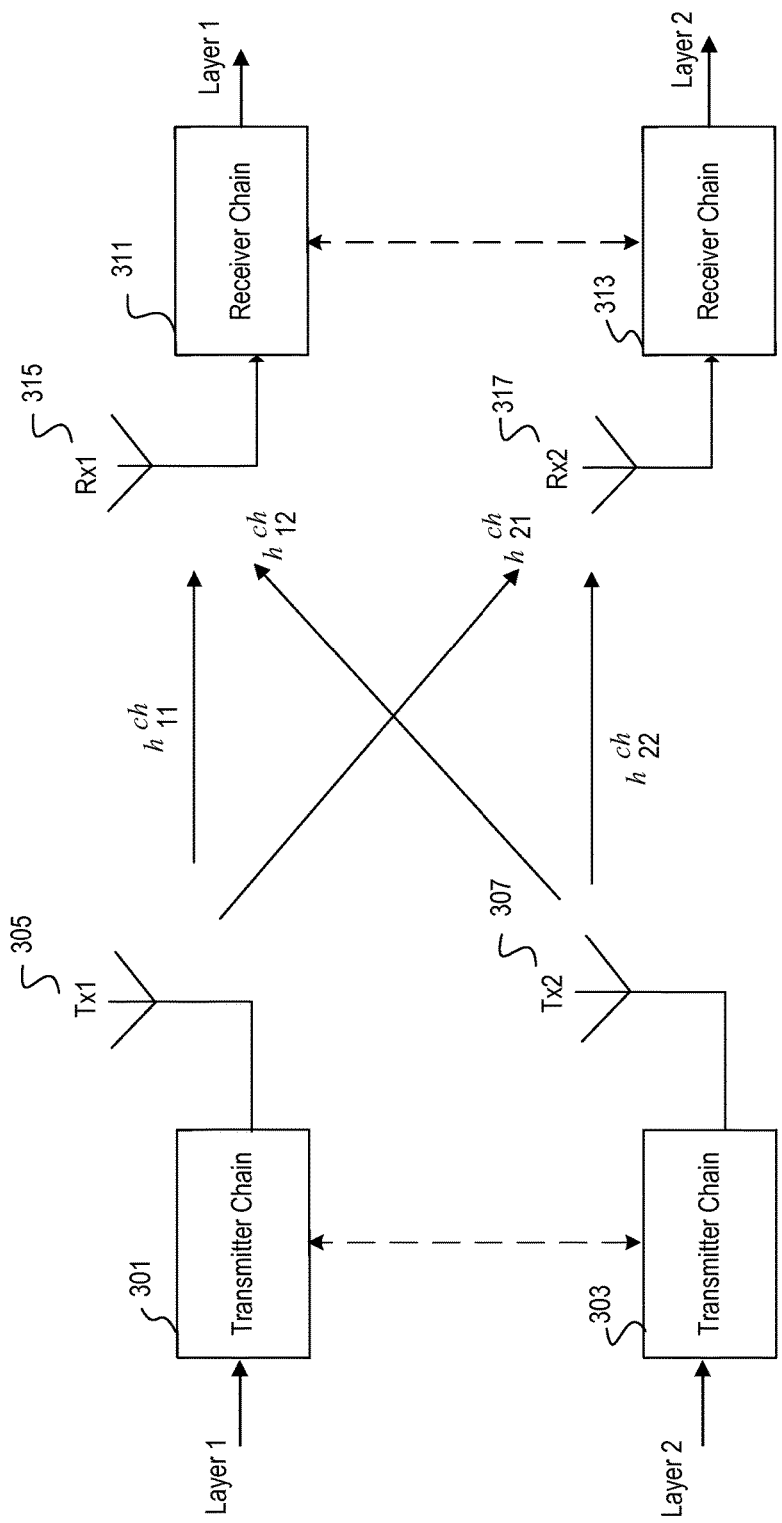
FIG. 3 is a block diagram of channels between two transmit antennas (Txs) and two receive antennas (Rxs)

FIG. 3 provides an example of communication channel impact for the case of two transmit antennas (Txs) 305 and 307 and two receive antennas (Rxs) 315 and 317 arranged in a MIMO configuration. Identifiers such as "transmitter," "receiver," and the like may be omitted from some terms when the usage context provides such identification.

In the case where transmit antennae (Txs) 305 and 307 are located in a single transmitter (e.g., an access node such as an LTE eNB base station) and where receive antennae (Rxs) 315 and 317 are located in a single receiver (e.g., a terminal node such as a smartphone), then the system is in a SU-MIMO configuration. In a SU-MIMO configuration, operation of the multiple transmitter chains in the transmitter may be coordinated, as depicted by the dashed arrow line between transmitter chains 301 and 303. For example, coordination may include support for a pre-coding operation.

Similarly, in a SU-MIMO configuration, operation of the multiple receiver chains in the receiver may be coordinated, as depicted by the dashed arrow line between receiver chains 311 and 313. For example, coordination may include support for a joint decoding operation.

In the case where either transmit antennae 305 and 307 and/or receive antennae 315 and 317 are located in more than one transmitter or receiver, respectively, then the system is in a MU-MIMO configuration.

One skilled in the art would appreciate that the use of MU-MIMO and SU-MIMO are not exclusive and that both modes of operation may be used concurrently in a multi-user access network such as the communication network depicted in FIG. 1. Similarly, one skilled in the art would appreciate that the various MIMO modes of operation may be applied in both UL and DL directions without loss of generality.

As there are multiple transmissions that use coinciding T/F resources, each of the receive antennas 315 and 317 are exposed to versions of signals from all transmit antennas 305 and 307 each impacted by the channel transfer function (CTF), which is represented by a matrix, $$h_{Ch} \triangleq \begin{bmatrix} h_{11}^{ch} & h_{21}^{ch} \\ h_{12}^{ch} & h_{22}^{ch} \end{bmatrix},$$

between a particular transmit antenna (Tx) and a particular receive antenna (Rx). The represented CTF values $h_{11}^{ch}$, $h_{12}^{ch}$, $h_{21}^{ch}$, $h_{22}^{ch}$ depicted in FIG. 3 refer to complex valued CTF values between the specific antennas per each resource element (e.g., one subcarrier for one QAM symbol in an OFDM system) of the transmission. In practice, each of the transmitter chains 301 and 303 and the receiver chains 311 and 313 are not ideal and may impact the received value for each transmitted resource element. The techniques provided in this application while referring to the CTF between particular transmit and receive antennas represented by CTF values $h_{11}^{ch}$, $h_{12}^{ch}$, $h_{21}^{ch}$, $h_{22}^{ch}$ apply with no limitation when the CTF values also incorporate the impact of transmitter chains and the receiver chains. Practical real life measurement of CTFs would also reflect the impact of the transmitter chains and the receiver chains on each resource element.

In a frequency selective channel, the CTF values may be different for different subcarriers of a received OFDM symbol. In contrast, in a frequency flat channel all CTF values across the frequency range are substantially the same within a tolerance (e.g., the magnitude of the CTF values are within some fraction of a decibel of each other). In a time varying channel the CTF values may vary from one OFDM symbol to another at a same frequency subcarrier. In contrast, in a non-time-varying channel, CTF values do not vary by more than a certain amount from one OFDM symbol to another at a same frequency subcarrier (e.g., the magnitude of the CTF values are within some fraction of a decibel of each other).

Figure 4:
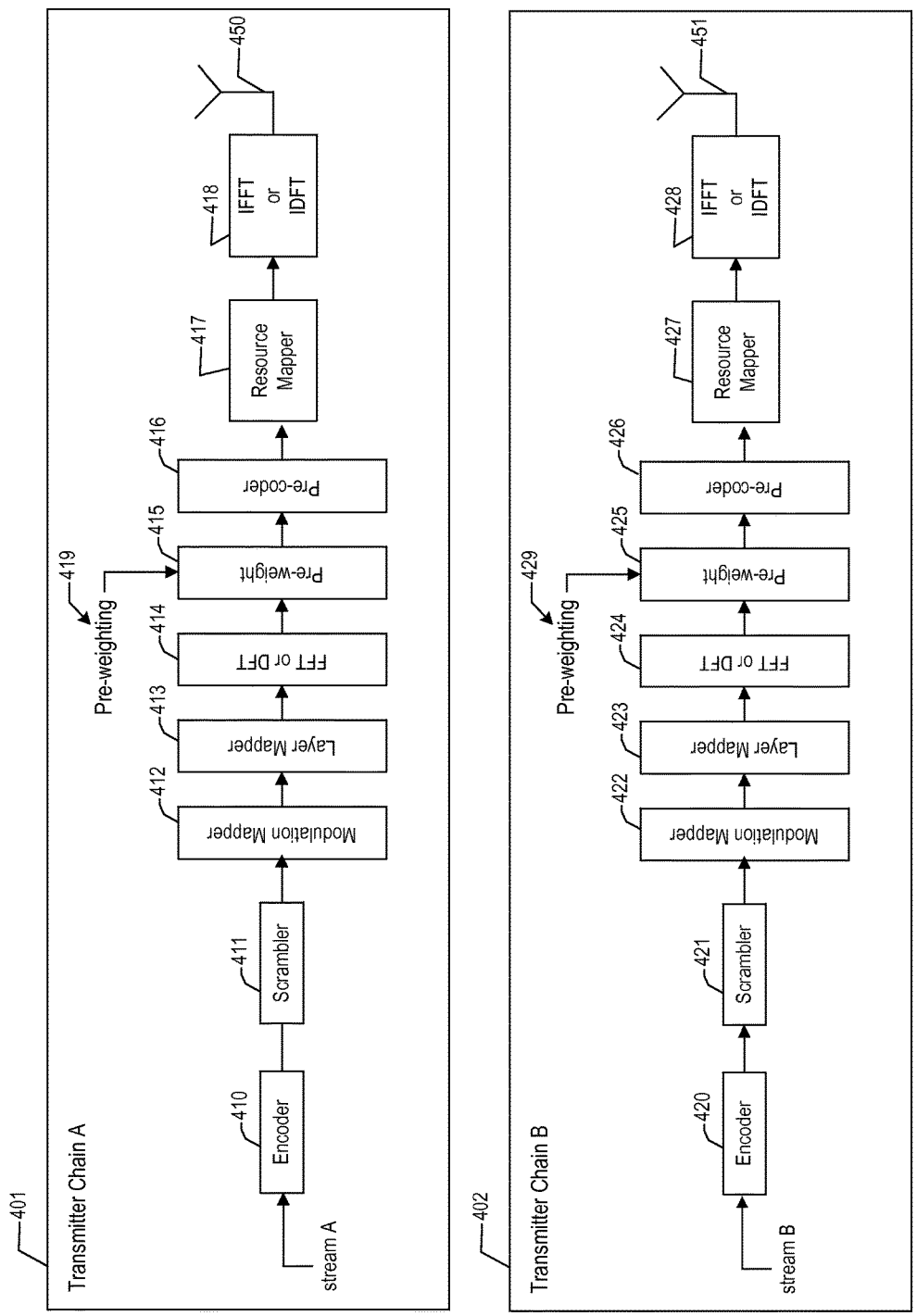
FIG. 4 is a block diagram of multiple transmitter chains in which aspects of the invention may be implemented.

FIG. 4 is a block diagram of transmitter chains 401 and 402 in which aspects of the invention may be implemented. Transmitter chains 401, 402 start with the input of the data stream (stream A/stream B) into encoder 410 and 420, the output of which is then passed through scrambler 411 and 421, modulation mapper 412 and 422, layer mapper 413 and 423, FFT/DFT 414 and 424 (optional, and used for single carrier, frequency division multiple access (SC-FDMA) transmissions such as an LTE UL transmission), pre-weight module 415 and 425, pre-coder 416 and 426, resource mapper 417 and 427, IFFT/IDFT 418 and 428, and then transmitted through the antenna 450 and 451. The layer mappers 413, 423 map the encoded and scrambled data streams to MIMO layers. The mapping is done according a particular SM or diversity coding used for transmission. Many of the components of each of transmitter chains 401, 402 are known to those skilled in the art and are not described in detail herein for the sake of brevity. As seen in FIG. 4, a set of pre-weighting values 419, 429 is introduced into the pre-weighting module 415 and 425 in order to pre-weight the transmissions of stream A and stream B.

Figure 5A:
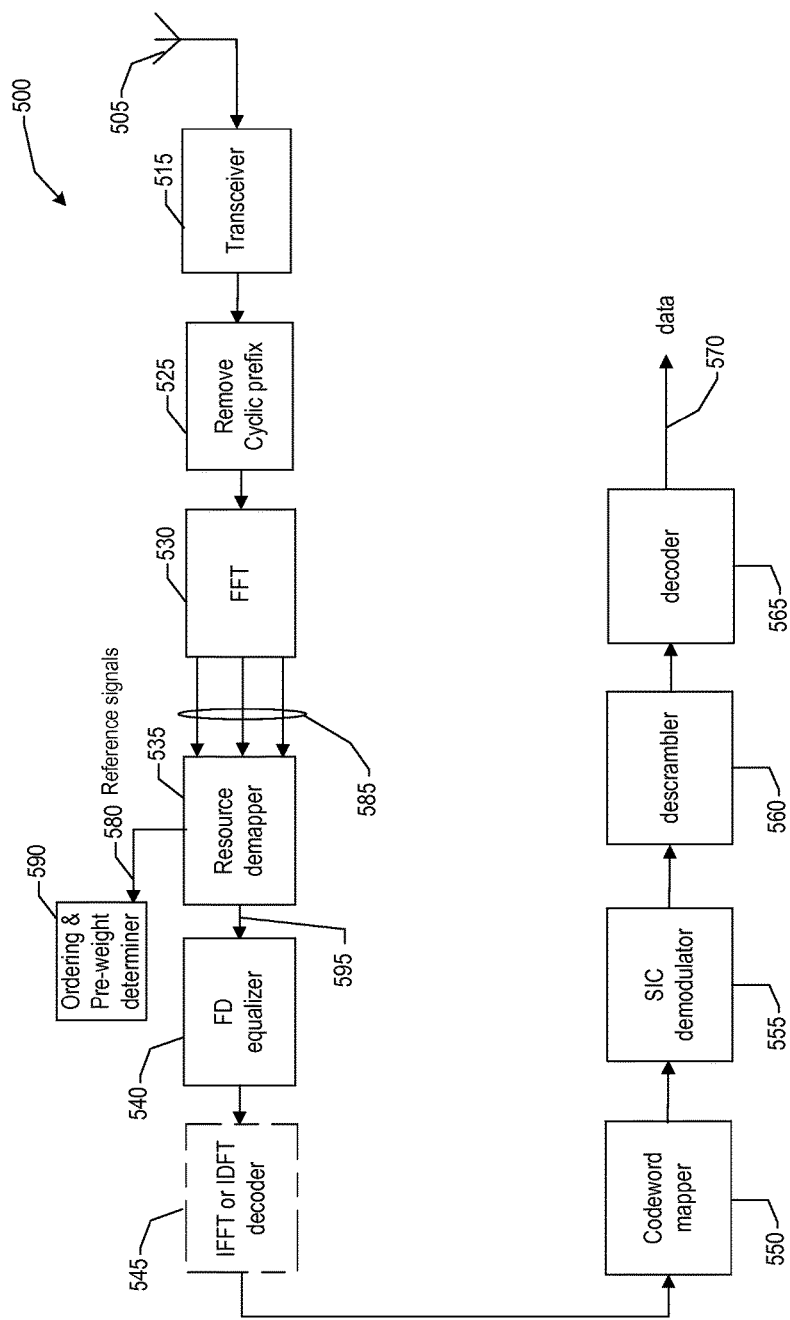
FIG. 5A is a block diagram of a receiver chain according to an aspect of the invention.

FIG. 5A is a block diagram of a receiver chain 500 according to an example embodiment of the present invention. Many of the components of receiver chain 500 are known to those skilled in the art and are not described in detail herein for the sake of brevity. Of particular importance is the FFT 530 which transforms the digital baseband signal into the frequency domain with FFT outputs 585 for each subcarrier/OFDM symbol pair. From the FFT outputs 585, the resource demapper 535 extracts the reference signal 580 and data elements 595 from each transmission. Reference signals 580 are passed to the ordering and pre-weight determiner 590, which is described in more detail with respect to FIG. 5B. The information in the subcarriers corresponding to a transmission's reference signal is used to create a channel transfer function estimate for the transmission. In receiver chain 500 of FIG. 5A, IFFT/IDFT decoder 545 is an optional function and is used for processing the reception of certain transmission waveforms, such as SC-FDMA transmissions waveforms. In receiver chain 500 of FIG. 5A, a codeword mapper 550 is followed by an SIC detector 555, a descrambler 560 and decoder 565 to generate the detected data 570. In an aspect, for example, the receiver portion of transmitter-receiver (transceiver) module 279 of access node 275, may be implemented using receiver chain 500.

Figure 5B:
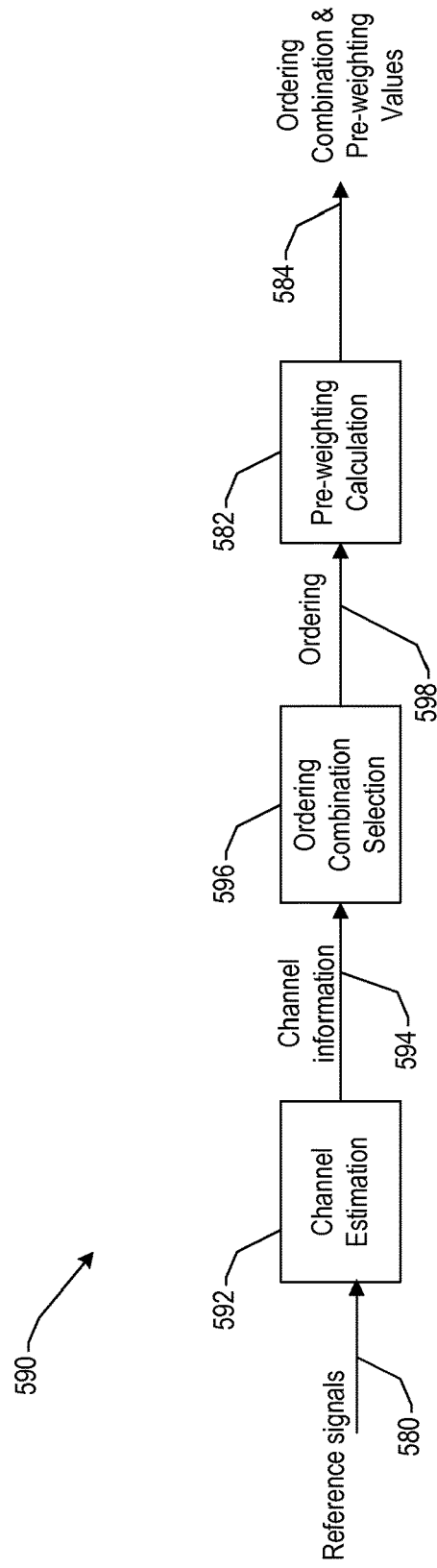
FIG. 5B is a block diagram depicting channel estimation, Ordering combination selection and Pre-weighting calculation according to an aspect of the invention.

FIG. 5B is a block diagram describing ordering and pre-weight determiner 590, which includes a channel estimation module 592 that accepts reference signals (580) from one or more receiver chains and generates an estimate of the channel 594, followed by an ordering module 596 for selecting an ordering combination 598 to be used for the SIC detector at the receiving devices and a pre-weighting module 582 for calculating pre-weighting values which correspond to the estimated channel and to the selected ordering combination, resulting in an ordering combination and pre-weighting values 584. Ordering combination selection performed by ordering module 596 and pre-weighting calculation performed by pre-weighting module 582 are according to an aspect of the invention. Additionally, the modules of FIG. 5B may obtain information regarding the group of transmitting devices that transmit signals to a group of receiving devices. As used herein, the terms "transmitting device" and "receiving device" are used interchangeably with the terms "transmitter" and "receiver," respectively. Such information may include one more information elements, and the information about the group of transmitting devices and the group of receiving devices may be obtained, for example, from a media access control layer scheduler. The term "information element" is used throughout this description in a broad sense to refer to any information that may be communicated between nodes including, for example, user data, control signaling, and reference signals.

FIG. 6 is a flowchart of selecting an ordering combination of the information elements and calculating its corresponding pre-weighting values according to an aspect of the invention. In FIG. 6, step 601 obtains information regarding the group of transmitting devices that transmit signals to a group of receiving devices. The information includes one or more information elements. The information about the group of transmitting devices and the group of receiving devices may be obtained, for example, from a media access control layer scheduler. The second step 603 estimates the channel (CTF) matrix by the receiving devices. The third step 605 selects an ordering combination. The fourth step 607 calculates the pre-weighting values, which correspond to the ordering combination selected in the previous step 605. Finally, the last step 609 communicates the selected Ordering combination and the corresponding calculated pre-weighting values to the transmitting devices. The functions depicted in FIG. 6 may be performed, for example, by a MIMO receiver such as an LTE base station.

FIG. 7 is a flowchart of the Successive Interference Cancellation (SIC) process 700 that is used to detect the transmitted information in received signals at the receiving devices according to an aspect of the invention. In FIG. 7, the first step 701 obtains information regarding the group of transmitting devices that transmit signals to a group of receiving devices. The second step 703 receives the transmitted signals. The third step 705 selects a "next" signal element in received signal based on the selected ordering combination from FIG. 6. The fourth step 707 filters the selected "next" signal element in the received signal. The fifth step 709 performs a soft-decision estimation on the selected "next" signal element in the received signal. This is followed by the sixth step 711, which performs a hard-decision detection on the selected "next" signal element in the received signal, after removing the effect of pre-weighting. If the hard-decision detection of the selected "next" signal element in the received signal is the last one 713, then the process ends, otherwise, the effect of the hard-decision detection of the selected "next" signal element in the received signal is removed from the received signal in the next step 715, and the number of remaining signal elements in the received signal is decreased by one 717.

Figure 8:
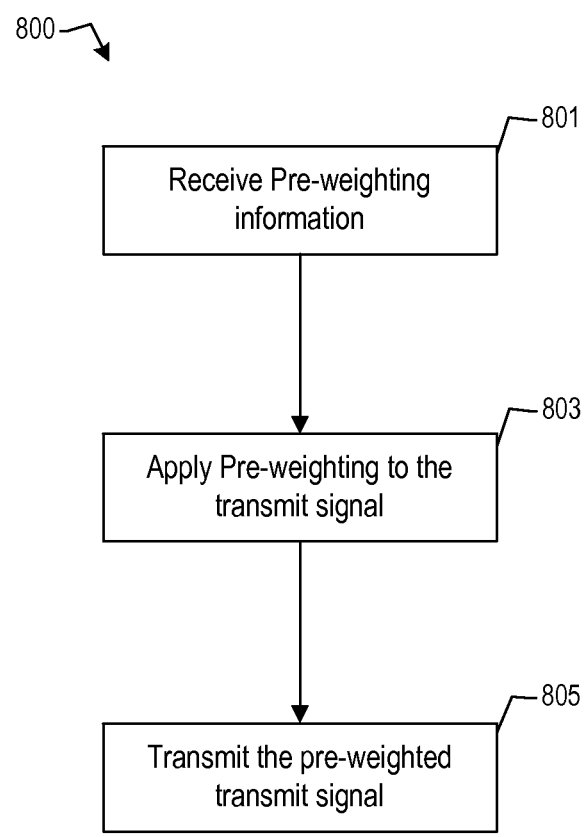
FIG. 8 is a flowchart of the application of the set of Pre-weighting values to a transmit signal according to an aspect of the invention.

FIG. 8 is a flowchart of the application of the pre-weighting values that are obtained in the steps described with respect to FIG. 6 to a signal intended for transmission according to an aspect of the invention. In FIG. 8, the first step 801 receives the pre-weighting values for the signal to be transmitted. In step 803, the signal is pre-weighted according to the pre-weighting values in first step 801. In step 805, the pre-weighted signal is transmitted.

FIGS. 9A, 9B, 9C, 9D, 9E, and 9F are flowcharts of processes for selecting ordering combinations and for calculating the corresponding pre-weighting values according to aspects of the invention. Each process may be performed, for example, by an access node such as the access node of FIG. 2A. The processes use information about groups of transmitting devices that will transmit to groups of receiving devices and channel estimates to produce ordering combinations and corresponding pre-weighting values. The information about the groups of transmitting and receiving devices may be obtained, for example, from a media access control protocol. The channel information may be provided, for example, from the receiving devices based on reference signals from the transmitting devices. The processes determine the ordering combinations and corresponding pre-weighting values to improve communications between transmitting and receiving devices. Mathematical descriptions of these processes and variations thereof are described below.

The processes determine the ordering combinations and corresponding pre-weighting values subject to a transmit power constraint and a received signal-to-interference-plus-noise-ratio (SINR) constraint. The transmit power constraint may indicate a maximum transmit level and may include constraints on individual transmitters, individual transmitting devices, and the combined power. In other aspects, the transmit power constraint may indicate a transmit power level other than a maximum transmit power level, such as a mean transmit power level, a median transmit power level or other statistical variations of transmit power level. The received SINR constraint indicates a desired minimum SINR at the receiving devices. The transmit power constraint may be based on capabilities of the transmitting devices and spectrum regulations. The SINR constraint may be determined, for example, based on communication system performance requirements. Additionally or alternatively, other measures of performance (e.g., signal-to-noise ratio, carrier-to-noise ratio, or carrier-to-interference ratio) may be used as a minimum performance constraint.

Figure 9A:
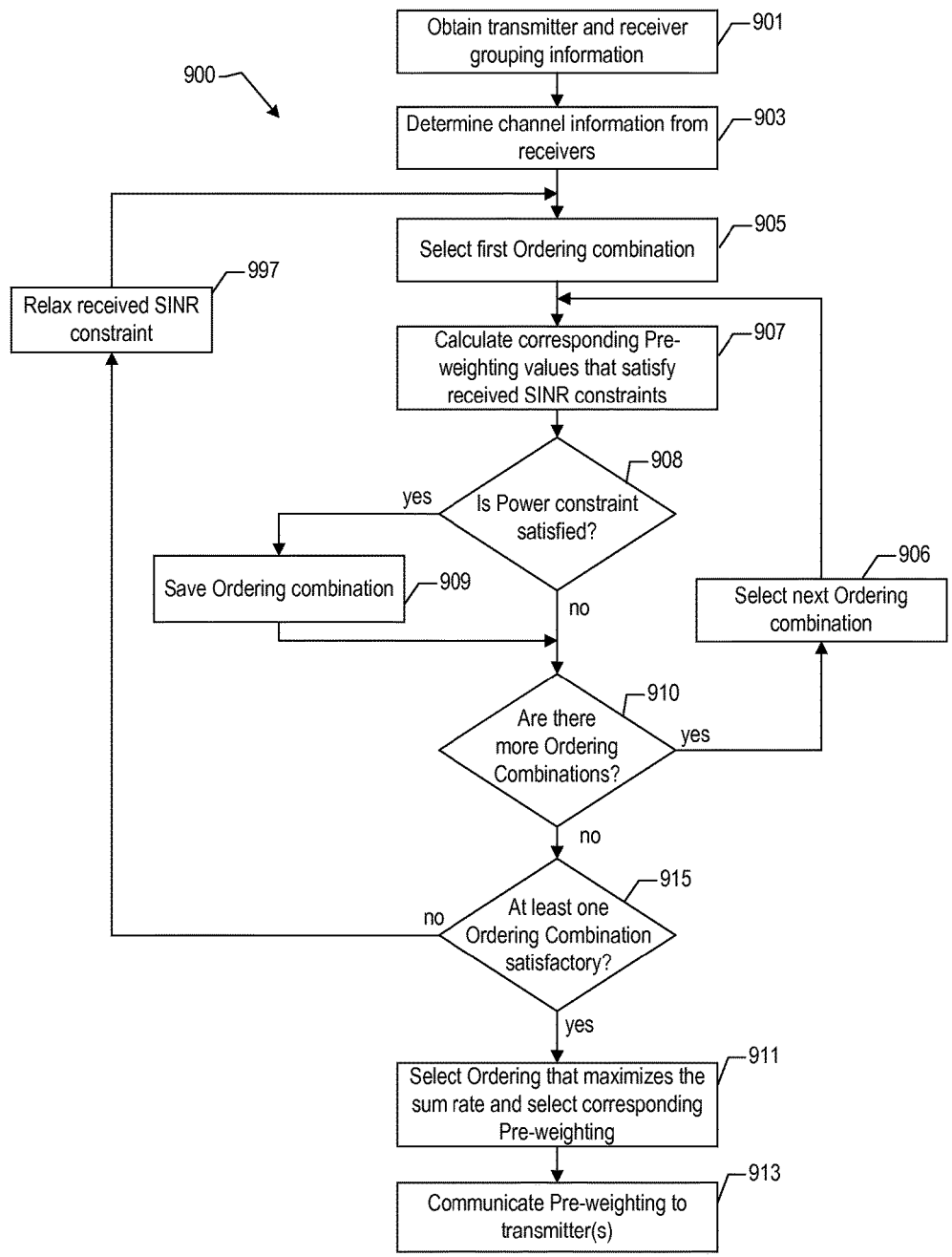
FIG. 9A is a flowchart of an operation for selecting an Ordering combination and calculating its corresponding Pre-weighting values according to an aspect of the invention.

FIG. 9A is a flowchart of an operation for selecting an ordering combination and for calculating the corresponding pre-weighting values according to an aspect of the invention. FIG. 9A illustrates a first way (Way 1) of selecting an ordering combination and calculating the corresponding pre-weighting values.

In FIG. 9A, step 901 obtains information regarding the group of transmitting devices that transmit signals to a group of receiving devices. In an aspect, step 901 also determines a set of ordering combinations including all possible combinations. Alternatively a subset of all possible combinations may be used. Step 903 obtains channel estimation from the receiving devices. In another aspect, step 903 may determine the set of ordering combinations.

Step 905 starts a loop to find one or more ordering combinations, among the set of ordering combinations, and their corresponding pre-weighting values that satisfy both the transmit Power constraint and the received SINR constraint. Step 905 selects a first ordering combination for evaluation. Since the process of FIG. 9A evaluates all ordering combinations and selects a best ordering combination, the sequence in which the ordering combinations are evaluated may be changed without affecting the result. In an alternative aspect, if a combination is satisfactory as soon as it is generated, the process may then break out of the loop.

Step 907 calculates the pre-weighting values which correspond to the selected ordering combination and which satisfy the received SINR constraint. The calculated pre-weighting values are then tested against the transmit power constraint in step 908. If the transmit power constraint is satisfied, the process continues to step 909; otherwise, the process continues to step 910. In step 909, the ordering combination and calculated pre-weighting values are saved for use in subsequent steps. The process continues from step 909 to step 910.

Step 910 tests whether more ordering combinations exist. If more ordering combinations exist, the process continues to step 906; otherwise, the process continues to step 915. In step 906, a next ordering combination is selected. The process then returns to step 907 and then step 908 to determine if more ordering combinations satisfy both the received SINR constraint and the transmit power constraint.

In step 915, the process tests whether at least one satisfactory (satisfying the transmit power constraint and the received SINR constraint) ordering combination was found. This may be determined, for example, by noting whether step 909 has saved one or more ordering combinations. If at least one satisfactory ordering combination was found, the process continues to step 911; otherwise, the process continues to step 997.

Step 997 relaxes the received SINR constraint. The received SINR constraint may be relaxed, for example, by subtracting a small value (e.g., 1 dB) or by multiplying by a value less than one (e.g., 0.794). The process then returns to step 905 to evaluate the set of ordering combinations using the relaxed SINR constraint. Step 997 operates when all ordering combinations have been evaluated without finding at least one ordering combination satisfying the received SINR constraint and the transmit power constraint. In such cases, the received SINR constraint is relaxed in step 997 and the ordering combinations retested using the relaxed received SINR constraint. Relaxation of the received SINR constraint in step 997 can be repeated until at least one set of calculated pre-weighting values is found that satisfies the relaxed received SINR constraint and the transmit power constraint. The process shown in FIG. 9A maintains the power constraint intact and allows the received SINR constraint to be relaxed.

Step 911 maximizes the sum rate by selecting optimal ordering and pre-weighting values. Step 913 then communicates the optimized pre-weighting values to the transmitting devices.

Figure 9B:
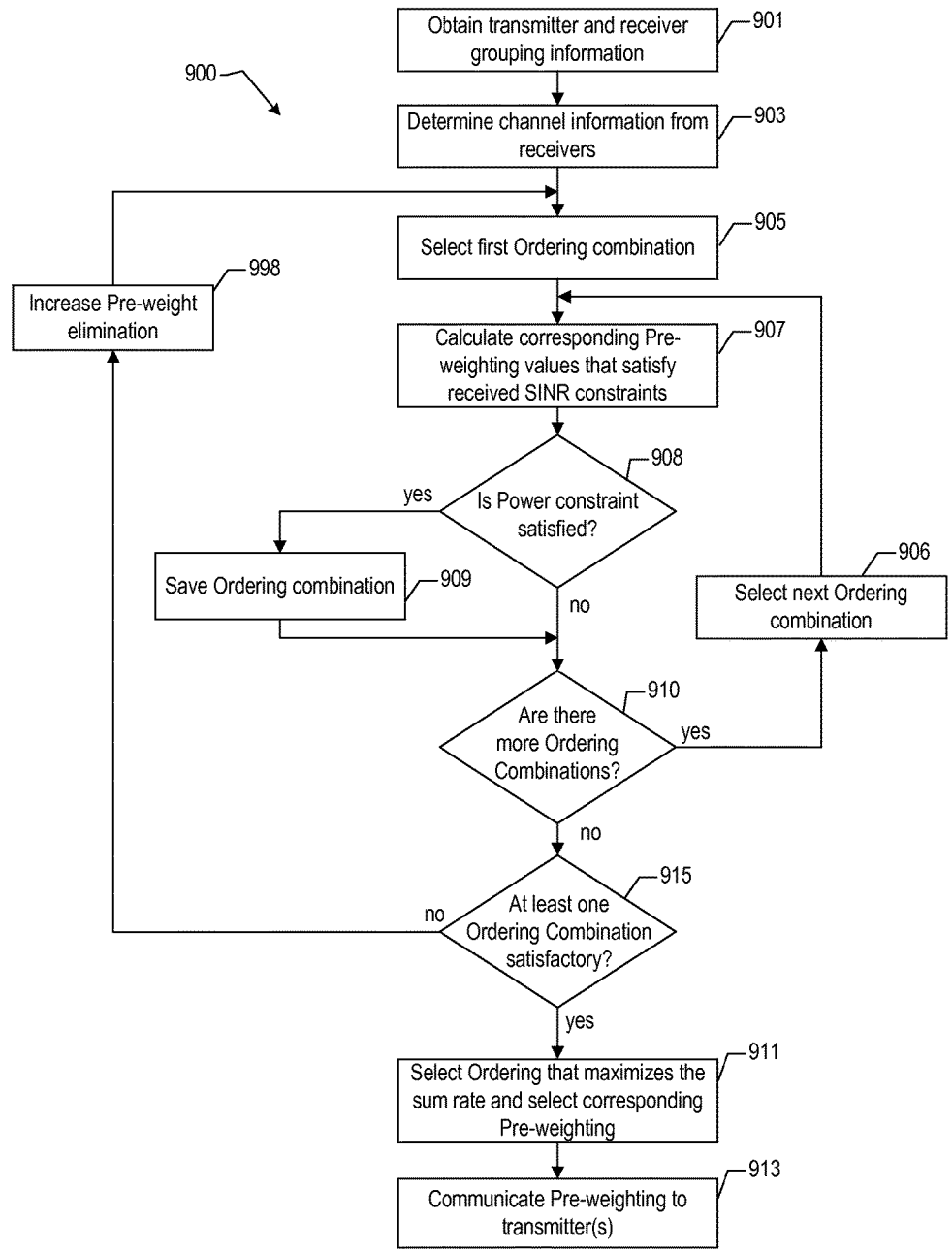
FIG. 9B is a flowchart of an operation for selecting an Ordering combination and calculating its corresponding Pre-weighting values according to an aspect of the invention.

FIG. 9B is a flowchart of another process for selecting an ordering combination and for calculating the corresponding pre-weighting values according to another aspect of the invention. The process of FIG. 9B is a variation of the first way (Way 1) of selecting an ordering combination and calculating the corresponding pre-weighting values and is similar to the process of FIG. 9A with like named steps operating in like fashion except for described differences. The process of FIG. 9B differs from the process of FIG. 9A in cases where no satisfactory ordering combination is found. In the process of FIG. 9B, the received SINR and transmit power constraints are met by eliminating one or more pre-weighing values.

From step 915, when no satisfactory ordering combinations were found, the process continues to step 998. In step 998, the number (which is initially zero) of eliminated pre-weighing values is incremented. Subsequently in step 907, after the pre-weighting values are calculated, the largest pre-weighting values are removed. The number of pre-weighting values removed is determined from step 998. Step 998 operates when all ordering combinations were evaluated without finding at least one ordering combination satisfying the transmit power constraint. In such cases, the ordering combinations are retested with the maximum pre-weighting values eliminated. The number of eliminated pre-weighting values can be increased until at least one set of calculated pre-weighting values is found that satisfies the transmit power constraint.

Figure 9C:
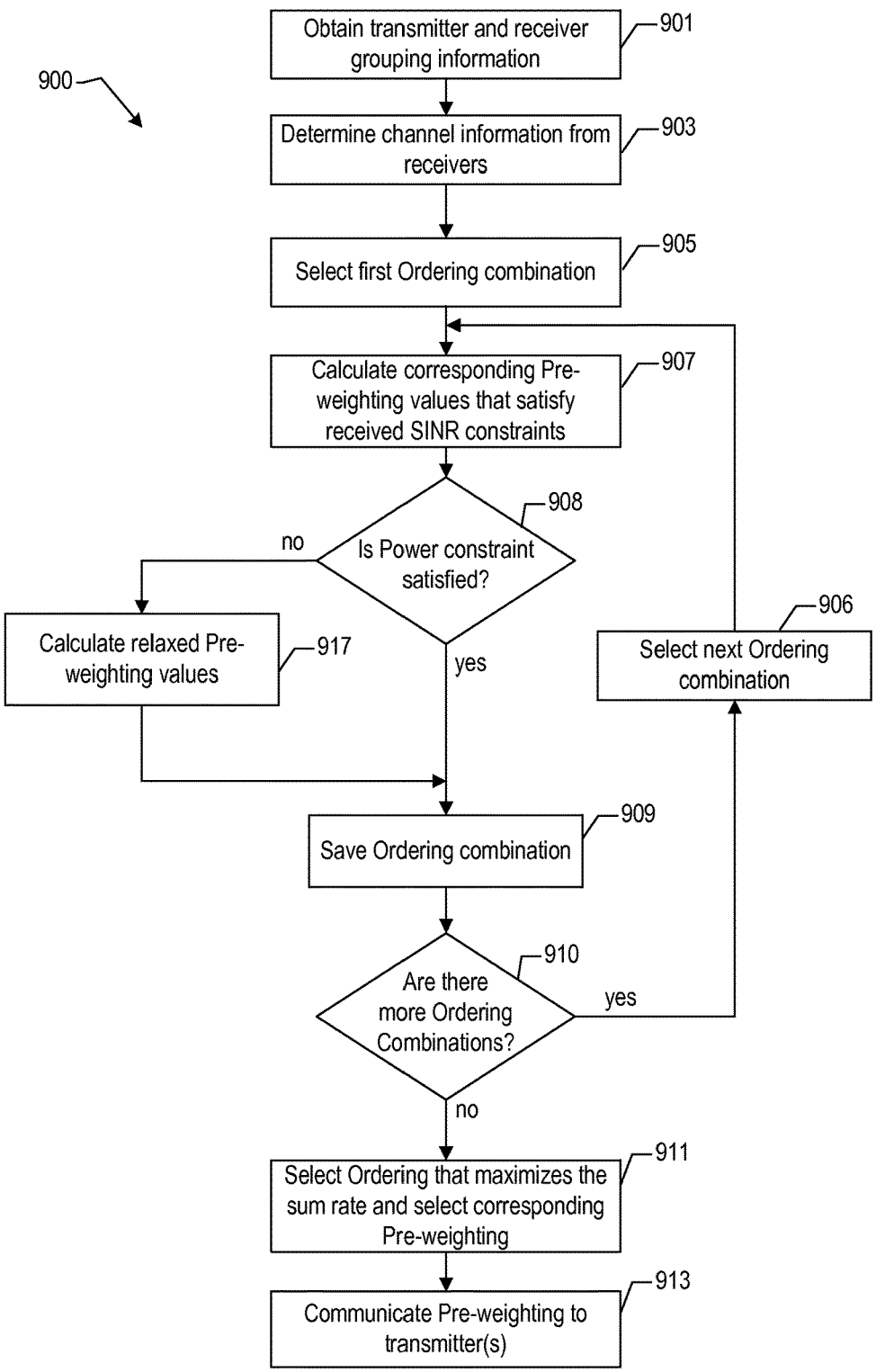
FIG. 9C is a flowchart of an operation for selecting an Ordering combination and calculating its corresponding Pre-weighting values according to an aspect of the invention.

FIG. 9C is a flowchart of a process for selecting an ordering combination and for calculating the corresponding pre-weighting values according to another aspect of the invention. The process of FIG. 9C is another variation of the first way (Way 1) of selecting an ordering combination and calculating the corresponding pre-weighting values and is similar to the process of FIG. 9A with like named steps operating in like fashion except for described differences. The process of FIG. 9C differs from the processes of FIGS. 9A and 9B in the processing of ordering combinations that do not satisfy both the received SINR constraint and the transmit power constraint.

In step 908 of the process of FIG. 9C, if the calculated pre-weighting values satisfy the transmit power constraint, the process continues to step 909; otherwise, the process continues to step 917. In step 917, the process calculates relaxed pre-weighting values that satisfy the transmit power constraint. The relaxed pre-weighting values may be calculated by, for example, eliminating the largest pre-weighting values or reducing the magnitude of all of the pre-weighting values. The process continues from step 917 to step 909. In step 909 the ordering combination and the pre-weighting values from step 907 or step 917 are saved for use in subsequent steps. The process then continues to step 910.

Step 910 tests whether more ordering combinations exist. If more ordering combinations exist, the process continues to step 906; otherwise, the process continues to step 911. In step 906, a next ordering combination is selected. The process then returns to step 907 to evaluate the next ordering combination.

Figure 9D:
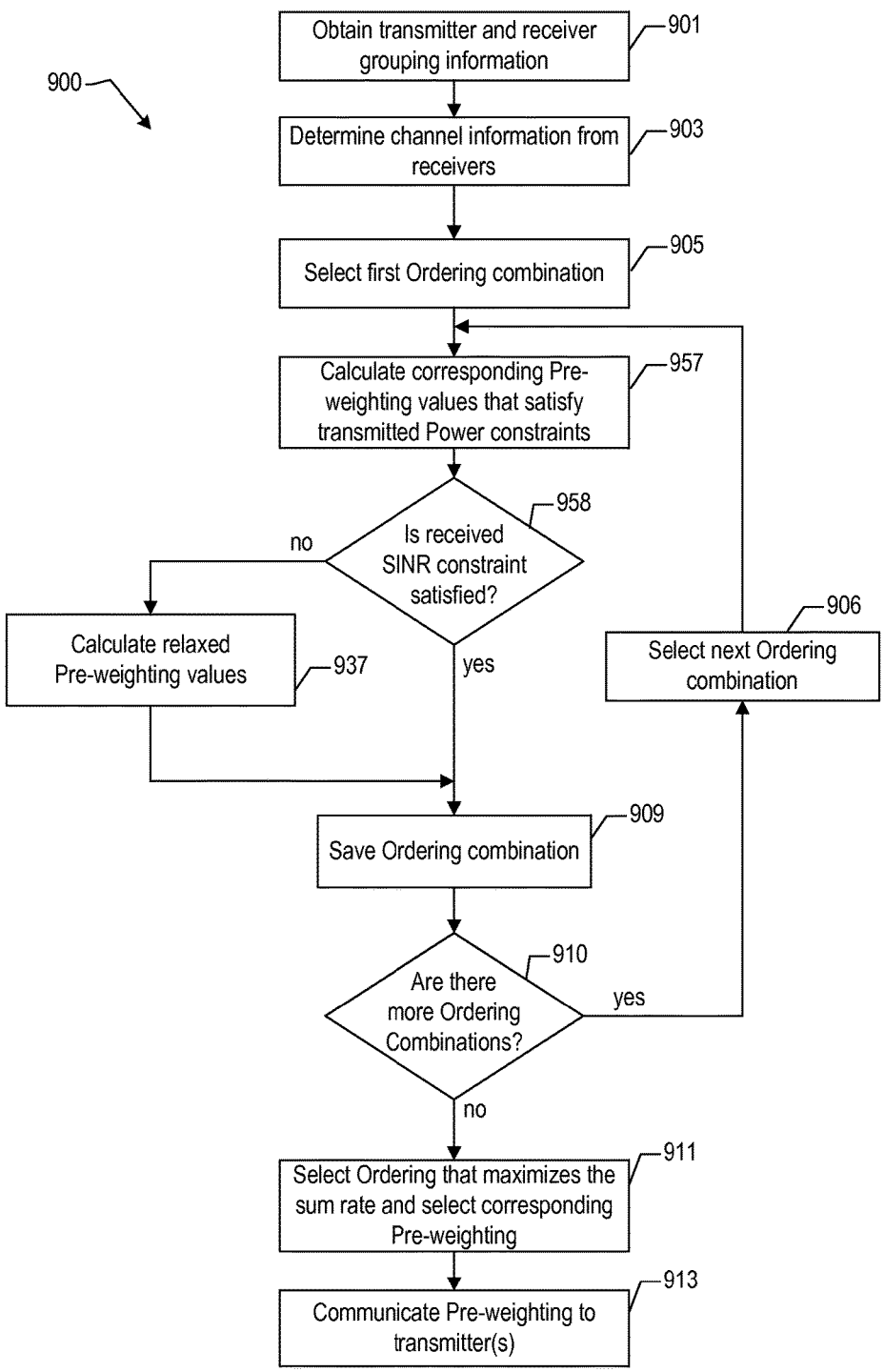
FIG. 9D is a flowchart of an operation for selecting an Ordering combination and calculating its corresponding Pre-weighting values according to an aspect of the invention.

FIG. 9D is a flowchart of an operation using a second way for selecting an ordering combination and for calculating the corresponding pre-weighting values according to another aspect of the invention. The process (Way 2) of FIG. 9D is similar to the process of FIG. 9C with like named steps operating in like fashion except for described differences. The process of FIG. 9D calculates pre-weighting values that satisfy the transmit power constraint and then tests whether those pre-weighting values satisfy the received SINR constraint. Accordingly, step 957 calculates pre-weighting values which correspond to the selected ordering combination and which satisfy the transmit Power constraint. The calculated pre-weighting values are then tested against the SINR constraint in step 958. If the received SINR constraint is satisfied, the process continues to step 909 (where evaluation results are saved); otherwise, the process continues to step 937 where relaxed pre-weighting values are calculated.

Figure 9E:
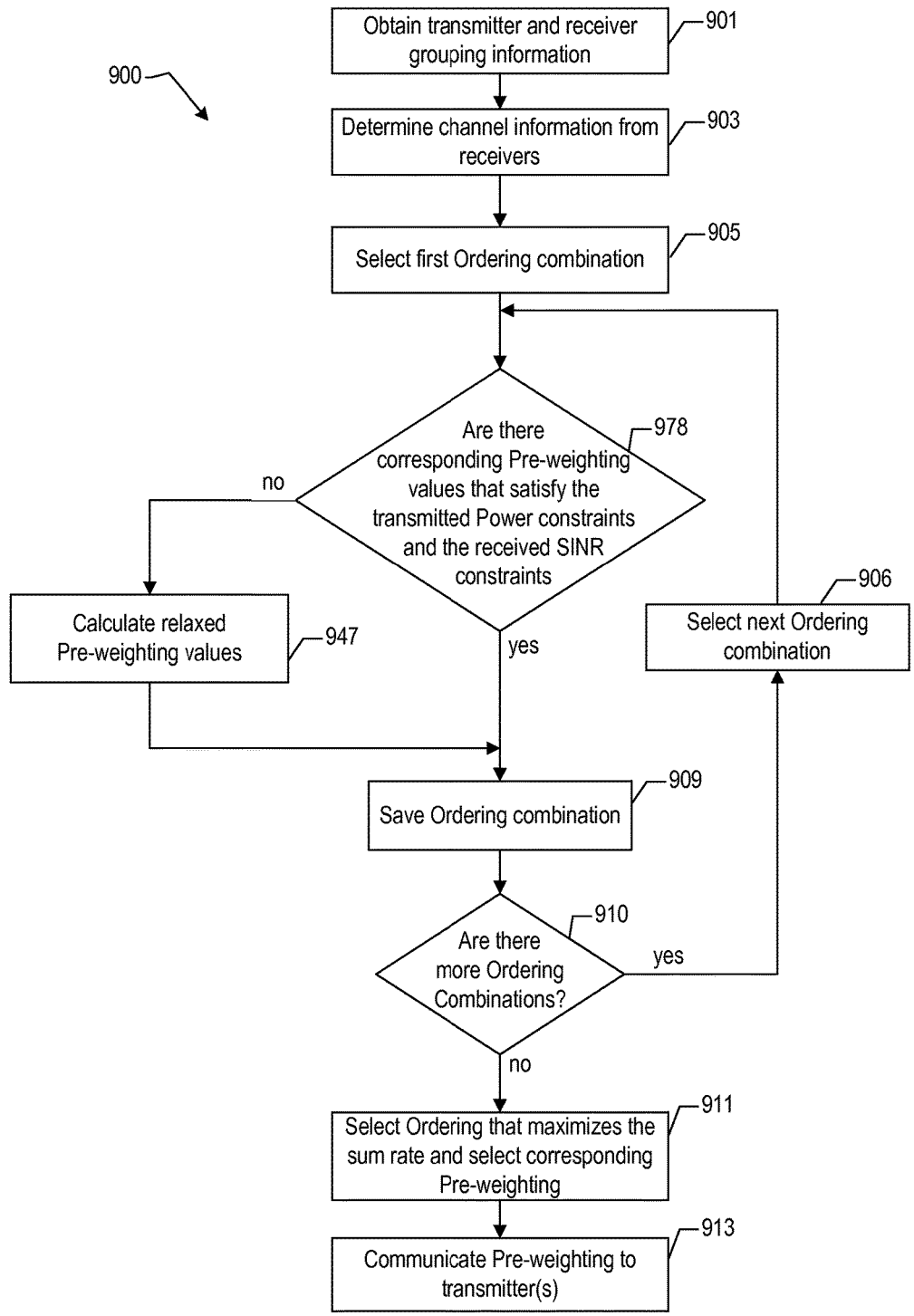
FIG. 9E is a flowchart of an operation for selecting an Ordering combination and calculating its corresponding Pre-weighting values according to aspect of the invention.

FIG. 9E is a flowchart of an operation using a third way for selecting an ordering combination and for calculating the corresponding pre-weighting values according to a third aspect of the invention. The process (Way 3) of FIG. 9E is similar to the process of FIG. 9C with like named steps operating in like fashion except for described differences. The process of FIG. 9E works to calculate pre-weighting values that satisfy the transmit power constraint and the received SINR constraint in one step. Step 978 (reached from step 905 or 906 which select the next ordering combination) calculates the pre-weighting values which correspond to the selected ordering combination and which satisfy both the received SINR constraint and the transmit power constraint. From step 978, if the received SINR constraint and the transmit power constraint are both satisfied, the process continues to step 909 (where evaluation results are saved); otherwise, the process continues to step 917 where relaxed pre-weighting values are calculated.

Figure 9F:
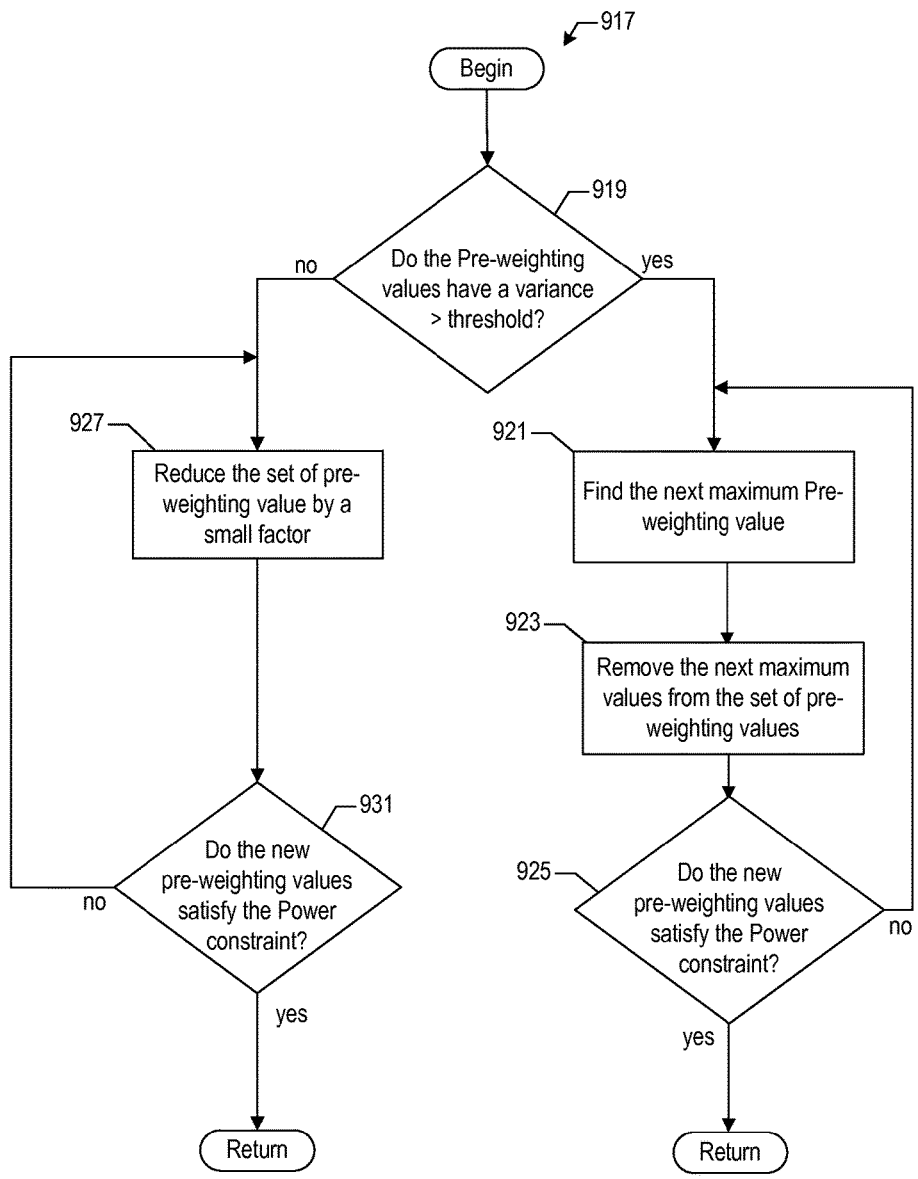
FIG. 9F is a flowchart of an operation to relax the minimum performance constraint according to an aspect of the invention.

FIG. 9F is a flowchart of an operation for relaxing the minimum performance constraint (e.g., received SINR) according to an aspect of the invention. The process of FIG. 9F may be used to implement step 917 in the process of FIG. 9C. The first step 919 examines the variance of the calculated pre-weighting values. If the variance is larger than a pre-specified threshold, the process continues to step 921. Step 921 finds the maximum value among all calculated pre-weighting values. This value is removed in step 923 from the set of calculated pre-weighting values, and the power constraint is tested in step 925 with the new set of relaxed pre-weighting values. If the power constraint is satisfied the process returns; otherwise, the process returns to step 921 to keep removing the maximum values of the remaining pre-weighting values, one by one.

If, in step 919, the variance is smaller than or equal to the pre-specified threshold, the process continues to step 927. Step 927 reduces the set of pre-weighting values by a small factor generating a new set of relaxed pre-weighting values. The power constraint is tested in step 931 with the new set of relaxed pre-weighting values. If the power constraint is satisfied, the process returns; otherwise, the process returns to step 927 to further reduce the set of pre-weighting values by the small factor, with the process continuing until the power constraint is satisfied.

Figure 9G:
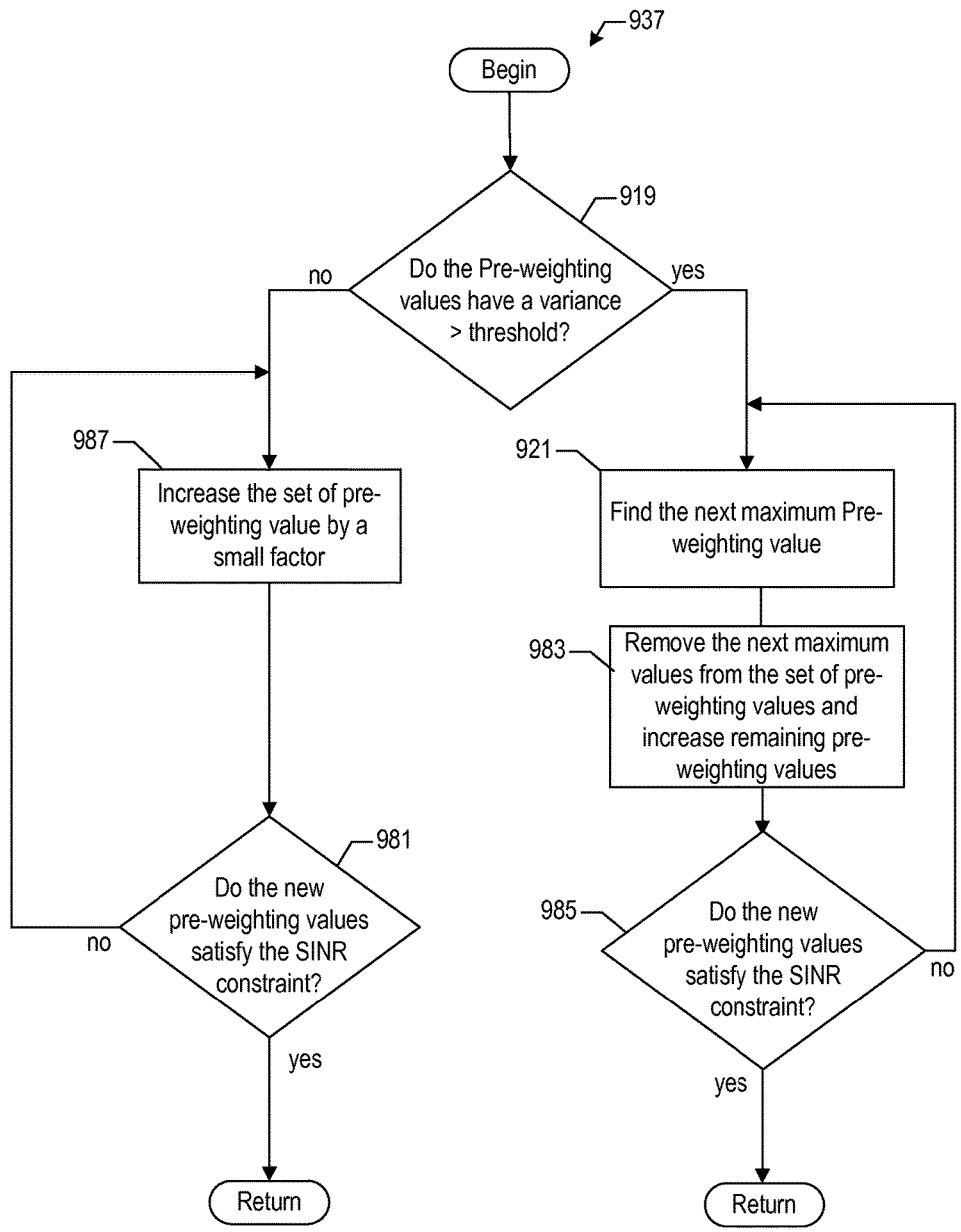
FIG. 9G is a flowchart of an operation for calculating pre-weighting values using relaxed constraints according to an aspect of the invention.

FIG. 9G is a flowchart of an operation for calculating pre-weighting values using relaxed constraints (e.g., transmit power) according to an aspect of the invention. The process of FIG. 9G is similar to the process of FIG. 9F with like named steps operating in like fashion except for described differences. The process of FIG. 9G may be used to implement step 937 in the process of FIG. 9D. The first step 919 examines the variance of the calculated pre-weighting values. If the variance is larger than a pre-specified threshold, the process continues to step 921. Step 921 finds the maximum value among all calculated pre-weighting values. This pre-weighting value is removed in step 983 from the set of calculated pre-weighting values. The remaining weighting values are increased by a corresponding amount. In step 985, the SINR constraint is tested with the new set of relaxed pre-weighting values. If the SINR constraint is satisfied, the process returns; otherwise, the process returns to step 921 to keep removing the maximum values of the remaining pre-weighting values, one by one.

If, in step 919, the variance is smaller than or equal to the pre-specified threshold, the process continues to step 987. Step 987 increases the set of pre-weighting values by a small factor generating a new set of relaxed pre-weighting values. The SINR constraint is tested in step 981 with the new set of relaxed pre-weighting values. If the SINR constraint is satisfied, the process returns; otherwise, the process returns to step 987 to further increase the set of pre-weighting values by the small factor, with the process continuing until the SINR constraint is satisfied.

Figure 10:
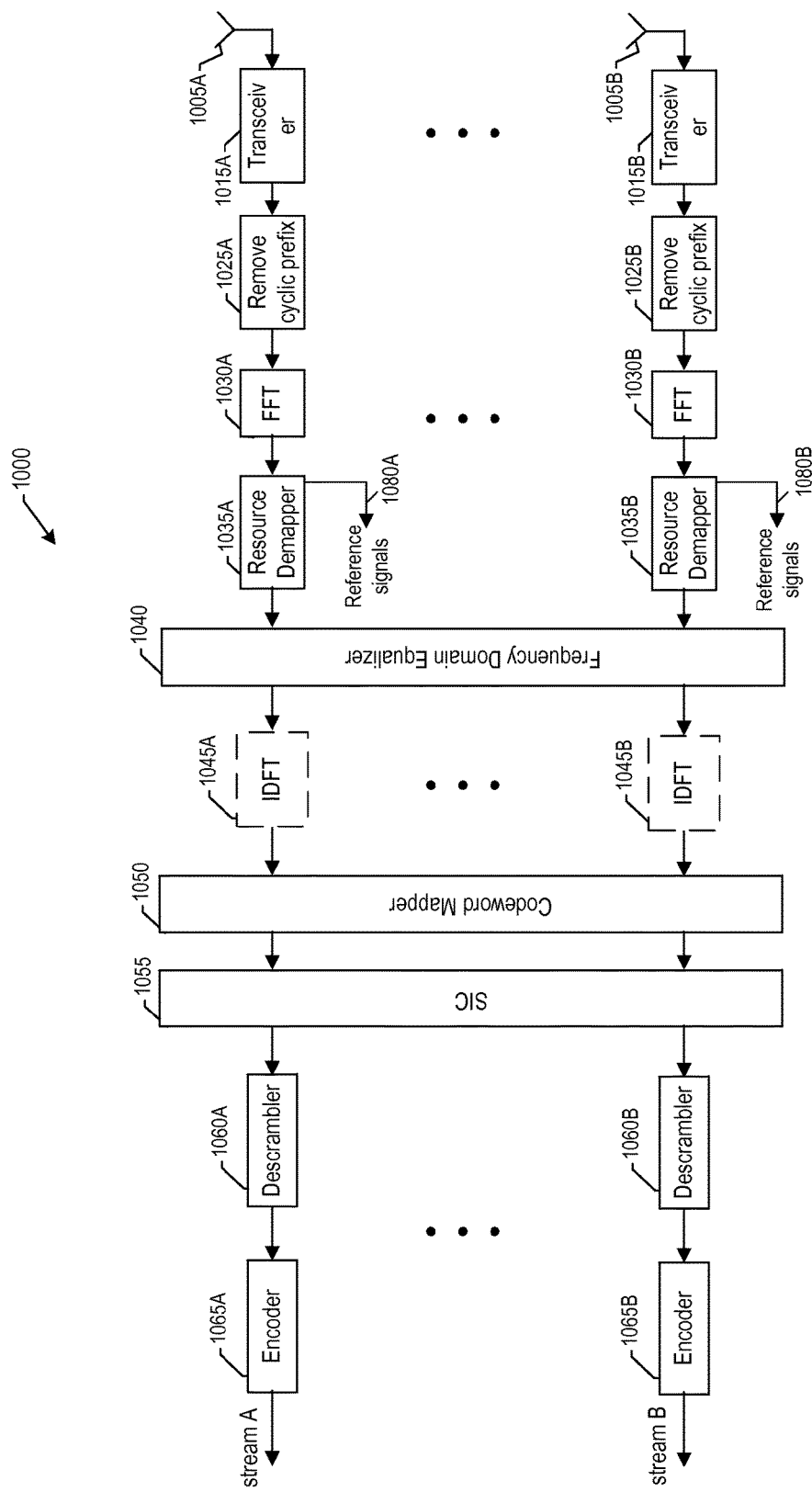
FIG. 10 is a block diagram of MIMO receiver in which aspects of the invention may be implemented.

FIG. 10 is a block diagram of MIMO receiver in which aspects of the invention may be implemented. In FIG. 10, the two receiver chains are operating in a single receiving device. The operation of the receiver depicted in FIG. 10 may be viewed as an extension of the operation of the SISO receiver depicted in FIG. 5A in which the modules depicted in FIG. 5A have similar functions to like named modules in FIG. 10. Certain functions in FIG. 10, such as frequency domain equalizer 1040, codeword mapper 1050 and SIC detector 1055 may process signals received by both antennas in order to properly reconstruct data streams A and B, as understood by one skilled in the art.

Figures 11A, 11B, 11C:
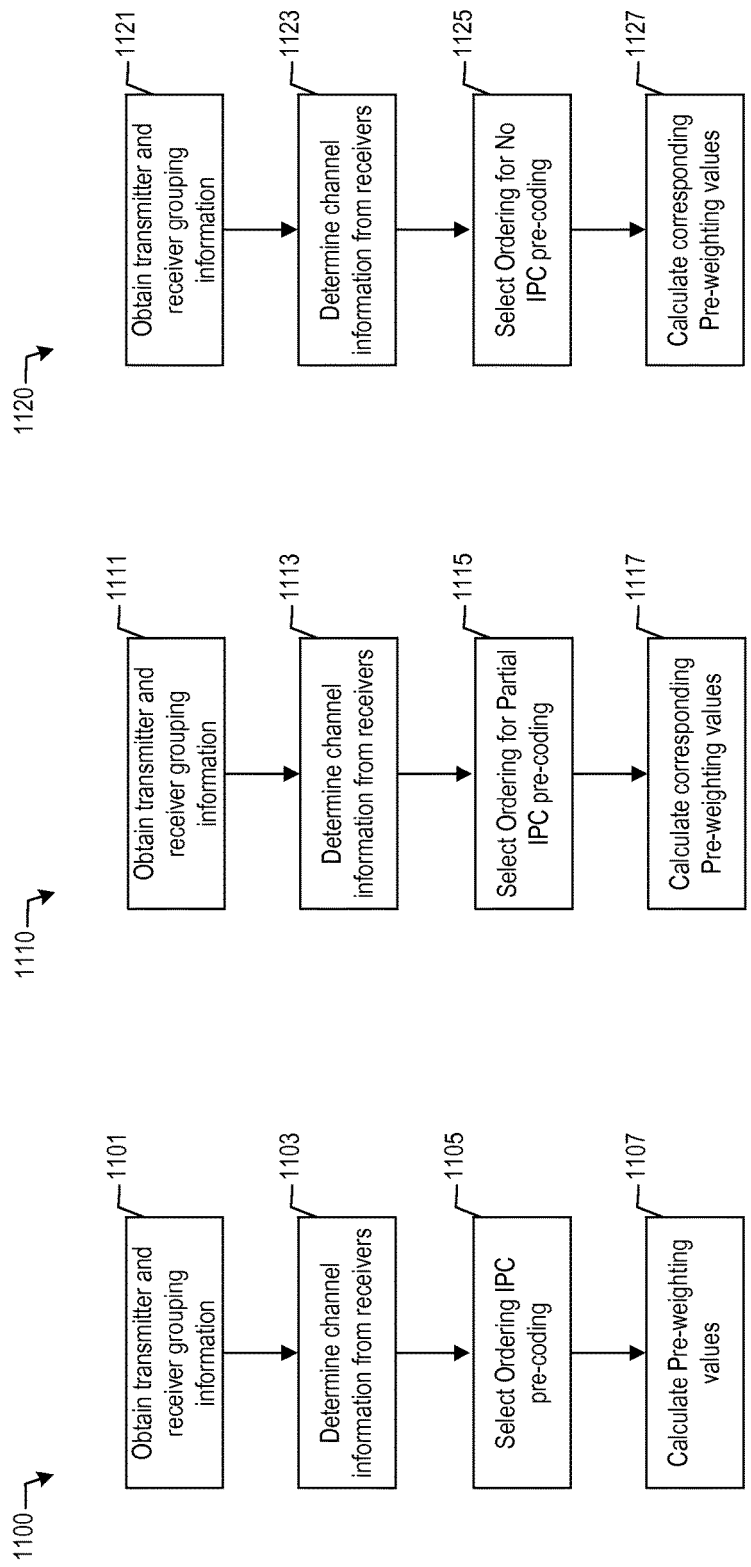
FIG. 11A is a flowchart of Ordering combination for Iterative Pre-Cancellation (IPC) Pre-coding followed by calculation of corresponding Pre-weighting values according to an aspect of the invention.
FIG. 11B is a flowchart of Ordering combination for Partial IPC Pre-coding followed by calculation of corresponding Pre-weighting values according to an aspect of the invention.
FIG. 11C is a flowchart of Ordering combination for No IPC Pre-coding followed by calculation of corresponding Pre-weighting values according to an aspect of the invention.

FIG. 11A is a flowchart for operation of an Iterative Pre-Cancellation (IPC) transmitter. The first step 1101 obtains the transmitter and receiver grouping information. This is followed by step 1103, which determines the channel information from the receivers. Step 1105 selects the ordering combination for IPC pre-coding. This is followed by step 1107, which calculates the pre-weighting values corresponding to the selected ordering combination. Step 1105 and step 1107 may be performed using, for example, the processes of FIGS. 9A-F.

FIG. 11B is a flowchart for operation of a Partial IPC transmitter. The first step 1111 obtains the transmitter and receiver grouping information. This is followed by step 1113, which determines the channel information from the receivers. Step 1115 selects the ordering combination for Partial IPC pre-coding. This is followed by step 1117, which calculates the pre-weighting values corresponding to the selected ordering combination. Step 1115 and step 1117 may be performed using, for example, the processes of FIGS. 9A-F.

FIG. 11C is a flowchart for operation of a No IPC transmitter. The first step 1121 obtains the transmitter and receiver grouping information. This is followed by step 1123, which determines the channel information from the receivers. Step 1125 selects the ordering combination for No IPC pre-coding. This is followed by step 1127, which calculates the pre-weighting values corresponding to the selected ordering combination. Step 1125 and step 1127 may be performed using, for example, the processes of FIGS. 9A-F.

FIG. 12A is a flowchart of the application of the pre-weighting values that are obtained according to the steps shown in FIG. 11A to a signal intended for transmission according to an aspect of the invention. In FIG. 12A, the first step 1201 receives the pre-weighting value, which is applied to the signal to be transmitted. In the second step 1203, IPC pre-coding is applied to the transmit signal. In the third step 1205, the IPC pre-coded transmit signal is pre-weighted according to the pre-weighting values in first step 1201. In the fourth step 1207, the IPC pre-coded pre-weighted signal is transmitted. Often, the purpose of applying IPC pre-coding in step 1203 to the transmit signal in FIG. 12A is to pre-compensate for the effects of the channel by pre-diagonalizing the channel matrix. Accordingly, IPC pre-coding may be referred to as precoding for diagonalization or similar terms and, when used with MU-MIMO, MU-MIMO precoding for diagonalization. It should be appreciated that, in other aspects, the steps of FIG. 12A can be implemented in a different order. For example, in an aspect, the pre-weighting of step 1205 can be performed before the pre-coding of step 1203.

FIG. 12B is a flowchart of the application of the pre-weighting values that are obtained according to the steps shown in FIG. 11B to a signal intended for transmission according to an aspect of the invention. In FIG. 12B, the first step 1211 receives the pre-weighting value, which is applied to the signal to be transmitted. In the second step 1213, Partial IPC pre-coding is applied to the transmit signal. In the third step 1215, the Partial IPC pre-coded transmit signal is pre-weighted according to the pre-weighting values in first step 1211. In the fourth step 1217, the Partial IPC pre-coded pre-weighted signal is transmitted. Often, the purpose of applying partial IPC pre-coding in step 1213 to the transmit signal in FIG. 12B is to partially pre-compensate for the effects of the channel by pre-block diagonalizing the channel matrix. Accordingly, partial IPC pre-coding may be referred to as precoding for block diagonalization or similar and, when used with MU-MIMO, MU-MIMO precoding using a block diagonalization function. It should be appreciated that, in other aspects, the steps of FIG. 12B can be implemented in a different order. For example, in an aspect, the pre-weighting of step 1215 can be performed before the pre-coding of step 1213.

FIG. 12C is a flowchart of the application of the pre-weighting values that are obtained according to the steps shown in FIG. 11C to a signal intended for transmission according to an aspect of the invention. In FIG. 12C, the first step 1221 receives the pre-weighting value, which are applied to the signal to be transmitted. In the second step 1223, No IPC pre-coding is applied to the transmit signal. In the third step 1225, the No IPC pre-coded transmit signal is pre-weighted according to the pre-weighting values in first step 1221. In the fourth step 1227, the No IPC pre-coded pre-weighted signal is transmitted. Often, the purpose of applying No IPC pre-coding in step 1223 to the transmit signal in FIG. 12C is to ignore the effects of the channel by not pre-diagonalizing the channel matrix. It should be appreciated that, in other aspects, the steps of FIG. 12C can be implemented in a different order. For example, in an aspect, the pre-weighting of step 1225 can be performed before the pre-coding of step 1223.

UL MU-MIMO Network:

We now consider an Uplink Multi-User MIMO (UL MU-MIMO) network. Since the network is an MU network, we assume that a number, $U_t$, of transmitting devices (e.g., terminal nodes) are assigned to communicate simultaneously and use overlapping resource elements with a number, $U_r$, of receiving devices (e.g., access nodes). Throughout this description, various assumptions are made, for example, to explain aspects or simplify analyses; however, the disclosed systems and methods may be still used in applications where the assumptions may not hold. Since the network is a MIMO network, we assume that the $v^{th}$ transmitting device (terminal node) contains a number, $N_t^v$, of transmit antennas and that the $w^{th}$ receiving device (access node) contains a number, $N_r^w$, of receive antennas. In other words, the $U_t$ transmitting devices (terminal nodes) transmit simultaneously $N_t$ signal elements at a time (i.e. during one epoch, for example, one symbol in an LTE system) across a communications channel using a total of $N_t$ transmit antennas (i.e. one signal element per transmit antenna), and the $U_r$ receiving devices (access nodes) receive simultaneously the $N_t$ signal elements over a total of $N_r$ receive antennas, where $$N_t \triangleq N_t^1 + \ldots + N_t^{U_t} \text{ and } N_r \triangleq N_r^1 + \ldots + N_r^{U_r}$$

assuming that the propagation time is negligible. We refer to a transmit antenna simply as a Tx and to a receive antenna simply as an Rx.

Equivalently, the $U_t$ transmitting devices (terminal nodes) transmit $U_t$ pre-weighted signal vectors, $\vec{\alpha}'^1, \ldots, \vec{\alpha}'^{U_t}$ (e.g., the signals at transmit antennas 305, 307), at a time, i.e. one pre-weighted signal vector per transmitting device (terminal node) and one pre-weighted signal element per Tx. The $v^{th}$ transmitting device (terminal node), transmits a pre-weighted signal vector, $\vec{\alpha}'^v$, which consists of $N_t^v$ pre-weighted signal elements. The $m^{th}$ element, $\alpha'^v_m$, in $\vec{\alpha}'^v$ is defined as $$\alpha'^v_m \triangleq \gamma^v_m \alpha^v_m$$

where $\gamma^v_m$ is the $m^{th}$ pre-weighting element in $\vec{\gamma}^v$;

$\vec{\gamma}^v \equiv N^v \times 1$ pre-weighting vector corresponding to the $v^{th}$ transmitting device (terminal node); note that "N" as used here is the equivalent of $N_t$ as defined above;

$\alpha^v_m$ is the $m^{th}$ signal element in a signal vector; and $\vec{\alpha}^v \equiv N^v \times 1$ signal vector corresponding to the $v^{th}$ transmitting device (terminal node); note that "N" as used here is the equivalent of $N_t$ as defined above.

The signal vector $\vec{\alpha}^v$ represents an information vector, $\vec{\zeta}^v$, which consists of $N^v$ elements. The relationship between the signal vector $\vec{\alpha}^v$, and the information vector, $\vec{\zeta}^v$, can be represented using either a linear function or a non-linear function. Examples of such functions include an encoder function, a scrambler function, and an inter-leaver function.

The $w^{th}$ receiving device (access node) receives a received signal vector, $\vec{\beta}^w$ (e.g., the signals at receive antennas 315, 317), consisting of $N_r^w$ received signal elements, over $N_r^w$ Rxs, i.e. one received signal element per Rx. The communications channel between all $N_t^v$ Txs (terminal node antennas) and the $N_r^w$ Rxs (access node antennas) is assumed to be flat fading linear time-invariant (LTI) during one epoch, with additive white Gaussian Noise (AWGN), i.e. the channel can be characterized using the sub-matrices, $h_{Ch}^{w,1}, \ldots, h_{Ch}^{w,U_t}$ and the noise can be characterized using a noise vector, $\vec{\theta}^w$, during one epoch. When the channel is frequency-selective, it can be converted to a flat fading channel in the frequency-domain using cyclic prefix as is done with OFDM. The relationship between $\vec{\beta}^w$ and $$\begin{bmatrix} \vec{\alpha}'^1 \\ \vdots \\ \vec{\alpha}'^{U_t} \end{bmatrix} \triangleq \vec{\alpha}'$$

during one epoch is therefore assumed to be $$\vec{\beta}^w = \sum_{v=1}^{U_t} h_{Ch}^{w,v} \vec{\alpha}'^v + \vec{\theta}^w \quad (1a)$$

$$= [h_{Ch}^{w,1} \ \ldots \ h_{Ch}^{w,U_t}] \begin{bmatrix} \vec{\alpha}'^1 \\ \vdots \\ \vec{\alpha}'^{U_t} \end{bmatrix} + \vec{\theta}^w \quad (1b)$$

where $h_{Ch}^{w,v} \equiv N_r^w \times N_t^v$ is the Channel sub-matrix between the $v^{th}$ transmitting device (terminal node) and the $w^{th}$ receiving device (access node), which is defined by its $k^{th}$ row and $m^{th}$ column element, $h_{Ch_{k,m}}^{w,v}$;

$h_{Ch_{k,m}}^{w,v}$ represents the complex (time-domain or frequency-domain) attenuation of the flat fading linear time-invariant wireless channel connecting the $m^{th}$ transmit antenna (Tx) of the $v^{th}$ transmitting device to the $k^{th}$ receive antenna (Rx) of the $w^{th}$ receiving device for $1 \le m \le N_t^v$, $1 \le k \le N_r^w$, $1 \le v \le U_t$, and $1 \le w \le U_r$;

$\vec{\alpha}'^v \equiv N_t^v \times 1$ is the pre-weighted signal vector for the $v^{th}$ transmitting device, which is defined by its $m^{th}$ pre-weighted signal element, $\alpha'^v_m$;

$\alpha'^v_m \triangleq \gamma^v_m \alpha^v_m$ is defined as the pre-weighted signal element, input to the $m^{th}$ Tx of the $v^{th}$ transmitting device, where $\alpha^v_m$ is the signal element and $\gamma^v_m$ is the pre-weighting element with $1 \le m \le N_t^v$ and $1 \le v \le U_t$; in the transmitter chains of FIG. 4, $\alpha^v_m$ may be the outputs of the FFT/DFT modules 414, 424 and $\alpha'^v_m$ may be the input to the pre-coder modules 416, 426;

$$\vec{\beta}^w \triangleq \begin{bmatrix} \beta_1^w \\ \vdots \\ \beta_{N_r^w}^w \end{bmatrix} \equiv N_r^w \times 1$$

is the received signal vector of the $w^{th}$ receiving device (access node) using $N_r^w$ Rxs, i.e. one element per Rx;

$$\vec{\alpha}'^v \triangleq \begin{bmatrix} \alpha'^v_1 \\ \vdots \\ \alpha'^v_{N_t^v} \end{bmatrix} \equiv N_t^v \times 1$$

is the pre-weighted signal vector from the $v^{th}$ transmitting device (terminal node) for $1 \le v \le U_t$, one element per Tx;

$$\vec{\alpha}^v \triangleq \begin{bmatrix} \alpha^v_1 \\ \vdots \\ \alpha^v_{N_t^v} \end{bmatrix} \equiv N_t^v \times 1$$

is the signal vector consisting of $N_t^v$ signal elements intended to be transmitted by the $v^{th}$ transmitting device (terminal node) using $N_t^v$ Txs, i.e. one signal element per Tx;

$$\vec{\varsigma} \triangleq \begin{bmatrix} s_1 \\ \vdots \\ s_N \end{bmatrix} \equiv N \times 1$$

is the information vector consisting of N information elements;

$$\vec{\gamma}^v \triangleq \begin{bmatrix} \gamma^v_1 \\ \vdots \\ \gamma^v_{N_t^v} \end{bmatrix} \equiv N_t^v \times 1$$

is the pre-weighting vector for the $v^{th}$ transmitting device (terminal node);

$$\vec{\theta}^w \triangleq \begin{bmatrix} \theta_1^w \\ \vdots \\ \theta_{N_r^w}^w \end{bmatrix} \equiv N_r^w \times 1$$

is the noise contaminating the output of the $w^{th}$ receiving device (access node) over the $N_r^w$ Rxs, i.e. one noise element per Rx;

$N_t^v$ is the number of Txs in the $v^{th}$ transmitting device (terminal node) for $1 \le v \le U_t$;

$N_r^w$ is the number of Rxs in the $w^{th}$ receiving device (access node) for $1 \le w \le U_r$; and $$N \triangleq N^1 + \ldots + N^{U_t}$$

is the number of information elements in the information vector $\vec{\varsigma}$. Equation (1b) can be re-written as follows:

$$\vec{\beta}^w = h_{Ch}^w \begin{bmatrix} \vec{\alpha}'^1 \\ \vdots \\ \vec{\alpha}'^{U_t} \end{bmatrix} + \vec{\theta}^w \quad (1c)$$

where $$h_{Ch}^w \triangleq [h_{Ch}^{w,1} \ \ldots \ h_{Ch}^{w,U_t}] \equiv N_r^w \times N_t$$

represents the communications Channel over which all $U_t$ transmitting devices (terminal nodes) transmit via their $N_t$ Txs to the $w^{th}$ receiving device (access node); and $$N_t \triangleq N_t^1 + \ldots + N_t^{U_t}$$

is the total number of Txs in the network.

Equations (1c) can be re-written to include the entire communications network, i.e. to include all $U_r$ receiving devices with all their $N_r$ Rxs as follows:

$$\begin{bmatrix} \vec{\beta}^1 \\ \vdots \\ \vec{\beta}^{U_r} \end{bmatrix} = \begin{bmatrix} h_{Ch}^{1,1} & \ldots & h_{Ch}^{1,U_t} \\ \vdots & \ddots & \vdots \\ h_{Ch}^{U_r,1} & \ldots & h_{Ch}^{U_r,U_t} \end{bmatrix} \begin{bmatrix} \vec{\alpha}'^1 \\ \vdots \\ \vec{\alpha}'^{U_t} \end{bmatrix} + \begin{bmatrix} \vec{\theta}^1 \\ \vdots \\ \vec{\theta}^{U_r} \end{bmatrix} \quad (2a)$$

$$= h_{Ch} \begin{bmatrix} \vec{\alpha}'^1 \\ \vdots \\ \vec{\alpha}'^{U_t} \end{bmatrix} + \begin{bmatrix} \vec{\theta}^1 \\ \vdots \\ \vec{\theta}^{U_r} \end{bmatrix}$$

where $$h_{Ch} \triangleq \begin{bmatrix} h_{Ch}^1 \\ \vdots \\ h_{Ch}^{U_r} \end{bmatrix} = \begin{bmatrix} h_{Ch}^{1,1} & \cdots & h_{Ch}^{1,U_t} \\ \vdots & \ddots & \vdots \\ h_{Ch}^{U_r,1} & \cdots & h_{Ch}^{U_r,U_t} \end{bmatrix} \equiv N_r \times N_t$$

is referred to as the Channel matrix defined by its sub-matrix, $h_{Ch}^{w,v}$, which is located at the $w^{th}$ column block and at the $v^{th}$ row block of $h_{Ch}$;

- sub-matrix $h_{Ch}^{w,v}$ connects the $v^{th}$ transmitting device (terminal node) to the $w^{th}$ receiving device (access node) via the various Txs in the $v^{th}$ transmitting device (terminal node) and the various Rxs in the $w^{th}$ receiving device (access node), for $1 \leq v \leq U_t$, and $1 \leq w \leq U_r$;
- $N_r^w$ is the total number of received signal elements in $\vec{\beta}^w$, at the $w^{th}$ receiving device (access node) for $1 \leq w \leq U_r$;
- $N_t^v$ is the total number of pre-weighted signal elements, $\vec{\alpha}'^v$, transmitted at the $v^{th}$ transmitting device (user) for $1 \leq v \leq U_t$;
- $N_r$ is the total number of received signal elements $$\begin{bmatrix} \vec{\beta}^1 \\ \vdots \\ \vec{\beta}^{U_r} \end{bmatrix} \triangleq \vec{\beta}$$

across all $U_r$ receiving devices (access nodes); and $N_t$ is the total number of transmitted pre-weighted signal elements $$\begin{bmatrix} \vec{\alpha}'^1 \\ \vdots \\ \vec{\alpha}'^{U_t} \end{bmatrix} \triangleq \vec{\alpha}'$$

across all $U_t$ transmitting devices (terminal nodes).

Equation (2a) can be re-written in a simpler form as follows $$\begin{bmatrix} \beta_1 \\ \vdots \\ \beta_{N_r} \end{bmatrix} = h_{Ch} \begin{bmatrix} \alpha'_1 \\ \vdots \\ \alpha'_{N_t} \end{bmatrix} + \begin{bmatrix} \theta_1 \\ \vdots \\ \theta_{N_r} \end{bmatrix} \quad (2b)$$

$$= h_{Ch} \begin{bmatrix} \alpha_1 \gamma_1 \\ \vdots \\ \alpha_{N_t} \gamma_{N_t} \end{bmatrix} + \begin{bmatrix} \theta_1 \\ \vdots \\ \theta_{N_r} \end{bmatrix} \quad (2c)$$

where $$\begin{bmatrix} \beta_1 \\ \vdots \\ \beta_{N_r} \end{bmatrix} \triangleq \begin{bmatrix} \vec{\beta}^1 \\ \vdots \\ \vec{\beta}^{U_r} \end{bmatrix} \triangleq \vec{\beta}$$

where the $U_r$ vectors, $$\begin{bmatrix} \vec{\beta}^1 \\ \vdots \\ \vec{\beta}^{U_r} \end{bmatrix},$$

are converted into $N_r$ elements, $$\begin{bmatrix} \beta_1 \\ \vdots \\ \beta_{N_r} \end{bmatrix};$$

$$\begin{bmatrix} \alpha'_1 \\ \vdots \\ \alpha'_{N_t} \end{bmatrix} \triangleq \begin{bmatrix} \vec{\alpha}'^1 \\ \vdots \\ \vec{\alpha}'^{U_t} \end{bmatrix} \triangleq \vec{\alpha}'$$

where the $U_t$ vectors, $$\begin{bmatrix} \vec{\alpha}'^1 \\ \vdots \\ \vec{\alpha}'^{U_t} \end{bmatrix},$$

are converted into $N_t$ elements, $$\begin{bmatrix} \alpha'_1 \\ \vdots \\ \alpha'_{N_t} \end{bmatrix};$$

and $$\begin{bmatrix} \theta_1 \\ \vdots \\ \theta_{N_r} \end{bmatrix} \triangleq \begin{bmatrix} \vec{\theta}^1 \\ \vdots \\ \vec{\theta}^{U_r} \end{bmatrix} \triangleq \vec{\theta}$$

where the $U_r$ vectors, $$\begin{bmatrix} \vec{\theta}^1 \\ \vdots \\ \vec{\theta}^{U_r} \end{bmatrix},$$

are converted into $N_r$ elements, $$\begin{bmatrix} \theta_1 \\ \vdots \\ \theta_{N_r} \end{bmatrix}.$$

Similarly, we can convert the $U_t$ vectors, $$\begin{bmatrix} \vec{\alpha}^1 \\ \vdots \\ \vec{\alpha}^{U_t} \end{bmatrix},$$

into $N_t$ elements, $$\begin{bmatrix} \alpha_1 \\ \vdots \\ \alpha_{N_t} \end{bmatrix} \triangleq \vec{\alpha},$$

and the $U_t$ vectors, $$\begin{bmatrix} \vec{\gamma}^1 \\ \vdots \\ \vec{\gamma}^{U_t} \end{bmatrix},$$

into $N_t$ elements, $$\begin{bmatrix} \gamma_1 \\ \vdots \\ \gamma_{N_t} \end{bmatrix} \triangleq \vec{\gamma}.$$

The presently disclosed systems and methods work to improve the overall performance of the communication system represented by Equation (2c) by selecting the $N_t$ pre-weighting elements, $$\begin{bmatrix} \gamma_1 \\ \vdots \\ \gamma_{N_t} \end{bmatrix},$$

corresponding to the $N_t$ signal elements $$\begin{bmatrix} \alpha_1 \\ \vdots \\ \alpha_{N_t} \end{bmatrix}$$

communicated between the $N_t$ Txs and the $N_r$ Rxs during one epoch, under (a) a (maximum) Power constraint defined as $$|\alpha_1\gamma_1|^2 + \ldots + |\alpha_{N_t}\gamma_{N_t}|^2 \leq P$$

where P is a pre-specified fixed value and (b) a (minimum) Performance constraint for each transmitting device. Improving the overall performance of a communications system can be accomplished in many ways, such as by increasing its overall bandwidth efficiency or by increasing its overall power efficiency, while maintaining a reasonable overall complexity. A compromise between both types of efficiencies is to increase the sum rate, $R_1 + \ldots + R_N$, of the system where $R_m$ is the rate of transmission of the $m^{th}$ signal element $\alpha_m$. Assuming that the communications system consists of N parallel channels, i.e. one channel per information element, then $R_m$ is obtained as $$R_m = w_m \log_2(1 + \eta_m) \quad (3)$$

where
  $w_m$ is the equivalent bandwidth of the $m^{th}$ information element $\zeta_m$; and
  $\eta_m$ is the equivalent received Signal-to-Noise Ratio (SNR) corresponding to the $m^{th}$ information element $\zeta_m$ that is transmitted using $N_t$ Txs over the communication channel that is characterized by the matrix, $h_{Ch}$, and which is received by $N_r$ Rxs as part of the received signal vector $$\begin{bmatrix} \beta_1 \\ \vdots \\ \beta_{N_r} \end{bmatrix}.$$

The sum rate, $R_1 + \ldots + R_N$, defined by Equation (3), of the communications system in Equation (2c), is a theoretical upper bound, also referred to as Shannon Channel Capacity. The Channel matrix, $h_{Ch}$, as well as the Method of reception, that is used by the $N_r$ receiving devices, determines whether the bound is reached or not. Some Methods of reception have a low complexity but are sub-optimal, i.e. their corresponding sum rate as defined by Equation (3) cannot be generally reached, while other methods can be close to optimal, but have a high complexity. The presently disclosed systems and methods use a reasonable-complexity (asymptotically) optimal non-linear Method of Reception, referred to as SIC (e.g., performing using process 700 of FIG. 7 and by the SIC detector 1055 of FIG. 10).

In summary, the UL MU-MIMO aspects of the presently disclosed systems and methods intend to increase the sum rate, $R_1 + \ldots + R_N$, as defined by Equation (3) for an Uplink (UL) MU-MIMO system by applying (at the transmitting devices) $N_t$ selected pre-weighting elements, $$\begin{bmatrix} \gamma_1 \\ \vdots \\ \gamma_{N_t} \end{bmatrix},$$

corresponding to the $N_t$ signal elements $$\begin{bmatrix} \alpha_1 \\ \vdots \\ \alpha_{N_t} \end{bmatrix}$$

to be transmitted, and by receiving the transmitted signals using SIC method as described in process 700 of FIG. 7 (and shown in FIG. 10 at SIC module 1055) at the receiving devices. The selection of $$\begin{bmatrix} \gamma_1 \\ \vdots \\ \gamma_{N_t} \end{bmatrix}$$

(e.g., as described with reference to step 607) is made under a (maximum) transmitted Power and a (minimum) Performance (sum rate) constraint. The DL MU-MIMO aspects of the presently disclosed systems and methods intend to increase the sum rate, $R_1 + \ldots + R_N$, as defined by Equation (3) for a Downlink (DL) MU-MIMO system by applying (at the transmitting devices) $N_t$ selected pre-weighting elements, $$\begin{bmatrix} \gamma_1 \\ \vdots \\ \gamma_{N_t} \end{bmatrix},$$

corresponding to the $N_t$ signal elements $$\begin{bmatrix} \alpha_1 \\ \vdots \\ \alpha_{N_t} \end{bmatrix}$$

to be transmitted with Interference Pre-Cancellation (IPC), partial IPC or no IPC, and by receiving the transmitted signals using SIC (e.g., as described with reference to process 700 and SIC detector 1055) partial SIC or no SIC at the receiving devices. Once again, the selection of $$\begin{bmatrix} \gamma_1 \\ \vdots \\ \gamma_{N_t} \end{bmatrix}$$

is made under a (maximum) transmitted Power and a (minimum) Performance (sum rate) constraint. Before showing pre-weighting methods for both UL and DL aspects of the presently disclosed systems and methods, we review the general concepts of Channel estimation in UL MU-MIMO and the various Methods of reception that are generally available for MU-MIMO, even though both concepts should be familiar to a person skilled in the art.

Channel Estimation in UL MU-MIMO:

The full knowledge of the channel matrix, $h_{Ch}$, at a receiving device (access node) is sometimes referred to as Channel Side Full Information at Receiver (CSFIR) which is defined as estimating at all $U_r$ receiving devices (access nodes), the communications channel matrix $h_{Ch}$ between all transmitting devices and all receiving devices. This is possible as long as all the $U_r$ receiving devices (access nodes) are able to cooperate. As used herein, "all" may generally refer to the set of interest. The partial knowledge of the channel matrix, $h_{Ch}^w$, at a receiving device (access node) is sometimes referred to as Channel Side Partial Information at Receiver (CSPIR) which is defined as estimating at the $w^{th}$ receiving device (access nodes), the communications network matrix, $h_{Ch}^w$, between all transmitting devices and the $w^{th}$ receiving device and of the interference that is sensed by the $w^{th}$ receiving device.

Methods of Reception in MU-MIMO:

The Method of Reception in a MU-MIMO communications system is the method of extracting the information elements in the information vector $$\begin{bmatrix} s_1 \\ \vdots \\ s_N \end{bmatrix},$$

from the received signal vector $$\begin{bmatrix} \beta_1 \\ \vdots \\ \beta_{N_r} \end{bmatrix},$$

based on
Equation (2c) and
the 1:1 function which relates the information vector $$\begin{bmatrix} s_1 \\ \vdots \\ s_N \end{bmatrix}$$

to the signal vector $$\begin{bmatrix} \alpha_1 \\ \vdots \\ \alpha_{N_t} \end{bmatrix}$$

via a reverse function. Examples of the 1:1 reverse function include a de-coder, a de-scrambler, and a de-inter-leaver.

The Method of reception is generally divided into two parts. The first part includes extracting the signal vector $$\begin{bmatrix} \alpha_1 \\ \vdots \\ \alpha_{N_t} \end{bmatrix}$$

from the received signal vector $$\begin{bmatrix} \beta_1 \\ \vdots \\ \beta_{N_r} \end{bmatrix},$$

while the second part includes extracting the information vector $$\begin{bmatrix} s_1 \\ \vdots \\ s_N \end{bmatrix}$$

from the signal vector $$\begin{bmatrix} \alpha_1 \\ \vdots \\ \alpha_{N_t} \end{bmatrix}.$$

The first part is a classical linear algebra problem which includes solving for a number of $N_t$ unknowns, $$\begin{bmatrix} \alpha_1 \\ \vdots \\ \alpha_{N_t} \end{bmatrix},$$

using a set of $N_r$ linear equations, $$\begin{bmatrix} \beta_1 \\ \vdots \\ \beta_{N_r} \end{bmatrix}.$$

The fact that the set of equations is contaminated by noise makes the first part stochastic, and forces it to be an estimation problem in Equation (2c).

The fact that $\zeta_m$ can only take one of a finite number of values makes the second part a detection problem. More specifically, the Method of reception includes two parts:
1. an estimation part, which provides a soft-decision estimation, $\hat{\alpha}'_m$, of $\alpha'_m$ where $\hat{\alpha}'_m$ can take any (complex) value as shown in Equation (2b); and
2. a detection part, which provides a hard-decision detection, $\check{\zeta}_m$, of $\zeta_m$, based on the soft-decision estimation, $\hat{\alpha}'_m$ where detected information element $\check{\zeta}_m$ can take only one of a finite number of (complex) values.

The first part, i.e. the estimation part, of the Method of reception includes providing a soft-decision solution, $$\begin{bmatrix} \hat{\alpha}'_1 \\ \vdots \\ \hat{\alpha}'_{N_t} \end{bmatrix},$$

for the $N_t$ unknowns, $$\begin{bmatrix} \alpha'_1 \\ \vdots \\ \alpha'_{N_t} \end{bmatrix},$$

in Equation (2b) using the set of $N_r$ observed values:

$$\begin{bmatrix} \beta_1 \\ \vdots \\ \beta_{N_r} \end{bmatrix}.$$

From a linear algebra point of view and after ignoring the noise, we have the following three situations:
When $N_t < \mathbb{r}_{Ch}$, where $\mathbb{r}_{Ch}$ is the rank of $h_{Ch}$, the problem is said to be over-determined (i.e. we have more equations than unknowns), which implies that no unique solution exists which satisfies all equations. However, in this case, a solution can be found as a compromising fit between all equations (e.g. a Least Squares fit using a matrix pseudo-inverse).

When $N_t = \mathbb{r}_{Ch}$, the problem is said to be exactly-determined, which implies that a unique solution exists for all $N_t$ unknowns (using a matrix inverse).

When $N_t > \mathbb{r}_{Ch}$, the problem is said to be under-determined (i.e. we have more unknowns than independent equations), which implies that an infinite number of solutions exists. In this case, a solution can be selected which fits a specific need. For example, a system may rely on the second part of the method of reception, i.e. the detection part, since it provides a hard-decision solution, $\check{\alpha}_m$, based on $\hat{\alpha}'_m$. Since $\check{\alpha}_m$ can only take one of a finite number of values, one can select the value, $\check{\alpha}_m$, in the finite set which is closest to $\hat{\alpha}'_m/\gamma_m$ in a Euclidean Distance sense (such as an $\mathcal{L}_2$-norm), or in any other sense (such as an $\mathcal{L}_1$-norm or an $\mathcal{L}_\infty$-norm).

If the method of reception is chosen to be linear, the estimation part generally includes a number of linear operations, while the detection part simply includes a hard-decision detector.

Examples of a Linear Method of Reception Include:
Matrix-based Linear Method of Reception which generally includes two parts:
  an Estimation part, which includes multiplying the set of $N_r$ observed values, $$\begin{bmatrix} \beta_1 \\ \vdots \\ \beta_{N_r} \end{bmatrix},$$

by an estimation matrix, $h_{Est}$ (also sometimes known as filtering or nulling or estimating or equalizing or inverting or deconvolving); and a Detection part, which includes detecting the N unknowns, $$\begin{bmatrix} \varsigma_1 \\ \vdots \\ \varsigma_N \end{bmatrix},$$

using a hard-decision detector.

Mathematically, the estimation matrix, $h_{Est}$, generates an estimated (soft-decision) value of the $\mathbb{r}_{Net}$ unknowns $\hat{\vec{\alpha}}'_{\tau_{Ch}}$ from $$\begin{bmatrix} \beta_1 \\ \vdots \\ \beta_{N_r} \end{bmatrix}$$

as $$\hat{\vec{\alpha}}'_{\tau_{Ch}} = h_{Est} \begin{bmatrix} \beta_1 \\ \vdots \\ \beta_{N_r} \end{bmatrix} \qquad (4a)$$

where
- $\beta_k$ is the received signal element that is received at the $k^{th}$ Rx with $1 \leq k \leq N_r$;
- $h_{Est} \equiv \mathbb{r}_{Ch} \times N_r$ estimation matrix which estimates $\hat{\alpha}'_{r_{Ch}}$ from $$\begin{bmatrix} \beta_1 \\ \vdots \\ \beta_{N_r} \end{bmatrix};$$

- $\hat{\alpha}'_{r_{Ch}} \equiv \mathbb{r}_{Ch} \times 1$ is the estimated pre-weighted signal vector; and
- $\mathbb{r}_{Ch}$ is the rank of the Channel matrix $h_{Ch}$.

By substituting $$\begin{bmatrix} \beta_1 \\ \vdots \\ \beta_{N_r} \end{bmatrix}$$

from Equation (2b) in Equation (4a), we obtain $$\hat{\alpha}'_{r_{Ch}} = h_{Est} h_{Ch} \begin{bmatrix} \alpha'_1 \\ \vdots \\ \alpha'_{N_t} \end{bmatrix} + h_{Est} \begin{bmatrix} \theta_1 \\ \vdots \\ \theta_{N_r} \end{bmatrix} \quad (4b)$$

Based on the relationship between $\mathbb{r}_{Ch}$ and $N_t$, we can generally have any one of the following three problems: an over-determined problem, an exactly-determined problem and an under-determined problem. The first two problems have unique solutions for all $N_t$ unknowns, while the third problem provides only unique solutions for up to $\mathbb{r}_{Ch}$ unknowns, forcing the remaining $N_t - \mathbb{r}_{Ch}$ unknowns to be ignored, i.e. to act as interference on the first $\mathbb{r}_{Ch}$ unknowns. That is why the SINR, $\eta_m$, for the $m^{th}$ information element, $\alpha_m$, is used in the presently disclosed systems and methods in Equation (3) as a signal quality indicator instead of its Received Signal Strength Indicator (RSSI) or its Signal-to-Noise Ratio (SNR).

Even though a linear Method of reception is low in complexity, it is often sub-optimal. A non-linear method of reception can offer a significant improvement over a linear one, since in this case, one can obtain unique solutions for all $N_t$ unknowns instead of only for $\mathbb{r}_{Ch}$ unknowns. This is discussed later. First, we show here examples of the estimation matrix, $h_{Est}$:

The Matched Filter (MF) estimation matrix, $$h_{MF} \triangleq h^*_{Ch},$$

is designed to match the Channel matrix $h_{Ch}$, where $h^*_{Ch}$ is the Hermitian of $h_{Ch}$ (conjugate transpose). The MF can be implemented in any domain such as the time domain, the frequency domain or the spatial domain. The MF estimation matrix, $h_{MF}$, is designed to maximize the received SNR. In this case we have $$\hat{\alpha}'_{r_{Ch}} = h_{Est} \begin{bmatrix} \beta_1 \\ \vdots \\ \beta_{N_r} \end{bmatrix} \quad (4c)$$

$$= h_{MF} h_{Ch} \begin{bmatrix} \alpha'_1 \\ \vdots \\ \alpha'_{N_t} \end{bmatrix} + h_{MF} \begin{bmatrix} \theta_1 \\ \vdots \\ \theta_{N_r} \end{bmatrix}$$

$$= h^*_{Ch} h_{Ch} \begin{bmatrix} \alpha'_1 \\ \vdots \\ \alpha'_{N_t} \end{bmatrix} + h^*_{Ch} \begin{bmatrix} \theta_1 \\ \vdots \\ \theta_{N_r} \end{bmatrix}$$

The MF is adequate at low SINR. It is sometimes referred to as Maximum Ratio Combining, or Beam forming.

The Zero Forcing (ZF) estimation matrix, $h_{ZF}$, is designed to satisfy the following identity $$h_{ZF} h_{Ch} = I_{N_t} \quad (5)$$

where $I_{N_t}$ is the $N_t \times N_t$ identity matrix. If $h_{Ch}^{-1}$ exists and $N_t = \mathbb{r}_{Ch}$ (i.e. exactly-determined), then $h_{ZF} = h_{Ch}^{-1}$ satisfies Equation (5). In this case, we have $$\hat{\alpha}'_{r_{Ch}} = h_{ZF} \begin{bmatrix} \beta_1 \\ \vdots \\ \beta_{N_r} \end{bmatrix} = h_{Ch}^{-1} h_{Ch} \begin{bmatrix} \alpha'_1 \\ \vdots \\ \alpha'_{N_t} \end{bmatrix} + h_{Ch}^{-1} \begin{bmatrix} \theta_1 \\ \vdots \\ \theta_{N_r} \end{bmatrix} \quad (4d)$$

On the other hand, when $N_t < \mathbb{r}_{Ch}$ (i.e. $h_{Ch}$ is not square but rectangular), and $(h^*_{Ch} h_{Ch})^{-1}$ exists, then $h_{ZF}$ can be implemented to satisfy Equation (5) as the Moore-Penrose pseudo-inverse matrix, $h_{Ch}^{pinv}$, i.e. $h_{ZF} = h_{Ch}^{pinv}$ which is defined as $$h_{Ch}^{pinv} \triangleq (h^*_{Ch} h_{Ch})^{-1} h^*_{Ch}$$

where $h^*_{Ch}$ is the Hermitian of $h_{Ch}$. In this case, we have $$\hat{\alpha}'_{r_{Ch}} = h_{ZF} \begin{bmatrix} \beta_1 \\ \vdots \\ \beta_{N_r} \end{bmatrix} = h_{Ch}^{pinv} h_{Ch} \begin{bmatrix} \alpha'_1 \\ \vdots \\ \alpha'_{N_t} \end{bmatrix} + h_{Ch}^{pinv} \begin{bmatrix} \theta_1 \\ \vdots \\ \theta_{N_t} \end{bmatrix} \quad (4e)$$

The ZF estimation matrix, $h_{ZF}$, is designed to remove the effects of the Channel matrix, $h_{Ch}$, up to the channel rank, $\mathbb{r}_{Ch}$, regardless of the type of noise contaminating the received signal. In other words, as long as $\mathbb{r}_{Ch} \geq N_t$, the ZF estimation matrix, $h_{ZF}$, is able to entirely remove the effects of the Channel matrix, $h_{Ch}$. In Equations (4d) and (4e), neglecting the effects of the noise can cause noise enhancement due to multiplying the noise by $h_{Ch}^{-1}$ or by $h_{Ch}^{pinv}$ respectively. When $\mathbb{r}_{Ch} < N_t$, $(h^*_{Ch} h_{Ch})^{-1}$ does not exist or $h_{Ch}$ is close to being singular, the ZF matrix is said to be ill-conditioned, and a different matrix must be used. ZF is also referred to as inverse filtering, or deconvolution.

The Minimum Mean Square Error (MMSE) estimation matrix (also sometimes referred to as the Wiener filter), $h_{MMSE}$, is defined as $$h_{MMSE} \triangleq (h^*_{Ch} h_{Ch} + I_{N_t}/\eta)^{-1} h^*_{Ch} \quad (6)$$

where $I_{N_t} \equiv N_t \times N_t$ identity matrix; and $\eta$ is the received SNR.

The MMSE estimation matrix, $h_{MMSE}$, is designed to minimize the mean squared error between the received signal and the transmitted signal. By doing so, it represents a compromise between noise and interference. At high SINR, it approaches the Zero Forcing Filter. At low SINR, it approaches the MF. However, once again, at high SINR, the MMSE estimation matrix, $h_{MMSE}$, can remove the effects of the Channel matrix, $h_{Ch}$, up to the channel rank, $r_{Ch}$.

Transform-based Linear method of reception includes three steps:

applying the Inverse Transform, $\mathfrak{S}^{-1}$, filtering, and detecting using a hard-decision detector.

The Inverse Transform, $\mathfrak{S}^{-1}$, is selected to invert the effects of a transform, $\mathfrak{S}$, that is either explicitely used in the transmitter or implicitly equivalent to multiplexing using a Channel matrix, $h_{Ch}$, while the filtering is designed to invert the effects of the Channel matrix. An example of $\mathfrak{S}$ is the inverse Fourier transform, used in the OFDM TX. In this case, $\mathfrak{S}^{-1}$ is the Fourier transform. OFDM with cyclic convolution converts a frequency-selective channel in the time-domain to a flat fading channel in the frequency-domain. This is why the presently disclosed systems and methods can be used for either a flat fading channel or a frequency-fading channel.

Despite the fact that a linear method of reception is simple to implement, it is inherently sub-optimal in a non-orthogonal system, i.e. in a system where $h^*_{Ch} h_{Ch}$ is not diagonal. Its performance degrades rapidly compared to the optimal solution when the problem is under-determined or as $h_{Ch}$ gets close to being singular. The reason behind this increased degradation is due to the fact that only $r_{Ch}$ unknowns can be detected when the problem is under-determined, forcing the remaining $N_t - r_{Ch}$ unknowns to be ignored, i.e. to act as interference on the first $r_{Ch}$ unknowns, selected for detection. Even when the problem is over-determined or exactly-determined, the resulting noise $$h_{Ch}^{-1} \begin{bmatrix} \theta_1 \\ \vdots \\ \theta_{N_t} \end{bmatrix}$$

in Equation (4d), and $$h_{Ch}^{pinv} \begin{bmatrix} \theta_1 \\ \vdots \\ \theta_{N_t} \end{bmatrix}$$

in Equation (4e), are often enhanced by the estimation matrix, $h_{Est}$, relative to the original noise vector, $$\begin{bmatrix} \theta_1 \\ \vdots \\ \theta_{N_t} \end{bmatrix}.$$

For this reason, non-linear methods of reception must be considered when the Channel is non-orthogonal or when $r_{Ch} < N_r$.

Examples of Non-Linear Methods of Reception Include:

the Maximum Likelihood (ML) Method of reception which is optimal in most cases. It can be implemented using the detection part only as follows. When the N information elements in $$\begin{bmatrix} s_1 \\ \vdots \\ s_N \end{bmatrix}$$

take equally likely values from a finite set of values and when the noise is AWGN, the ML detects the information vector, $$\begin{bmatrix} s_1 \\ \vdots \\ s_N \end{bmatrix},$$

using a hard-decision detector which maximizes the likelihood function, or equivalently it obtains a detected information elements $$\begin{bmatrix} \check{s}_1 \\ \vdots \\ \check{s}_N \end{bmatrix}$$

for information elements $$\begin{bmatrix} s_1 \\ \vdots \\ s_N \end{bmatrix}$$

as $$\begin{bmatrix} \check{s}_1 \\ \vdots \\ \check{s}_N \end{bmatrix} = \arg \left\{ \min_{\begin{bmatrix} s_1 \\ \vdots \\ s_N \end{bmatrix} \in \mathcal{A}} \left\{ \left\| h_{Ch} \begin{bmatrix} \alpha_1 \gamma_1 \\ \vdots \\ \alpha_{N_t} \gamma_{N_t} \end{bmatrix} - \begin{bmatrix} \beta_1 \\ \vdots \\ \beta_{N_r} \end{bmatrix} \right\|^2 \right\} \right\} \quad (7)$$

where $$\min_{\begin{bmatrix} s_1 \\ \vdots \\ s_N \end{bmatrix} \in \mathcal{A}}$$

is performed over the set of finite values, $\mathcal{A}$, that the elements of $$\begin{bmatrix} s_1 \\ \vdots \\ s_N \end{bmatrix}$$

can take.

Note:
The complexity of ML grows exponentially with the number of elements, $N_t$, in the information vector $$\begin{bmatrix} s_1 \\ \vdots \\ s_N \end{bmatrix};$$

ML requires CSFIR;
ML can detect $$\begin{bmatrix} \check{s}_1 \\ \vdots \\ \check{s}_N \end{bmatrix}$$

instead of $\check{s}_{\mathbb{r}_{Ch}}$ since it is not limited by the rank, $\mathbb{r}_{Ch}$, of the Channel matrix. On the other hand, when using a linear method of reception, the number of elements to be soft-decision estimated, is limited by $\mathbb{r}_{Ch}$;

ML Performance: The performance of ML is upper bounded by the so-called minimum Euclidean distance $d_{min}$ which is defined as $$d_{min}(\vec{\gamma}) = \min_{\begin{bmatrix} s_{1,1} \\ \vdots \\ s_{N,1} \end{bmatrix} \neq \begin{bmatrix} s_{1,2} \\ \vdots \\ s_{N,2} \end{bmatrix}} \left\{ \left\| h_{Ch} \begin{bmatrix} \alpha_{1,1}\gamma_1 \\ \vdots \\ \alpha_{N_t,1}\gamma_{N_t} \end{bmatrix} - h_{Ch} \begin{bmatrix} \alpha_{1,2}\gamma_1 \\ \vdots \\ \alpha_{N_t,2}\gamma_{N_t} \end{bmatrix} \right\|^2 \right\} \quad (8)$$

where

- $\vec{\gamma} \triangleq \begin{bmatrix} \gamma_1 \\ \vdots \\ \gamma_{N_t} \end{bmatrix};$ and

- $\begin{bmatrix} s_{1,1} \\ \vdots \\ s_{N,1} \end{bmatrix}$ and $\begin{bmatrix} s_{1,2} \\ \vdots \\ s_{N,2} \end{bmatrix}$ are any two information vectors, which are not identical.

It is easily shown that in order to increase the sum rate, $R_1 + \ldots + R_N = \sum_{m=1}^{N} w_m \log_2(1+\eta_m)$ one must select $\vec{\gamma}$ in such a way that $d_{min}(\vec{\gamma})$ in Equation (8) is increased under the constraint that $|\alpha_1\gamma_1|^2 + \ldots + |\alpha_{N_t}\gamma_{N_t}|^2 \leq P$. This is equivalent to solving for $$\hat{\vec{\gamma}} = \arg\{\max_{\vec{\gamma}} \{d_{min}(\vec{\gamma})\}\} \quad (9)$$

under the constraint that $|\alpha_1\gamma_1|^2 + \ldots + |\alpha_{N_t}\gamma_{N_t}|^2 \leq P$. That is why $\vec{\gamma}$ should be selected to be complex (i.e. to have an amplitude and a phase) in order to be able to distinguish (i.e. increase the Euclidean distance) between the desired $\mathbb{r}_{Ch}$ information elements and the interfering $N_t - \mathbb{r}_{Ch}$ interfering information elements.

A lower complexity alternative to the ML is the SIC Method of Reception (e.g., as described with reference to process 700 and SIC detector 1055), which (asymptotically) converges to the optimal solution at high SINR and which can detect more than $\mathbb{r}_{Ch}$ unknowns. It includes three stages:
filtering (soft-decision estimating);
hard-decision detecting; and
cancelling.

SIC is performed using a detection order which may be determined, for example, from step 605 of FIG. 6. The three stages are repeated $N_t$ times, one iteration per element of the signal vector $$\begin{bmatrix} \alpha_1 \\ \vdots \\ \alpha_{N_t} \end{bmatrix}.$$

At the $i^{th}$ iteration, the three stages are explained as follows.
the filtering stage (e.g., as described with reference to step 707) is similar to the filtering stage in the linear method of reception (i.e. in the linear estimation part) where filtering can take place either using a filter or by multiplying using an estimation matrix, in the time-domain or in the frequency-domain. However, in this case, we are estimating a single value, $\alpha'_{1_{i,o}}$, (or a group of values) instead of an entire vector a $\vec{\alpha}'_{i,o}$ where $\alpha'_{1_{i,o}}$ is the $1^{st}$ element in $\vec{\alpha}'_{i,o}$ corresponding to the information element, $\alpha_{1_{i,o}}$, of the highest signal quality, i.e. of the largest received Signal-to-Noise & Interference (SINR), among all signal elements $$\begin{bmatrix} \alpha_{1_{i,o}} \\ \vdots \\ \alpha_{N_{t_{i,o}}} \end{bmatrix}.$$

Therefore, we use a row vector, $$h_{Est_{1_{i,o}}},$$

instead of an entire matrix $h_{Est_{i,o}}$ to obtain the (e.g., from step 709) estimated value $\hat{\alpha}'_{1_{i,o}}$ of $\alpha'_{1_{i,o}}$ as follows $$\hat{\alpha}'_{1_{i,o}} \triangleq h_{Est_{1_{i,o}}} \begin{bmatrix} \beta_{1_{i,o}} \\ \vdots \\ \beta_{N_{r_{i,o}}} \end{bmatrix} \quad (11)$$

where $\hat{\alpha}'_{1_{i,o}}$ is the estimated value of the 1$^{st}$ element, $\alpha'_{1_{i,o}}$, in $\vec{\alpha}'_{i,o}$;

$$h_{Est_{1_{i,o}}} \equiv 1 \times N_r$$

is the 1$^{st}$ row vector of the estimation matrix $h_{Est_{i,o}}$ which is used to estimate the 1$^{st}$ pre-weighted signal element, $\alpha'_{1_{i,o}}$, in $\vec{\alpha}'_{i,o}$; and $$\bullet \begin{bmatrix} \beta_{1_{i,o}} \\ \vdots \\ \beta_{N_{r_{i,o}}} \end{bmatrix} \equiv N_r \times 1$$

is a vector consisting of the received signal elements which remain after removing the effects of the (i−1) previously detected information elements. More specifically, $$\begin{bmatrix} \beta_{1_{i,o}} \\ \vdots \\ \beta_{N_{r_{i,o}}} \end{bmatrix} = h_{Ch_{i,o}} \begin{bmatrix} \alpha'_{1_{i,o}} \\ \vdots \\ \alpha'_{N_{t_{i,o}}} \end{bmatrix} + \begin{bmatrix} \theta_{1_{i,o}} \\ \vdots \\ \theta_{N_{r_{i,o}}} \end{bmatrix} \quad (12)$$

$$= h_{Ch_{i,o}} \begin{bmatrix} \alpha_{1_{i,o}} \gamma_{1_{i,o}} \\ \vdots \\ \alpha_{N_{t_{i,o}}} \gamma_{N_{t_{i,o}}} \end{bmatrix} + \begin{bmatrix} \theta_{1_{i,o}} \\ \vdots \\ \theta_{N_{r_{i,o}}} \end{bmatrix}$$

where $h_{Ch_{i,o}} \equiv N_r \times (N_t - i + 1)$ is the ordered Channel sub-matrix which consists of the columns of the Channel matrix, $h_{Ch}$, corresponding to $\vec{\alpha}'_{i,o}$; and $$\bullet \begin{bmatrix} \theta_{1_{i,o}} \\ \vdots \\ \theta_{N_{r_{i,o}}} \end{bmatrix} \equiv N_r \times 1$$

is the ordered noise vector.

The choice of $h_{Est_{i,o}}$ is the Matched Filter, the Zero Forcing Filter, the MMSE filter, etc. . . . with $\vec{\gamma}$ taken into consideration.

the detecting stage (e.g., using step 711), which detects the 1$^{st}$ information element $\zeta_{1_{i,o}}$ in $\vec{\zeta}_{i,o}$ by dividing the estimated element $\hat{\alpha}'_{1_{i,o}}$ in Equation (11) by $\gamma_{1_{i,o}}$, then obtaining the estimated information element $\hat{\zeta}_{1_{i,o}}$ of the corresponding information element, $\zeta_{1_{i,o}}$, by performing an operation on $$\hat{\alpha}'_{1_{i,o}} / \gamma_{1_{i,o}} \triangleq \hat{\alpha}_{1_{i,o}}$$

which is the reverse to the operation which produced $\alpha_{1_{i,o}}$ from $\zeta_{1_{i,o}}$.

This is followed by taking a hard-decision detection, $\check{\zeta}_{1_{i,o}}$, of $\hat{\zeta}_{1_{i,o}}$, as $$\check{\zeta}_{1_{i,o}} = \arg\left\{ \min_{\mu_k \in \mathcal{A}} \left\{ |\hat{\zeta}_{1_{i,o}} - \mu_k|^2 \right\} \right\} \quad (13)$$

where $\mu_k$ is the k$^{th}$ value in the set of the finite values, $\mathcal{A}$, that $\zeta_m$ can take; and the cancelling stage (e.g., as described with reference to step 715), which removes the effect of detected information element $\check{\zeta}_{1_{i,o}}$ from $$\begin{bmatrix} \beta_{1_{i,o}} \\ \vdots \\ \beta_{N_{r_{i,o}}} \end{bmatrix}$$

by first forming a vector $$\begin{bmatrix} \delta_{1_{i,o}} \\ \vdots \\ \delta_{N_{r_{i,o}}} \end{bmatrix}$$

defined as $$\begin{bmatrix} \delta_{1_{i,o}} \\ \vdots \\ \delta_{N_{r_{i,o}}} \end{bmatrix} \triangleq h_{Ch_{i,o}} \check{\alpha}_{1_{i,o}} \gamma_{1_{i,o}} \quad (14)$$

where detected signal element $\check{\alpha}_{1_{i,o}}$ corresponds to detected information element $\check{\zeta}_{1_{i,o}}$ assuming that $\check{\zeta}_{1_{i,o}} = \zeta_{1_{i,o}}$, i.e. assuming that there is no error propagation, which is usually true at a high received SINR. This is followed by subtracting $$\begin{bmatrix} \delta_{1_{i,o}} \\ \vdots \\ \delta_{N_{r_{i,o}}} \end{bmatrix}$$

from $$\begin{bmatrix} \beta_{1_{i,o}} \\ \vdots \\ \beta_{N_{r_{i,o}}} \end{bmatrix}$$

to form $$\begin{bmatrix} \beta_{1_{i+1,o}} \\ \vdots \\ \beta_{N_{r_{i+1,o}}} \end{bmatrix}$$

as $$\begin{bmatrix} \beta_{1_{i+1,o}} \\ \vdots \\ \beta_{N_{r_{i+1,o}}} \end{bmatrix} \triangleq \begin{bmatrix} \beta_{1_{i,0}} \\ \vdots \\ \beta_{N_{r_{i,0}}} \end{bmatrix} - \begin{bmatrix} \delta_{1_{i,o}} \\ \vdots \\ \delta_{N_{r_{i,o}}} \end{bmatrix} \quad (15)$$

Method "A" for Selecting Ordering and Pre-Weighting for UL MU-MIMO:

Assumptions "A":
1. Since the network is a UL network, the method assumes that the $U_r$ receiving devices (access nodes) are able to cooperate. This is a realistic assumption when the receiving devices are access nodes belonging to the same network. Otherwise, the non-cooperating access nodes will see each another as interfering networks.
2. Since the network is a UL network, the method assumes that the channel matrix, $h_{Ch}$, (or portions of the channel matrix such as $h_{Ch}^w$) is known by the $U_r$ receiving devices (access nodes). This is also a realistic assumption since transmissions commonly include pilot symbols or training sequences, and the receiving devices typically carry out Channel estimation.
3. Based on the two previous assumptions that the channel matrix, $h_{Ch}$, (or portions of the channel matrix such as $h_{Ch}^w$) is known by the $U_r$ receiving devices and that the $U_r$ receiving devices are able to cooperate, the method assumes that SIC is selected as the Method of reception at the $U_r$ receiving devices (access nodes) after filtering the received signals. This assumption can be realistically carried out by implementing the three stages of SIC: Filtering, Hard-decision detecting and Cancelling.
4. Based on the previous assumption that SIC is selected, the method assumes no error propagation. This assumption can only be justified as long as the received SINR constraint in Equation (16) (below) is selected adequately and is met. The (minimum) received SINR constraint is equivalent to a (minimum) Rate constraint. This is discussed further below.
5. Based on the previous two assumptions, the method assumes that the ordering of all $N_t$ signal elements is based on their corresponding received Signal-to-Noise & Interference Ratio (SINR), $\eta_m$, ordered into $\eta_{1_{m,o}}$, from high to low, where the interference at the $i^{th}$ iteration is due to the $N_t-i$ remaining information elements. Since the selection of the pre-weighting elements affects their corresponding received SINR, the ordering of all $N_t$ signal elements based on their corresponding received SINR is carried out simultaneously with the selection of the pre-weighting elements.

Constraints "A":
1. In order to minimize (or eliminate) error propagation, a desired received Signal-to-Noise & Interference Ratio (SINR) for the $1^{st}$ element, $\eta_{1_{m,o}}$, in the ordered received SINR vector $\vec{\eta}_{m,o}$ during the $m^{th}$ iteration should be constrained to have a lower bound, $\kappa_{1_{m,o}}$, for $1 \le m \le N$:

$$\eta_{1_{m,o}} \ge \kappa_{1_{m,o}} \quad (16)$$

Equation (16) is referred to as the (minimum) received SINR constraint. An equivalent performance measure to the ordered received SINR, $\eta_{1_{m,o}}$ is the ordered bit Rate, $R_{m,o}$, since both are directly related as follows:

$$\mathcal{R}_{1_{m,o}} \triangleq \mathcal{W}_{m_o} \log_2(1 + \eta_{1_{m,o}}).$$

The importance of such a constraint is to minimize error propagation and to ensure a minimum upload performance for all terminal nodes. Other minimum performance constraints may also be used.
2. Based on the received SINR constraint in Equation (16) for the $1^{st}$ element, $\eta_{1_{m,o}}$, in the ordered received SINR vector $\vec{\eta}_{m,o}$ during the $m^{th}$ iteration, or equivalently for $\zeta_{1_{m,o}}$ or for $\alpha_{1_{m,o}}$, a pre-weighting element, $\gamma_{1_{m,o}}$, is selected such that the following transmit Power constraint is met:

$$E\{|\alpha_{1_{1,o}}\gamma_{1_{1,o}}|^2 + \ldots + |\alpha_{1_{N_t,o}}\gamma_{1_{N_t,o}}|^2\} \le P \quad (17)$$

where P is a pre-specified upper limit on the total transmitted power and $E\{\bullet\}$ denotes statistical averaging. The importance of such a constraint is to limit the average transmitted power for all terminal nodes. Other power constraints may also be used as described above.

Method "A":
1. If a pre-weighting vector, $$\begin{bmatrix} \gamma_{1_{1,o}} \\ \vdots \\ \gamma_{1_{N_t,o}} \end{bmatrix},$$

is found which satisfies both the (minimum) received SINR constraint in Equation (16) and the (maximum) transmit Power constraint in Equation (17), then the method optimizes $$\begin{bmatrix} \gamma_{1_{1,o}} \\ \vdots \\ \gamma_{1_{N_t,o}} \end{bmatrix}$$

such that the sum rate (e.g., in step 911), $$\mathcal{R}_{1_{1,o}} + \ldots + \mathcal{R}_{1_{N,o}} = \Sigma_{m=1}^{N} \mathcal{W}_{1_{m,o}} \log_2(1 + \eta_{1_{m,o}}) \quad (18)$$

is increased (or maximized). The sum rate in Equation (18) is different from the one in Equation (3) since $n_m$ in Equation (3) is the equivalent received Signal-to-Noise Ratio (SNR) corresponding to the $m^{th}$ information element $\zeta_m$, while $\eta_{1_{m,o}}$ is the SINR value corresponding to the $1^{st}$ element in the ordered received SINR vector $\vec{\eta}_{m,o}$ during the $m^{th}$ iteration. This increase (maximization) of the sum rate in Equation (18) can be accomplished using an "adjusted" waterfilling strategy. The "regular" waterfilling strategy optimizes the sum rate with respect to $$\begin{bmatrix} \gamma_{1_{1,o}} \\ \vdots \\ \gamma_{1_{N_t,o}} \end{bmatrix}$$

under the transmit Power constraint in Equation (17) only. The "adjusted" waterfilling strategy includes the received SINR constraint in Equation (16) together with the transmit Power constraint in Equation (17) when optimizing the sum rate. There are several ways to implement the "adjusted" waterfilling strategy. For example:

Way 1. The first way has two steps:
  a. Find all ordering combinations and corresponding pre-weighting values which satisfy the received SINR constraint.
  b. Select the ordering combination with the largest corresponding sum rate using, for example, the waterfilling method subject to the transmit power constraint.
Way 2. The second way has two steps:
  a. Find all ordering combinations and corresponding pre-weighting values which satisfy the transmit power constraint (e.g., using step 957).
  b. Select the ordering combination with the largest corresponding sum rate using, for example, the waterfilling method subject to the received SINR constraint.
Way 3. The third way has two steps:
  a. Find all ordering combinations and corresponding pre-weighting values which satisfy both the received SINR constraint and the transmit Power constraint (e.g., using step 978).
  b. Select the ordering combination with the largest corresponding sum rate using, for example, two Lagrange multipliers when obtaining the solution to the sum rate optimization. The first Lagrange multiplier incorporates the received SINR constraint, while the second Lagrange multiplier incorporates the transmit power constraint.
Other ways to implement adjusted waterfilling strategies may also be used. If no ordering combination is found which satisfies the received SINR constraint and the transmit power constraint, then use either Method I, II, III or IV below for Relaxing Received SINR constraint in Method "A." Other techniques may also be used to select an ordering combination and corresponding pre-weighting values when no ordering combination is found that satisfies the received SINR constraint and the transmit power constraint.

2. If more than one ordering combination for the pre-weighting vector, $$\begin{bmatrix} \gamma_{1_1,o} \\ \vdots \\ \gamma_{1_{N_t},o} \end{bmatrix},$$

are found which satisfy both the received SINR constraint in Equation (16) and the transmit Power constraint in Equation (17), then the method selects $$\begin{bmatrix} \gamma_{1_1,o} \\ \vdots \\ \gamma_{1_{N_t},o} \end{bmatrix}$$

such that the sum rate is optimized (maximized) for each ordering combination, and selects the ordering combination, which corresponds to the largest sum rate.

3. If a pre-weighting vector, $$\begin{bmatrix} \gamma_{1_1,o} \\ \vdots \\ \gamma_{1_{N_t},o} \end{bmatrix},$$

which satisfies both the received SINR constraint in Equation (16) and the transmit Power constraint in Equation (17), cannot be found, then, for example, step 923 removes the largest absolute value in $$\begin{bmatrix} \gamma_{1_1,o} \\ \vdots \\ \gamma_{1_{N_t},o} \end{bmatrix}$$

from $$\begin{bmatrix} \gamma_{1_1,o} \\ \vdots \\ \gamma_{1_{N_t},o} \end{bmatrix}$$

in Equations (16) and (17) and places it in a set, $\mathcal{S}_o$. This is repeated until both Equations (16) and (17) are satisfied. The method forces the pre-weighting elements in $\mathcal{S}_o$ to take a zero value, i.e. their corresponding information elements are not transmitted.

4. Alternatively, the received SINR constraint in Equation (16) is relaxed (e.g., as described with reference to step 917) by reducing the set of pre-weighting elements each by a small factor, $\lambda$, for each transmitting device (terminal node). The small factor, $\lambda$, is incremented by a small amount until the transmit Power constraint in Equation (17) is satisfied (e.g., as described with reference to step 931). Alternatively, the reduced pre-weighting elements may be repeatedly reduced by the small factor until the transmit Power constraint is satisfied.

5. The method feeds-back (e.g., as described with reference to step 913) the optimized $N_t$ pre-weighting elements (whether zero, non-zero or reduced), $$\begin{bmatrix} \gamma_{1_1,o} \\ \vdots \\ \gamma_{1_{N_t},o} \end{bmatrix},$$

to corresponding $U_t$ transmitting devices (terminal nodes). The feedback of the pre-weighting values may be communicated using any suitable method, for example, using PUCCH in an LTE system.

The contributions of the presently disclosed systems and methods include Method "A" for the selection of $$\begin{bmatrix} \gamma_{1_1,o} \\ \vdots \\ \gamma_{1_{N_t},o} \end{bmatrix}$$

and its ordering combination, for an UL MU-MIMO based on Method "A."

An Embodiment of the Pre-Weighting Selection in Method "A":

Since the SIC Method of reception is selected after filtering the received signals, then at the $i^{th}$ iteration, the received SINR, corresponding to the $1^{st}$ ordered element, which is obtained after filtering the received signals at all $N_r$ Rxs, should comply with the SINR constraint in Equation (16), i.e.

$$\eta_{1_{i,o}} \triangleq \frac{E\{|\hat{\alpha}'_{1_{i,o}}|^2\}}{E\left\{\left\|h_{Est_{1_{i,o}}}\begin{bmatrix}\theta_{1_{i,o}}\\\vdots\\\theta_{N_{r_{i,o}}}\end{bmatrix}\right\|^2\right\} + E\{|\sum_{l=2}^{N_t-i+1}\hat{\alpha}'_{l_{i,o}}|^2\}} \geq \kappa_{1_{i,o}} \quad (19)$$

where $\eta_{1_{i,o}}$ is the ordered received SINR value corresponding to the $1^{st}$ ordered signal element for the $i^{th}$ iteration;

$\kappa_{1_{i,o}}$ is the ordered minimum required received SINR value corresponding to the $1^{st}$ ordered signal element for the $i^{th}$ iteration;

$$\cdot \hat{\alpha}'_{1_{i,o}} \triangleq h_{Est_{1_{i,o}}} h_{Ch_{i,o}} \begin{bmatrix}\alpha_{1_{i,o}}\gamma_{1_{i,o}}\\0\\\vdots\\0\end{bmatrix}$$

is the (desired) signal component corresponding to the $1^{st}$ pre-weighted signal element, $\alpha'_{1_{i,o}}$, in $\vec{\alpha}'_{i,o}$ after filtering the received signal elements $$\begin{bmatrix}\beta_{1_{i,o}}\\\vdots\\\beta_{N_{r_{i,o}}}\end{bmatrix}$$

with a row vector, $h_{Est_{1_{i,o}}}$;

$\cdot h_{Est_{1_{i,o}}} \equiv 1 \times N_r$ is the $1^{st}$ row vector of the estimation matrix $h_{Est_{i,o}}$ which is used to estimate the $1^{st}$ pre-weighted signal element, $\alpha'_{1_{i,o}}$, in $\vec{\alpha}'_{i,o}$;

$$\cdot \begin{bmatrix}\beta_{1_{i,o}}\\\vdots\\\beta_{N_{r_{i,o}}}\end{bmatrix} \equiv N_r \times 1$$

is a vector consisting of the received signal elements which remain after removing the effects of the (i–1) previously detected information elements;

$h_{Ch_{i,o}} \equiv N_r \times N_t$ is the ordered Channel matrix for the $i^{th}$ iteration, i.e. the columns of the Channel matrix are adjusted such that the $l^{th}$ column of $h_{Ch_{i,o}}$ corresponds to $\alpha_{l_{i,o}}$:

$$\cdot \hat{\alpha}'_{l_{i,o}} \triangleq h_{Est_{1_{i,o}}} h_{Ch_{i,o}}\begin{bmatrix}0\\\vdots\\0\\\alpha_{l_{i,o}}\gamma_{l_{i,o}}\\0\\\vdots\\0\end{bmatrix}$$

is the interference (undesired) component corresponding to $l^{th}$ element, $\alpha'_{l_{i,o}}$, in $\vec{\alpha}'_{i,o}$ after filtering the received signal elements $$\begin{bmatrix}\beta_{1_{i,o}}\\\vdots\\\beta_{N_{r_{i,o}}}\end{bmatrix}$$

with a row vector, $h_{Est_{1_{i,o}}}$ where $2 \leq l \leq N_t-i+1$;

$$\sum_{l=2}^{N_t-i+1} \hat{\alpha}'_{l_{i,o}}$$

is the total interference (undesired) component impinging on the (desired) pre-weighted signal element $\hat{\alpha}'_{1_{i,o}}$; and $$\cdot h_{Est_{1_{i,o}}}\begin{bmatrix}\theta_{1_{i,o}}\\\vdots\\\theta_{N_{r_{i,o}}}\end{bmatrix}$$

is the noise component that results from filtering the noise vector $$\begin{bmatrix}\theta_{1_{i,o}}\\\vdots\\\theta_{N_{r_{i,o}}}\end{bmatrix}$$

with the row vector $h_{Est_{1_{i,o}}}$.

The ordered pre-weighting vector, $$\vec{\gamma}_o \triangleq \begin{bmatrix} \gamma_{1_{1,o}} \\ \vdots \\ \gamma_{1_{N_t,o}} \end{bmatrix},$$

must be selected to satisfy the received SINR constraint in Equation (19) under the transmit Power constraint in Equation (17). However, since the signal vector, $$\begin{bmatrix} \alpha_{1_{i,o}} \\ \vdots \\ \alpha_{N_{t_{i,o}}} \end{bmatrix},$$

in Equation (19) is unknown to the receiving devices, then two assumptions are made in Equation (19):
- the elements of the signal vector are independent identically distributed (iid) with zero mean and variance $\sigma_\alpha^2$ and
- the elements of the noise are independent identically distributed (iid) with zero mean and variance $\sigma_\theta^2$.

In other words, Equation (19) can re-written as $$\eta_{i,o} \triangleq \frac{\sigma_\alpha^2 |\xi_{1_{i,o}}|^2}{\sigma_\theta^2 h_{Est_{1,o}} h^*_{Est_{1,o}} + \sigma_\alpha^2 \sum_{l=2}^{N_t-i+1} |\xi_{l_{i,o}}|^2} \geq \kappa_{1_{i,o}} \quad (20)$$

where $$|\xi_{1_{i,o}}|^2 \triangleq h_{Est_{1,i,o}} h_{Ch_{i,o}} \begin{bmatrix} |\gamma_{1_{i,o}}|^2 & 0 & \cdots & 0 \\ 0 & 0 & \cdots & 0 \\ \vdots & \vdots & \ddots & \vdots \\ 0 & 0 & \cdots & 0 \end{bmatrix} h^*_{Ch_o} h^*_{Est_{1,i,o}} \quad (21a)$$

$$= \left|\{h_{Est_{1,i,o}} h_{Ch_{i,o}}\}_1\right|^2 |\gamma_{1_{i,o}}|^2 \quad (21b)$$

and $$|\xi_{l_{i,o}}|^2 \triangleq h_{Est_{1,i,o}} h_{Ch_{i,o}} \begin{bmatrix} 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \\ 0 & \vdots & 0 & |\gamma_{l_{i,o}}|^2 & \vdots & \vdots & 0 \\ 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \end{bmatrix} h^*_{Ch_{i,o}} h^*_{Est_{1,i,o}} \quad (22a)$$

$$\triangleq \left|\{h_{Est_{1,i,o}} h_{Ch_{i,o}}\}_l\right|^2 |\gamma_{l_{i,o}}|^2 \quad (22b)$$

where $$\{h_{Est_{1,i,o}} h_{Ch_{i,o}}\}_l$$

is the $l^{th}$ element in $$h_{Est_{1,i,o}} h_{Ch_{i,o}}.$$

$h_{Ch_{i,o}}$. If the estimation filter, $$h_{Est_{1,i,o}},$$

is normalized, i.e.

$$h_{Est_{1,i,o}} h^*_{Est_{1,i,o}} = 1,$$

then $$\eta_{i,o} \triangleq \frac{\sigma_\alpha^2 |\xi_{1_{i,o}}|^2}{\sigma_\theta^2 + \sigma_\alpha^2 \sum_{l=2}^{N_t-i+1} |\xi_{l_{i,o}}|^2} \geq \kappa_{1_{i,o}} \quad (23a)$$

$$= \frac{\left|\{h_{Est_{1,i,o}} h_{Ch_{i,o}}\}_1\right|^2 |\gamma_{1_{i,o}}|^2}{\frac{1}{v} + \sum_{l=2}^{N_t-i+1} \left|\{h_{Est_{1,i,o}} h_{Ch_{i,o}}\}_l\right|^2 |\gamma_{l_{i,o}}|^2} \geq \kappa_{1_{i,o}} \quad (23b)$$

In this case, the transmit Power constraint can be re-written as $$E\{|\alpha_{1_{1,o}} \gamma_{1_{1,o}}|^2 + \ldots + |\alpha_{1_{N_t,o}} \gamma_{1_{N_t,o}}|^2\} = \quad (24)$$
$$\sigma_\alpha^2 \{|\gamma_{1_{1,o}}|^2 + \ldots + |\gamma_{1_{N_t,o}}|^2\} \leq P$$

where $\sigma_\alpha^2$ is known from the transmit power and modulation format.

If the pre-weighting vector, $\vec{\gamma}_o$, is found to satisfy both the received SINR constraint in Equation (23) and the transmit Power constraint in Equation (24), then the next step is to optimize the sum rate in Equation (18). This can be accomplished using the "adjusted" waterfilling strategy as explained above using Way 1, Way 2 or Way 3.

A Solution of Equation (23) in Method "A":

When $i=N_t$, Equation (23) reduces to $$\frac{\sigma_\alpha^2 |\xi_{1_{N_t,o}}|^2}{\sigma_\theta^2} \geq \kappa_{1_{N_t,o}},$$

or equivalently $$|\xi_{1_{N_t,o}}|^2 \geq \frac{\kappa_{1_{N_t,o}}}{v} \quad (25a)$$

where $$v \triangleq \sigma_\theta^2 / \sigma_\alpha^2$$

is the normalized SNR corresponding to the transmitted signal elements.

When $i=N_t-1$, Equation (23) reduces to $$\frac{\sigma_a^2 |\xi_{1_{N_t-1,o}}|^2}{\sigma_\theta^2 + \sigma_a^2 |\xi_{2_{N_t-1,o}}|^2} \geq \kappa_{1_{N_t-1,o}},$$

or equivalently $$|\xi_{1_{N_t-1,o}}|^2 \geq \kappa_{1_{N_t-1,o}} \left( \frac{1}{\nu} + |\xi_{2_{N_t-1,o}}|^2 \right) \quad (25b)$$

When $i=N_t-2$, Equation (23) reduces to $$\frac{\sigma_a^2 |\xi_{1_{N_t-2,o}}|^2}{\sigma_\theta^2 + \sigma_a^2 |\xi_{2_{N_t-2,o}}|^2 + \sigma_a^2 |\xi_{3_{N_t-2,o}}|^2} \geq \kappa_{1_{N_t-2,o}},$$

or equivalently $$|\xi_{1_{N_t-2,o}}|^2 \geq \kappa_{1_{N_t-2,o}} \left( \frac{1}{\nu} + |\xi_{2_{N_t-2,o}}|^2 + |\xi_{3_{N_t-2,o}}|^2 \right) \quad (25c)$$

In general, at the $i^{th}$ iteration, we have $$|\xi_{1_{i,o}}|^2 \geq \kappa_{1_{i,o}} \left( \frac{1}{\nu} + |\xi_{2_{i,o}}|^2 + |\xi_{3_{i,o}}|^2 + \ldots + |\xi_{N_t-i+1_{i,o}}|^2 \right) \quad (25d)$$

for $1 \leq i \leq N_t$. From Equation (25a), $$|\gamma_{1_{N_t,o}}|^2$$

can be derived as $$|\gamma_{1_{N_t,o}}|^2 \geq \frac{\kappa_{1_{N_t,o}}}{\nu \left| \left\{ h_{Est_{1_{N_t,o}}} h_{Ch_{N_t,o}} \right\}_1 \right|^2} \quad (26a)$$

From Equation (25b), $$|\gamma_{1_{N_t-1,o}}|^2$$

can be derived as $$|\gamma_{1_{N_t-1,o}}|^2 \geq \frac{\kappa_{1_{N_t-1,o}}}{\left| \left\{ h_{Est_{1_{N_t-1,o}}} h_{Ch_{N_t-1,o}} \right\}_1 \right|^2} \left( \frac{1}{\nu} + |\xi_{2_{N_t-1,o}}|^2 \right) \quad (26b)$$

In general, from Equation (25d), $|\gamma_{1_{i,o}}|^2$ can be derived as $$|\gamma_{1_{i,o}}|^2 \geq \frac{\kappa_{1_{i,o}}}{\left| \left\{ h_{Est_{1_{i,o}}} h_{Ch_{i,o}} \right\}_1 \right|^2} \left( \frac{1}{\nu} + |\xi_{2_{i,o}}|^2 + |\xi_{3_{i,o}}|^2 + \ldots + |\xi_{N_t-i+1_{i,o}}|^2 \right) \quad (26d)$$

After deriving the pre-weighting vector, $$\begin{bmatrix} \gamma_{1_{,o}} \\ \vdots \\ \gamma_{1_{N_t,o}} \end{bmatrix},$$

the transmit Power constraint in Equation (24) is tested as follows $$|\gamma_{1_{,o}}|^2 + \ldots + |\gamma_{1_{N_t,o}}|^2 \leq \frac{P}{\sigma_a^2} \quad (27)$$

A Selection of the Ordering of $$\begin{bmatrix} \eta_1 \\ \vdots \\ \eta_{N_t} \end{bmatrix} \text{ into } \begin{bmatrix} \eta_{1_{,o}} \\ \vdots \\ \eta_{1_{N_t,o}} \end{bmatrix}$$

in Method "A":

Based on Equations (26) and the transmit Power constraint in Equation (27), the ordering of $$\begin{bmatrix} \eta_1 \\ \vdots \\ \eta_{N_t} \end{bmatrix} \text{ into } \begin{bmatrix} \eta_{1_{,o}} \\ \vdots \\ \eta_{1_{N_t,o}} \end{bmatrix}$$

is based on selecting $$\begin{bmatrix} \gamma_{1_{,o}} \\ \vdots \\ \gamma_{1_{N_t,o}} \end{bmatrix}$$

in such a way as to maximize the sum rate under the following constraints:

$$\sum_{i=1}^{N_t} \left\{ \frac{\kappa_{1_{i,o}}}{\left| \left\{ h_{Est_{1_{i,o}}} h_{Ch_{i,o}} \right\}_1 \right|^2} \left( \frac{1}{\nu} + \sum_{l=2}^{N_t-i+1} |\xi_{l_{i,o}}|^2 \right) \right\} \leq \sum_{i=1}^{N_t} |\gamma_{1_{i,o}}|^2 \leq \frac{P}{\sigma_a^2} \quad (28a)$$

One possible way for ordering $$\begin{bmatrix} \eta_{1_{1,o}} \\ \vdots \\ \eta_{1_{N_t,o}} \end{bmatrix}$$

and for selecting $$\begin{bmatrix} \gamma_{1_{1,o}} \\ \vdots \\ \gamma_{1_{N_t,o}} \end{bmatrix}$$

which satisfies the constraints in Equation (28a), is to exhaustively search for all possible ordering combinations of $$\begin{bmatrix} \gamma_{1_{1,o}} \\ \vdots \\ \gamma_{1_{N_t,o}} \end{bmatrix}$$

until at least one ordering combination satisfies Equation (28b)

$$\sum_{i=1}^{N_t} \left\{ \frac{\kappa_{1_{i,o}}}{\left|\{h_{Est_{1_{i,o}}} h_{Ch_{i,o}}\}_1\right|^2} \left( \frac{1}{\nu} + \sum_{k=2}^{N_t-i+1} |\xi_{k_{i,o}}|^2 \right) \right\} \le \frac{P}{\sigma_{\tilde{\alpha}}^2} \quad (28b)$$

If one ordering combination satisfies Equation (28b), then the next step is to select $$\begin{bmatrix} \gamma_{1_{1,o}} \\ \vdots \\ \gamma_{1_{N_t,o}} \end{bmatrix}$$

in Equation (28a) in such a way that the sum rate is maximized using an "adjusted" waterfilling as explained above. Adjusted waterfilling may be used to find a solution with better capacity after a satisfactory solution is found. If more than one ordering combinations satisfy Equation (28b), then the next step is to select the ordering, which corresponds to the largest minimum sum rate.

Another possible way for ordering $$\begin{bmatrix} \eta_{1_{1,o}} \\ \vdots \\ \eta_{1_{N_t,o}} \end{bmatrix}$$

(and for selecting $$\begin{bmatrix} \gamma_{1_{1,o}} \\ \vdots \\ \gamma_{1_{N_t,o}} \end{bmatrix})$$

which satisfies the constraints in Equation (28b), is to sort $$\begin{bmatrix} \frac{\kappa_1}{\{h_{Est_1} h_{Ch}\}_1} \\ \vdots \\ \frac{\kappa_{N_t}}{\{h_{Est_{N_t}} h_{Ch}\}_1} \end{bmatrix}$$

from high to low with the largest value assigned to $i=N_t$, and the next largest value assigned to $i=N_t-1$, etc., where $h_{Est_m} \equiv 1 \times N_r$ is the $m^{th}$ row vector of the estimation matrix $h_{Est}$ which is used to estimate the $m^{th}$ pre-weighted signal element, $\alpha'_m$, in $\vec{\alpha}'$; and $\{h_{Est_m} h_{Ch}\}_1 \equiv 1 \times 1$ is the scalar value that corresponds to the first element in the row vector $h_{Est_m} h_{Ch}$.

Once again, if one ordering combination, that is based on sorting $$\begin{bmatrix} \frac{\kappa_1}{\{h_{Est_1} h_{Ch}\}_1} \\ \vdots \\ \frac{\kappa_{N_t}}{\{h_{Est_{N_t}} h_{Ch}\}_1} \end{bmatrix}$$

from high to low, satisfies Equation (28b), then the next step is to select $$\begin{bmatrix} \gamma_{1_{1,o}} \\ \vdots \\ \gamma_{1_{N_t,o}} \end{bmatrix}$$

in Equation (28a) in such a way that the sum rate is maximized using an "adjusted" waterfilling. On the other hand, if more than one ordering combinations, that are based on sorting $$\begin{bmatrix} \frac{\kappa_1}{\{h_{Est_1} h_{Ch}\}_1} \\ \vdots \\ \frac{\kappa_{N_t}}{\{h_{Est_{N_t}} h_{Ch}\}_1} \end{bmatrix}$$

from high to low, satisfy Equation (28b), then the next step is to select the ordering, which corresponds to the largest minimum sum rate.

Method I for Relaxing Received SINR Constraint in Method "A":

Alternatively, if Equation (28b) cannot be satisfied for any ordering of $$\begin{bmatrix} \eta_1 \\ \vdots \\ \eta_{N_t} \end{bmatrix},$$

several remedies exist. For example, the maximum value, $\mathcal{S}$, which is obtained as $$|\gamma_{1_{S,o}}|^2 \triangleq \max\{|\gamma_{1_{1,o}}|^2, |\gamma_{1_{2,o}}|^2, \ldots, |\gamma_{1_{N_t-1,o}}|^2\},$$

is removed (e.g., as described with reference to step 923) from the left hand side of Equation (28b) and placed in a set, $\vec{\gamma}_{S_o}$, and its corresponding indices, $\mathcal{S}$ is placed in another set, $\mathcal{S}_o$. This is repeated until Equation (28b) is satisfied. The formed set of squared values in $\vec{\gamma}_{S_o}$, is then replaced by a zero value, i.e. the signal elements that correspond to $\vec{\gamma}_{S_o}$ are not transmitted.

Method II for Relaxing Received SINR Constraint in Method "A":

Another remedy for the case when Equation (28b) cannot be satisfied for any ordering of $$\begin{bmatrix} \eta_1 \\ \vdots \\ \eta_{N_t} \end{bmatrix},$$

is to reduce (e.g., as described with reference to step 927) the left hand side of Equation (28b) by a factor which would make it equal to the right hand side of equation (28b), i.e. we need to find a factor, $\lambda$, such that $$\lambda \sum_{i=1}^{N_t} \left\{ \frac{\kappa_{1_{i,o}}}{\left|\left\{h_{Est_{1_{i,o}}} h_{Ch_{i,o}}\right\}_1\right|^2} \left( \frac{1}{v} + \sum_{k=2}^{N_t-i+1} |\xi_{k_{i,o}}|^2 \right) \right\} = \frac{P}{\sigma_\alpha^2}$$

In other words, instead of accommodating only a few of the terminal nodes as in the previous strategy, this strategy attempts to accommodate all terminal nodes in a fair fashion. Other methods for relaxing the received SINR constraint in Method "A" may also be used.

Note: When choosing between the two Methods for relaxing the received SINR constraint, one can rely on the variance of $$\{|\gamma_{1_{1,o}}|^2, |\gamma_{1_{2,o}}|^2, \ldots, |\gamma_{1_{N_t-1,o}}|^2\}.$$

If the variance is larger than a pre-specified threshold (e.g., as described with reference to step 919), then Method I is selected, otherwise, Method II is selected. There are many ways for selecting the pre-specified threshold. For example, the pre-specified threshold can be selected as a function of the variance of $$\{|\gamma_{1_{1,o}}|^2, |\gamma_{1_{2,o}}|^2, \ldots, |\gamma_{1_{N_t-1,o}}|^2\}.$$

An example of such a function is a normalized mean or a normalized median. Other criteria of choosing between Method I and Method II may also be used. In alternative embodiments, only Method I or Method II may be used for relaxing the received SINR constraint.

Example for Method "A":

An example of a 2×2 UL MU-MIMO is used to describe Method "A." In this example, the following 2×2 matrix is selected to describe a channel:

$$h_{ch} = \begin{bmatrix} 0.22 - 0.52j & 0.94 - 0.63j \\ 0.20 + 0.20j & 0.48 - 0.29j \end{bmatrix}$$

which is assumed to consist of two Txs: $Tx_1$ and $Tx_2$ and two Rxs: $Rx_1$ and $Rx_2$. The signal transmitted by $Tx_2$ and received at $Rx_1$ has 6 dB more power than the signal transmitted by $Tx_2$ and received at $Rx_2$ or the signal transmitted by $Tx_1$ and received at $Rx_1$. The signal transmitted by $Tx_2$ and received at $Rx_1$ has 12 dB more power than the signal transmitted by $Tx_1$ and received at $Rx_2$. There are two possible ordering combinations:

Order 1: Perform SIC on $Tx_1$ first, then on $Tx_2$; or
Order 2: Perform SIC on $Tx_2$ first, then on $Tx_1$,
If $\kappa_1 = \kappa_2 = 10$, then Order 1 requires a ratio $$\frac{\gamma_1}{\gamma_2} = 8.71,$$

while Order 2 requires only a ratio of $$\frac{\gamma_1}{\gamma_2} = 1.8.$$

When $\sigma_\alpha^2 = 1$ and $\sigma_\theta^2 = 0.1$, then Order 1 offers a received SINR of 12.2 dB>$\kappa_1$ & $\kappa_2$ for both received signals, while Order 2 offers a received SINR of 14.1 dB>$\kappa_1$ & $\kappa_2$ also for both received signals. This translates to a sum rate for Order 1 which is equal to 8.2 bps/Hz, and a sum rate for Order 2 equal to 9.5 bps/Hz. If Order 2 satisfies the received SINR constraint, then, $\gamma_1$ and $\gamma_2$ can be re-adjusted to increase (maximize) the sum rate to 9.62 bps/Hz by allowing $$\frac{\gamma_1}{\gamma_2} = 1.$$

In conclusion, by selecting Order 2, one can offer a larger sum rate than the one offered by Order 1.

Another Embodiment for Pre-Weighting Selection in Method "A":

For the special case of UL MU-MIMO where $N_r = 1$, i.e. all receiving devices have a total of only one antenna, UL MU-MIMO reduces to UL MU-MISO. In this case, the set of ordered received SINR equations is written as:

$$\eta_{1_{1,o}} \triangleq \frac{E\left\{ \left| h_{1_{1,o}} h_{Ch_{1_{1,o}}} \gamma_{1_{1,o}} \alpha_{1_{1,o}} \right|^2 \right\}}{E\left\{ \left| h_{1_{1,o}} \theta_{1_{1,o}} \right|^2 \right\} + E\left\{ \left| \sum_{t=2}^{N_t} h_{1_{1,o}} h_{Ch_{1_{1,o}}} \gamma_{1_{1,o}} \alpha_{1_{1,o}} \right|^2 \right\}} \geq \kappa_{1_{1,o}} \quad (29a)$$

-continued $$\eta_{1_{2,o}} \triangleq \frac{E\{|h_{1_{2,o}} h_{Ch_{1_{2,o}}} \gamma_{1_{2,o}} \alpha_{1_{2,o}}|^2\}}{E\{|h_{1_{2,o}} \theta_{1_{,o}}|^2\} + E\{|\sum_{l=3}^{N_t} h_{1_{2,o}} h_{Ch_{l_{o2,}}} \gamma_{l_{2,o}} \alpha_{l_{2,o}}|^2\}} \geq \kappa_{1_{2,o}} \quad (29b)$$

$$\vdots$$

$$\eta_{1_{N_t,o}} \triangleq \frac{E\{|h_{1_{N_t,o}} h_{Ch_{1_{N_t,o}}} \gamma_{1_{N_t,o}} \alpha_{1_{N_t,o}}|^2\}}{E\{|h_{1_{N_t,o}} \theta_{1_{,o}}|^2\}} \geq \kappa_{1_{N_t,o}} \quad (29c)$$

where $$\bullet \begin{bmatrix} \eta_{1,o} \\ \vdots \\ \eta_{1_{N_t,o}} \end{bmatrix}$$

is the ordered received SINR vector;

$$\bullet \begin{bmatrix} \kappa_{1,o} \\ \vdots \\ \kappa_{1_{N_t,o}} \end{bmatrix}$$

is the ordered minimum required received SINR;

$$\bullet \begin{bmatrix} h_{1,o} \\ \vdots \\ h_{1_{N_t,o}} \end{bmatrix}$$

is the ordered filter element;

$$\bullet \begin{bmatrix} h_{Ch_{1,o}} \\ \vdots \\ h_{Ch_{1_{N_t,o}}} \end{bmatrix}$$

is the ordered Channel vector, $h_{Ch}$;

$$\begin{bmatrix} \gamma_{1,o} \\ \vdots \\ \gamma_{1_{N_t,o}} \end{bmatrix}$$

is the ordered pre-weighting vector, $\vec{\gamma}_o$; and $$\begin{bmatrix} \alpha_{1,o} \\ \vdots \\ \alpha_{1_{N_t,o}} \end{bmatrix}$$

is the ordered signal vector, $\vec{\alpha}_o$.

The pre-weighting vector, $\vec{\gamma}_o$, must be selected to satisfy the received SINR constraints in Equations (29a), ..., (29c), under the transmit Power constraint in Equation (26). However, since the signal vector, $$\begin{bmatrix} \alpha_{1,o} \\ \vdots \\ \alpha_{1_{N_t,o}} \end{bmatrix},$$

is unknown to the receiving devices, then an assumption in Equations (29a), ..., (29c) is made, which is to assume that the elements of the signal vector are independent identically distributed (iid) with zero mean and variance $\sigma_\alpha^2$. In other words, Equations (29a), ..., (29c) can re-written as $$\eta_{1,o} \triangleq \frac{\sigma_\alpha^2 |h_{Ch_{1,o}} \gamma_{1,o}|^2}{\sigma_\theta^2 + \sigma_\alpha^2 \sum_{l=2}^{N_t} |h_{Ch_{1,o}} \gamma_{l,o}|^2} \geq \kappa_{1,o} \quad (30a)$$

$$\eta_{1_{2,o}} \triangleq \frac{\sigma_\alpha^2 |h_{Ch_{1_{2,o}}} \gamma_{1_{2,o}}|^2}{\sigma_\theta^2 + \sigma_\alpha^2 \sum_{l=3}^{N_t} |h_{Ch_{1_{2,o}}} \gamma_{l_{2,o}}|^2} \geq \kappa_{1_{2,o}} \quad (30b)$$

$$\vdots$$

$$\eta_{1_{N_t,o}} \triangleq \frac{\sigma_\alpha^2 |h_{Ch_{1_{N_t,o}}} \gamma_{1_{N_t,o}}|^2}{\sigma_\theta^2} \geq \kappa_{1_{N_t,o}} \quad (30c)$$

Or equivalently, $$\vec{\gamma}_o \triangleq \begin{bmatrix} \gamma_{1,o} \\ \vdots \\ \gamma_{1_{N_t,o}} \end{bmatrix}$$

can be derived starting with Equation (30c) as follows $$|h_{Ch_{1_{N_t,o}}} \gamma_{1_{N_t,o}}|^2 \geq \frac{\kappa_{1_{N_t,o}}}{\nu} \quad (31a)$$

$$|h_{Ch_{1_{N_t-1,o}}} \gamma_{1_{N_t-1,o}}|^2 \geq \frac{\kappa_{1_{N_t-1,o}}}{\nu}(1 + \kappa_{1_{N_t,o}}) \quad (31b)$$

$$|h_{Ch_{1_{N_t-2,o}}} \gamma_{1_{N_t-2,o}}|^2 \geq \frac{\kappa_{1_{N_t-2,o}}}{\nu}(1 + \kappa_{1_{N_t-1,o}})(1 + \kappa_{1_{N_t,o}}) \quad (31c)$$

$$\vdots$$

$$|h_{Ch_{1,o}} \gamma_{1,o}|^2 \geq \frac{\kappa_{1,o}}{\nu}(1 + \kappa_{1_{2,o}})(1 + \kappa_{1_{3,0}}) \cdots (1 + \kappa_{1_{N_t,o}}) \quad (31c)$$

In general, we have $N_t$ equations to be used to derive $$\vec{\gamma}_o \triangleq \begin{bmatrix} \gamma_{1,o} \\ \vdots \\ \gamma_{1_{N_t,o}} \end{bmatrix}$$

as follows $$|\gamma_{1_{i,o}}|^2 \geq \frac{\kappa_{1_{i,o}}}{v|h_{Ch_{1_{i,o}}}|^2} \prod_{k=i+1}^{N_t} (1 + \kappa_{1_{k,o}}) \quad 1 \leq i \leq N_t \quad (32)$$

where $$v \triangleq \frac{\sigma_\alpha^2}{\sigma_\theta^2}$$

is the normalized SNR for the signal elements.

Another Selection of the Ordering of $$\begin{bmatrix} \eta_1 \\ \vdots \\ \eta_{N_t} \end{bmatrix} \text{ into } \begin{bmatrix} \eta_{1,o} \\ \vdots \\ \eta_{1_{N_t,o}} \end{bmatrix}$$

in Method "A":

Based on Equation (32) and the transmit Power constraint in Equation (26), a selection of the ordering of $$\begin{bmatrix} \eta_1 \\ \vdots \\ \eta_{N_t} \end{bmatrix} \text{ into } \begin{bmatrix} \eta_{1,o} \\ \vdots \\ \eta_{1_{N_t,o}} \end{bmatrix}$$

in Equation (30) is based on selecting $|\gamma_{1_{i,o}}|^2$ in such a way as to maximize the sum rate under the constraints:

$$\sum_{i=1}^{N_t} \left\{ \frac{\kappa_{1_{i,o}}}{v|h_{Ch_{1_{i,o}}}|^2} \prod_{k=i+1}^{N_t} (1 + \kappa_{1_{k,o}}) \right\} \leq \sum_{i=1}^{N_t} |\gamma_{1_{i,o}}|^2 \leq \frac{P}{\sigma_\alpha^2} \quad (33a)$$

One possible way for ordering $$\begin{bmatrix} \eta_{1,o} \\ \vdots \\ \eta_{1_{N_t,o}} \end{bmatrix}$$

and for selecting $$\begin{bmatrix} \gamma_{1,o} \\ \vdots \\ \gamma_{1_{N_t,o}} \end{bmatrix}$$

which satisfies the constraints in Equation (33a), is to exhaustively search for all possible ordering combinations of $$\begin{bmatrix} \gamma_{1,o} \\ \vdots \\ \gamma_{1_{N_t,o}} \end{bmatrix}$$

until at least one ordering combination satisfies Equation (33b)

$$\sum_{i=1}^{N_t} \left\{ \frac{\kappa_{1_{i,o}}}{v|h_{Ch_{1_{i,o}}}|^2} \prod_{k=i+1}^{N_t} (1 + \kappa_{1_{k,o}}) \right\} \leq \frac{P}{\sigma_\alpha^2} \quad (33b)$$

If one ordering combination satisfies Equation (33b), then the next step is to select $$\begin{bmatrix} \gamma_{1,o} \\ \vdots \\ \gamma_{1_{N_t,o}} \end{bmatrix}$$

in Equation (33a) in such a way that the sum rate is maximized using an "adjusted" waterfilling strategy. If more than one ordering combinations satisfy Equation (33b), then the next step is to select the ordering, which corresponds to the largest minimum sum rate.

Another possible way for ordering $$\begin{bmatrix} \eta_{1,o} \\ \vdots \\ \eta_{1_{N_t,o}} \end{bmatrix}$$

(and for selecting $$\begin{bmatrix} \gamma_{1,o} \\ \vdots \\ \gamma_{1_{N_t,o}} \end{bmatrix} )$$

which satisfies the constraints in Equation (33b), is to sort $$\begin{bmatrix} \frac{\kappa_1}{|h_{Ch_1}|^2} \\ \vdots \\ \frac{\kappa_{N_t}}{|h_{Ch_{N_t}}|^2} \end{bmatrix}$$

from high to low with the largest value assigned to $i=N_t$, and the next largest value assigned to $i=N_t-1$, etc. Once again, if one ordering combination satisfies Equation (33b), then the next step is to select $$\begin{bmatrix} \gamma_{1,o} \\ \vdots \\ \gamma_{1_{N_t,o}} \end{bmatrix}$$

in Equation (33a) in such a way that the sum rate is maximized using an "adjusted" waterfilling strategy. On the other hand, if more than one ordering combinations satisfy Equation (33b), then the next step is to select the ordering, which corresponds to the largest minimum sum rate.

Method III for Relaxing Received SINR Constraint in Method "A":

Alternatively, if Equation (33b) cannot be satisfied for any ordering of $$\begin{bmatrix} \eta_1 \\ \vdots \\ \eta_{N_t} \end{bmatrix},$$

several remedies exist (e.g., using process 917 of FIG. 9F). For example, the maximum value, $\mathcal{S}$, which is obtained as $$|\gamma_{1_{S,o}}|^2 \triangleq \max\{|\gamma_{1_{1,o}}|^2, |\gamma_{1_{2,o}}|^2, \ldots, |\gamma_{1_{N_t-1,o}}|^2\},$$

is removed (e.g., as described with reference to step 923) from the left hand side of Equation (33b) and is placed in a set, $\vec{\gamma}_{S_o}$, and its corresponding indices, $\mathcal{S}$ is placed in another set, $\mathcal{S}_o$. This is repeated until Equation (33b) is satisfied. The formed set of squared values in $\vec{\gamma}_{S_o}$, is then replaced by a zero value, i.e. the corresponding information elements that correspond to $\vec{\gamma}_{S_o}$ are not transmitted.

Method IV for Relaxing Received SINR Constraint in Method "A":

Another remedy for the case when Equation (33b) cannot be satisfied for any ordering of $$\begin{bmatrix} \eta_1 \\ \vdots \\ \eta_{N_t} \end{bmatrix},$$

is to reduce (e.g., as described with reference to step 927) the left hand side of Equation (33b) by a factor which would make it equal to the right hand side of equation (33b), i.e. we need to find a factor, $\lambda$, such that $$\lambda \sum_{i=1}^{N_t} \left\{ \frac{\kappa_{1_{i,o}}}{\nu \left| h_{Ch_{1_{i,o}}} \right|^2} \sum_{k=i+1}^{N_t} (1 + \kappa_{1_{k,o}}) \right\} = \frac{P}{\sigma_{\tilde{\alpha}}^2}$$

In other words, instead of accommodating only a few of the terminal nodes as in the previous strategy, this strategy attempts to accommodate all terminal nodes in a fair fashion.

Note: When choosing between the two Methods for relaxing the SINR constraint, one can rely on the variance of $$\{|\gamma_{1_{1,o}}|^2, |\gamma_{1_{2,o}}|^2, \ldots, |\gamma_{1_{N_t-1,o}}|^2\}.$$

If the variance is above a pre-specified threshold (e.g., as described with reference to step 919), then Method III is selected, otherwise, Method IV is selected.

DL MU-MIMO Network:

We now consider a Downlink Multi-User MIMO (DL MU-MIMO) network. Since the network is an MU network, we assume that a number, $U_t$, of transmitting devices (access nodes) are assigned to communicate simultaneously with a number, $U_r$, of receiving devices (terminal nodes). Since the network is a MIMO network, we assume that the $v^{th}$ transmitting device (access node) contains a number, $N_t^v$, of transmit antennas and that the $w^{th}$ receiving device (terminal node) contains a number, $N_r^w$, of receive antennas. In other words, the $U_t$ transmitting devices (access nodes) transmit $N_t$ pre-weighted signal elements, $\vec{\alpha}'$, at a time (i.e. during one epoch), which represent N information elements, $\vec{\zeta}$, across a communications channel over a total of $N_t$ transmit antennas ($N_t$ Txs), and the $U_r$ receiving devices (access nodes) receive the $N_t$ transmitted pre-weighted signal elements over a total of $N_r$ receive antennas ($N_r$ Rxs), where $$N_t \triangleq N_t^1 + \ldots + N_t^{U_t} \text{ and } N_r \triangleq N_r^1 + \ldots + N_r^{U_r}.$$

The $v^{th}$ transmitting device (access node) intends to transmit an information element, $\zeta_{k,m}^{w,v}$ using its $m^{th}$ Tx to the $k^{th}$ Rx of the $w^{th}$ receiving device (terminal node) over a communications channel defined by a channel element, $h_{Ch_{k,m}}^{w,v}$. The sum rate of the system is therefore $$\Sigma_{w=1}^{U_r}\Sigma_{v=1}^{U_t}\Sigma_{k=1}^{N_r^w}\Sigma_{m=1}^{N_t^v}\mathcal{R}_{k,m}^{w,v} = \Sigma_{w=1}^{U_r}\Sigma_{v=1}^{U_t}\Sigma_{k=1}^{N_r^w}\Sigma_{m=1}^{N_t^v}w_{k,m}^{w,v}\log_2(1+\eta_{k,m}^{w,v}) \quad (34)$$

where
- $\mathcal{R}_{k,m}^{w,v}$ is the rate corresponding to the transmission by the $v^{th}$ transmitting device (access node) of the information element, $\zeta_{k,m}^{w,v}$ using its $m^{th}$ Tx to the $k^{th}$ Rx of the $w^{th}$ receiving device (terminal node);
- $w_{k,m}^{w,v}$ is the bandwidth corresponding to the transmission by the $v^{th}$ transmitting device (access node) of the information elements, $\zeta_{k,m}^{w,v}$ using its $m^{th}$ Tx to the $k^{th}$ Rx of the $w^{th}$ receiving device (terminal node); and
- $\eta_{k,m}^{w,v}$ is the received SINR for the information elements, $\zeta_{k,m}^{w,v}$ at the $k^{th}$ Rx of the $w^{th}$ receiving device (terminal node).

Equation (34) can be used to represent the sum rate corresponding to any type of downlink transmissions including multicasting, unicasting and broadcasting transmissions. Equivalently, the $U_t$ transmitting devices (access nodes) transmit $U_t$ signal vectors, $\vec{\alpha}''^1, \ldots, \vec{\alpha}''^{U_t}$, at a time, i.e. a signal vector per transmitting device, to $U_r$ receiving devices. The $w^{th}$ receiving device (terminal node) receives a signal vector, $\vec{\beta}^w$, consisting of $N_r^w$ elements, over $N_r^w$ Rxs, i.e. one received signal element per Rx. The communications channel between all $N_t$ TXs (access node antennas) and the $N_r^w$ Rxs ($w^{th}$ terminal node antennas) is assumed to be flat fading linear time-invariant (LTI) with additive white Gaussian Noise (AWGN), i.e. the channel can be characterized using the sub-matrices, $h_{Ch}^{w,1}, \ldots, h_{Ch}^{w,U_r}$ and the noise can be characterized using a noise vector, $\vec{\theta}^w$. The relationship between $$\vec{\beta}^w \text{ and } \begin{bmatrix} \vec{\alpha}''^1 \\ \vdots \\ \vec{\alpha}''^{U_t} \end{bmatrix}$$

during one epoch is therefore assumed to be $$\vec{\beta}^w = \sum_{v=1}^{U_r} h_{Ch}^{w,v} \vec{\alpha}''^v + \vec{\theta}^w \quad (35a)$$

$$= [h_{Ch}^{w,1} \ldots h_{Ch}^{w,U_r}] \begin{bmatrix} \vec{\alpha}''^1 \\ \vdots \\ \vec{\alpha}''^{U_t} \end{bmatrix} + \vec{\theta}^w \quad (35b)$$

$$= h_{Ch}^w \vec{\alpha}'' + \vec{\theta}^w \quad (35c)$$

where
- $h_{Ch}^{w,v} \equiv N_r^w \times N_t^v$ is the Channel sub-matrix between the $v^{th}$ transmitting device (access node) and the $w^{th}$ receiving device (terminal node), which is defined by its $k^{th}$ row and $m^{th}$ column element, $h_{Ch_{k,m}}^{w,v}$;
- $h_{Ch_{k,m}}^{w,v}$ represents the complex attenuation of the flat fading linear time-invariant wireless channel connecting the $m^{th}$ Tx (access node antenna) of the $v^{th}$ transmitting device (access node) to the $k^{th}$ Rx (terminal node receive antenna) of the $w^{th}$ receiving device (terminal node) for $1 \le m \le N_t^v$, $1 \le k \le N_r^w$, $1 \le v \le U_t$, and $1 \le w \le U_r$;
- $\vec{\alpha}'' \equiv N_t \times 1$ is the pre-coded and pre-weighted signal vector for the $N_t$ transmitting devices (access nodes), which is defined by its $m^{th}$ element, $\alpha''_m$;
- $\alpha''_m$ is the $m^{th}$ element of $\vec{\alpha}''$ which is defined as $$\vec{\alpha}'' \triangleq \chi\{\vec{\alpha}'\};$$

- $\vec{\alpha}' \equiv N_t \times 1$ is the pre-weighted signal vector which is defined by its $m^{th}$ pre-weighted signal element, $\alpha'_m$;
- $\alpha'_m$ is the $m^{th}$ element of $\vec{\alpha}'$ which is defined as $$\vec{\alpha}' \triangleq \begin{bmatrix} \alpha'_1 \\ \vdots \\ \alpha'_{N_t} \end{bmatrix} \triangleq \begin{bmatrix} \gamma_1 \alpha_1 \\ \vdots \\ \gamma_{N_t} \alpha_{N_t} \end{bmatrix};$$

$$\vec{\alpha} \triangleq \begin{bmatrix} \alpha_1 \\ \vdots \\ \alpha_{N_t} \end{bmatrix}; \equiv N_t \times 1$$

is the signal vector which is defined by its $m^{th}$ signal element, $\alpha_m$;
- $\vec{\zeta} \equiv N \times 1$ is the information vector which is represented by the signal vector $$\begin{bmatrix} \alpha_1 \\ \vdots \\ \alpha_{N_t} \end{bmatrix};$$

- $\chi\{\vec{\alpha}'\}$ is the pre-coding function which pre-codes the pre-weighted signal vector, $$\vec{\alpha}' \triangleq \begin{bmatrix} \alpha'_1 \\ \vdots \\ \alpha'_{N_t} \end{bmatrix} \triangleq \begin{bmatrix} \gamma_1 \alpha_1 \\ \vdots \\ \gamma_{N_t} \alpha_{N_t} \end{bmatrix},$$

to produce the pre-coded and pre-weighted signal vector, $$\vec{\alpha}'' \triangleq \chi\{\vec{\alpha}'\};$$

- $\vec{\gamma} \equiv N_t \times 1$ is the pre-weighting vector defined as $$\vec{\gamma} \triangleq \begin{bmatrix} \gamma_1 \alpha_1 \\ \vdots \\ \gamma_{N_t} \alpha_{N_t} \end{bmatrix}$$

which pre-weights the signal vector, $\vec{\alpha}$, to produce the pre-weighted signal vector, $\vec{\alpha}'$;

$$\vec{\beta}^w \triangleq \begin{bmatrix} \beta_1^w \\ \vdots \\ \beta_{N_r^w}^w \end{bmatrix} \equiv N_r^w \times 1$$

output of the $w^{th}$ receiving device (terminal node) for $1 \le w \le U_r$, one element per Rx;

$$\vec{\alpha}''^v \triangleq \begin{bmatrix} \alpha''^v_1 \\ \vdots \\ \alpha''^v_{N_t^v} \end{bmatrix} \equiv N_t^v \times 1$$

input to the $v^{th}$ transmitting device (access node) for $1 \le v \le U_t$, one element per Tx;

$$\vec{\theta}^w \triangleq \begin{bmatrix} \theta_1^w \\ \vdots \\ \theta_{N_r^w}^w \end{bmatrix} \equiv N_r^w \times 1$$

noise contaminating the output of the $w^{th}$ receiving device (terminal node) for $1 \le w \le U_r$, one element per Rx;
- $N_t^v$ is the number of Txs in the $v^{th}$ transmitting device (access node) for $1 \le v \le U_t$;
- $N_r^w$ is the number of Rxs in the $w^{th}$ receiving device (terminal node) for $1 \le w \le U_r$;

$$h_{Ch}^w \triangleq [h_{Ch}^{w,1} \ldots h_{Ch}^{w,U_t}] \equiv N_r^w \times N_t$$

represents the communications Channel over which all $U_t$ transmitting devices (access nodes) transmit via their $N_t$ Txs to the $w^{th}$ receiving device (terminal node); and $$N_t \triangleq N_t^1 + \ldots + N_t^{U_t}$$

is the total number of Txs in the network.

Equations (34c) can be re-written to include the entire communications network, i.e. to include all $U_r$ receiving devices with all their $N_r$ Rxs as follows:

$$\begin{bmatrix} \vec{\beta}^1 \\ \vdots \\ \vec{\beta}^{U_r} \end{bmatrix} = h_{Ch}\chi\{\vec{\alpha}'\} + \vec{\theta} \quad (36a)$$

$$= h_{Ch}\chi\left\{\begin{bmatrix} \gamma_1 \alpha_1 \\ \vdots \\ \gamma_{N_r} \alpha_{N_r} \end{bmatrix}\right\} + \vec{\theta} \quad (36b)$$

where $$\cdot h_{Ch} \triangleq \begin{bmatrix} h_{Ch}^1 \\ \vdots \\ h_{Ch}^{U_r} \end{bmatrix} = \begin{bmatrix} h_{Ch}^{1,1} & \cdots & h_{Ch}^{1,U_t} \\ \vdots & \ddots & \vdots \\ h_{Ch}^{U_r,1} & \cdots & h_{Ch}^{U_r,U_t} \end{bmatrix} \equiv N_r \times N_t$$

is referred to as the Channel matrix defined by its sub-matrix, $h_{Ch}^{w,v}$, which is located at the $w^{th}$ column block and at the $v^{th}$ row block of $h_{Ch}$;

sub-matrix $h_{Ch}^{w,v}$ connects the $v^{th}$ transmitting device (terminal node) to the $w^{th}$ receiving device (access node) via the various Txs in the $v^{th}$ transmitting device (terminal node) and the various Rxs in the $w^{th}$ receiving device (access node), for $1 \leq v \leq U_t$, and $1 \leq w \leq U_r$;

$N_r^w$ is the total number of received signal elements in $\vec{\beta}^w$, at the $w^{th}$ receiving device (terminal node) for $1 \leq w \leq U_r$;

$N_t^v$ is the total number of transmitted pre-coded and pre-weighted signal elements, $\vec{\alpha}'''^v$, at the $v^{th}$ transmitting device (access node) for $1 \leq v \leq U_t$;

$N_r$ is the total number of received signal elements $$\begin{bmatrix} \vec{\beta}^1 \\ \vdots \\ \vec{\beta}^{U_r} \end{bmatrix}$$

across all $U_r$ receiving devices (access nodes);

$N_t$ is the total number of transmitted pre-coded and pre-weighted signal elements $$\begin{bmatrix} \vec{\alpha}'''^1 \\ \vdots \\ \vec{\alpha}'''^{U_t} \end{bmatrix}$$

across all $U_t$ transmitting devices (terminal nodes);

$$\cdot \begin{bmatrix} \beta_1 \\ \vdots \\ \beta_{N_r} \end{bmatrix} \triangleq \begin{bmatrix} \vec{\beta}^1 \\ \vdots \\ \vec{\beta}^{U_r} \end{bmatrix}$$

where the $U_r$ vectors, $$\begin{bmatrix} \vec{\beta}^1 \\ \vdots \\ \vec{\beta}^{U_r} \end{bmatrix},$$

are converted into $N_r$ elements, $$\begin{bmatrix} \beta_1 \\ \vdots \\ \beta_{N_r} \end{bmatrix};$$

$$\cdot \begin{bmatrix} \alpha_1'' \\ \vdots \\ \alpha_{N_t}'' \end{bmatrix} \triangleq \begin{bmatrix} \vec{\alpha}'''^1 \\ \vdots \\ \vec{\alpha}'''^{U_t} \end{bmatrix}$$

where the $U_t$ vectors, $$\begin{bmatrix} \vec{\alpha}'''^1 \\ \vdots \\ \vec{\alpha}'''^{U_t} \end{bmatrix},$$

are converted into $N_t$ elements, $$\begin{bmatrix} \alpha_1'' \\ \vdots \\ \alpha_{N_t}'' \end{bmatrix};$$

and $$\cdot \begin{bmatrix} \theta_1 \\ \vdots \\ \theta_{N_r} \end{bmatrix} \triangleq \begin{bmatrix} \vec{\theta}^1 \\ \vdots \\ \vec{\theta}^{U_r} \end{bmatrix}$$

where the $U_r$ vectors, $$\begin{bmatrix} \vec{\theta}^1 \\ \vdots \\ \vec{\theta}^{U_r} \end{bmatrix},$$

are converted into $N_r$ elements, $$\begin{bmatrix} \theta_1 \\ \vdots \\ \theta_{N_r} \end{bmatrix}.$$

Note: When $\chi\{\bullet\}$ is a linear pre-coding function, it reduces to a matrix $x \equiv N_t \times N_r$ multiplying $\vec{\alpha}'$, i.e.

$$\chi\{\vec{\alpha}'\} = x\vec{\alpha}'$$

DL aspects of the presently disclosed systems and methods intend to improve the overall performance of the communication system represented by Equation (36b) by selecting the $N_r \times 1$ pre-weighting vector $\vec{\gamma}$, corresponding to the $N_r$ signal elements $$\begin{bmatrix} \alpha_1 \\ \vdots \\ \alpha_{N_r} \end{bmatrix}$$

for a given pre-coding function $\chi\{\bullet\}$ under a (minimum) Performance constraint and under the following transmit Power constraint:

$$\|\chi\{\vec{\alpha}'\}\|^2 \leq P \qquad (37a)$$

where P is a fixed value, $\|\chi\{\vec{\alpha}'\}\|^2$ is the $\mathcal{L}_2$-norm of $\chi\{\vec{\alpha}'\}$. When $\chi\{\bullet\}$ is a linear pre-coding function, Equation (37a) reduces to $$|\{x\vec{\alpha}'\}_1|^2 + \ldots + |\{x\vec{\alpha}'\}_{N_t}|^2 \leq P \qquad (37b)$$

where $\{x\vec{\alpha}'\}_m$ is the $m^{th}$ element in the vector $x\vec{\alpha}'$.

The performance of a communications system may be improved in many ways, such as by increasing its overall bandwidth efficiency or by increasing its overall power efficiency. A compromise between both types of efficiencies is to increase the sum rate, $\Sigma_{w=1}^{U_r} \Sigma_{v=1}^{U_t} \Sigma_{k=1}^{N_1^w} \Sigma_{m=1}^{N_1^v} \mathcal{R}_{k,m}^{w,v}$, of the system as defined in Equation (34). The DL aspects of the presently disclosed systems and methods intend to increase the sum rate, $\Sigma_{w=1}^{U_r} \Sigma_{v=1}^{U_t} \Sigma_{k=1}^{N_1^w} \Sigma_{m=1}^{N_1^v} \mathcal{R}_{k,m}^{w,v}$, for a Downlink (DL) MU-MIMO system by selecting the $N_t \times 1$ pre-weighting vector $\vec{\gamma}$, corresponding to the $N_t$ signal elements $$\begin{bmatrix} \alpha_1 \\ \vdots \\ \alpha_{N_r} \end{bmatrix}$$

under a (maximum) transmit Power constraint and a (minimum) Performance constraint. Before showing the proposed pre-weighting selection method for the DL MU-MIMO, we review the general concept of Channel estimation in DL MU-MIMO and generally the various types of pre-coding that are available for MU-MIMO. Other pre-coding techniques may also be used.

Channel Estimation in DL MU-MIMO:

The full knowledge of the channel matrix, $h_{Ch}$, at a transmitter is sometimes referred to as Channel Side Full Information at Transmitter (CSFIT) which is defined as estimating at all $U_t$ transmitting devices (access nodes) the communications channel matrix $h_{Ch}$ between all transmitting devices (access nodes) and all receiving devices (terminal nodes). This is possible as long as all $U_t$ transmitting devices are able to cooperate, and the channel is reciprocal. Alternatively, if the channel is slowly varying, then the transmitting devices can receive the requested channel estimates from the receiving devices. The partial knowledge of the channel matrix, $h_{Ch}^w$, at a transmitter is sometimes referred to as Channel Side Partial Information at Transmitter (CSPIT) which is defined as estimating at the $w^{th}$ receiving device the communications network matrix, $h_{Ch}^w$, between all transmitting devices (access nodes) and the $w^{th}$ receiving device (terminal node) and of the interference that is sensed by the $w^{th}$ receiving device (terminal node).

Pre-Coding in DL MU-MIMO:

In addition to the Methods of Reception discussed earlier, there are several types of pre-coding that are available for DL MU-MIMO. The first type of pre-coding is intended to fully pre-compensate for the effects of the channel at the transmitting devices (i.e. prior to transmission) in order to use a simple hard-decision detector at the receiving devices. This type of pre-coding is sometimes referred to as Iterative Pre-Cancellation (IPC). It has been shown to represent a duality with SIC (e.g., as described with reference to process 700) at the receiving devices. In other words, Method "A," that was derived in the UL for selecting the ordering combination and the weighting values for UL MU-MIMO and which uses SIC at the receiving devices, has an equivalent method, Method "B," for selecting the ordering combination and the pre-weighting values for DL MU-MIMO, including using IPC at the transmitting devices. Often, the purpose of applying IPC pre-coding (e.g., as described with reference to step 1203) to the transmit signal in FIG. 12A is to pre-compensate for the effects of the channel by pre-diagonalizing the channel matrix.

The second type of pre-coding is intended to partially pre-compensate for the effects of the channel at the transmitting devices (i.e. prior to transmission) and to rely on partial SIC at the receiving devices. We refer to this type of pre-coding as partial IPC. Once again, partial IPC combined with partial SIC have been shown to represent a duality with either IPC at the transmitting devices or SIC at the receiving devices. Method "C" represents selecting the ordering combination and the weighting values for DL MU-MIMO using this type of pre-coding. Often, the purpose of applying partial IPC pre-coding (e.g., as described with reference to step 1213) to the transmit signal in FIG. 12B is to partially pre-compensate for the effects of the channel by pre-block diagonalizing the channel matrix.

Finally, the third type of pre-coding is intended to provide no pre-cancellation for the effects of the channel at the transmitting devices (i.e. prior to transmission) and to rely instead on full SIC at the receiving devices. Method "D" represents selecting the ordering combination and the weighting values for DL MU-MIMO using this type of pre-coding. Often, the purpose of applying no IPC pre-coding (e.g., as described with reference to step 1223) to the transmit signal in FIG. 12C is to ignore the effects of the channel by not pre-diagonalizing the channel matrix. In each method, the terminal nodes may perform their processing without communication with other terminal nodes.

There are generally two types of pre-coding: linear pre-coding, which is generally known to be sub-optimal and non-linear pre-coding which can be selected to be optimal (or asymptotically optimal).

Examples of Linear Pre-coding include:
a Zero Forcing (ZF) Pre-coding (or diagonalizing, or null-steering): This is also generally referred to as Channel inversion. It includes pre-compensating for the effect of the channel using ZF pre-coding. For example, assuming in Equation (35b) that $h_{Ch}$ can be decomposed as $$h_{Ch} = L_{Ch} Q_{Ch} \qquad (38)$$

where
$L_{Ch} \equiv N_r \times N_t$ is a left triangular matrix; and
$Q_{Ch} \equiv N_t \times N_t$ is a unitary matrix.
then x can be selected as $$x = Q^*_{Ch} L_{Ch}^{-1} \qquad (39)$$

so that $h_{Ch} x = L_{Ch} Q_{Ch} Q^*_{Ch} L_{Ch}^{-1}$ produces an identity matrix. When $h_{Ch}$ is ill-conditioned or close to being singular, $L_{Ch}^{-1}$ can be replaced by its pseudo-inverse, $h_{Ch}^{pinv}$.

However, even in this case $h_{Ch}^{pinv}$ can suffer from a power enhancement penalty similar to the noise enhancement penalty in UL MU-MIMO. This type of pre-coding is generally sub-optimal, but is suitable for a low noise (high SNR) high interference environment.

Maximum Ratio Transmission (MRT) Pre-coding (or Maximum Ratio Combining): It includes selecting x as $h^*_{Ch}$. This type of pre-coding is generally suboptimal, but is suitable for a high noise (low SNR) low interference environment. When the interference between transmitting devices is high, the performance of MRT pre-coding degrades rapidly. A compromise between the severe degradation of the performance of MRT pre-coding in an interference-dominated environment and that of ZF pre-coding in a noise-dominated environment is Weighted Minimum Mean Square Error (WMMSE) pre-coding.

Weighted Minimum Mean Square Error (WMMSE) Pre-coding (or Weighted Wiener pre-filtering or regularized Zero Forcing Pre-coding): This is also generally referred to as regularized Channel inversion. It includes pre-compensating for the effect of the channel using weighted MMSE pre-coding, i.e. replacing $L_{Ch}^{-1}$ in the ZF pre-coding by a function which is similar to Equation (6) with pre-weighting, i.e. it takes into account the effect of the noise and of the remaining interference. It represents a compromise between the ZF pre-coding and the MRT pre-coding.

Block Diagonalization: The method removes the interference from signals intended to be received by each receiving device, the interference being caused by signals intended for all other $U_r-1$ receiving devices. This is in contrast to a diagonalization method which removes the interference from signals intended to be received by each Rx, the interference being caused by signals intended for all other $N_r-1$ Rxs. The distinction between diagonalizing and block-diagonalizing is due to the fact that the $w^{th}$ receiving device has $N_r^w$ Rxs, hence it can pre-compensate for the $N_r^w$ received signals using any number of pre-coding such as MRT pre-coding, ZF pre-coding or WMMSE pre-coding.

Note: Linear pre-coding is generally sub-optimal due to the power enhancement penalty, which exists on an ill-conditioned channel. Generally, non-linear pre-coding offers a performance improvement to linear pre-coding at the cost of increased complexity in terms of searching for adequate non-linear pre-coding for a specific channel at the transmitting devices, and removal of the effect of non-linear pre-coding at the receiving devices.

Non-Linear Pre-coding is generally referred to as Dirty Paper Pre-coding (DPC). It includes using a non-linear operation prior to inverting $L_{Ch}$ to reduce the power enhancement penalty in the transmitting devices, together with another non-linear operation in the receiving devices to remove the effect of the first non-linear operation. Several types of non-linear operations exist to reduce the power enhancement penalty in the transmitting devices. They include addition or multiplication at the transmitting devices of the information elements by a set of pre-weighting values followed by a non-linear operation prior to transmission and another non-linear operation post reception.

Examples of non-linear pre-coding that may be used in IPC include: Costas Pre-coding; Tomlinson-Harashima Pre-coding; and Vector Perturbation:

Method "B" for Selecting Ordering and Pre-Weighting for DL MU-MIMO:

Assumptions "B":

1. Since the portion of the network that Method B is concerned with is a DL network, the method assumes that the $U_t$ transmitting devices (access nodes) are able to cooperate. This is a realistic assumption when the transmitting devices are access nodes belonging to the same network. Otherwise, the non-cooperating access nodes see one another as separate interfering networks.
2. Since the network is a DL network, the method assumes that the channel matrix, $h_{Ch}$, (or portions of the channel matrix such as $h_{Ch}^w$) is known by the $U_t$ transmitting devices (access nodes) and by the $U_r$ receiving devices (terminal nodes). The transmitting devices may know all parts of the channel matrix in an LTE system, for example, by (a) the access nodes transmitting reference signals, (b) the terminal nodes computing local channel estimates, (c) the terminal nodes sending their local channel estimates to the access nodes, and (d) the access nodes sending an aggregated channel matrix to the terminal nodes using, for example, a broadcast control channel such as PDCCH. It is realistic to assume that the receiving devices are able to estimate their corresponding channel, i.e. $h_{Ch}^w$. However, for the transmitting devices to be able to estimate their corresponding channel requires the channel to be either slowly varying in time or reciprocal.
3. Based on the two previous assumptions that the channel matrix, $h_{Ch}$, (or portions of the channel matrix such as $h_{Ch}^w$) is known by the $U_t$ transmitting devices and that the $U_t$ transmitting devices are able to cooperate, the method assumes that full IPC is selected at the $U_t$ transmitting devices (access nodes) with pre-weighting of the signals prior transmission. This assumption can be realistically carried out.
4. Based on the previous assumption that full IPC is selected, the method of reception is assumed to include a filter followed by a hard-decision detector.

Constraints "B":

1. When a minimum performance is required per receiving device (terminal node), an equivalent desired received Signal-to-Interference & Noise Ratio (SINR), $\eta_{k,m}^{w,v}$, for the information element, $\zeta_{k,m}^{w,v}$ between the $m^{th}$ Tx of the $v^{th}$ transmitting device (access node) and the $k^{th}$ Rx of the $w^{th}$ receiving device (terminal node), must be constrained to have an equivalent lower bound, $\kappa_{k,m}^{w,v}$, for $1 \le w \le U_r$, $1 \le v \le U_t$, $1 \le k \le N_r^w$, $1 \le m \le N_t^v$ $$\eta_{k,m}^{w,v} \ge \kappa_{k,m}^{w,v} \quad (40)$$

Equation (40) is referred to as the (minimum) received SINR constraint. An equivalent performance measure to the received SINR, $\eta_{k,m}^{w,v}$ is the bit Rate, $\mathcal{R}_{k,m}^{w,v}$, since both are directly related as follows:

$$\mathcal{R}_{k,m}^{w,v} = w_{k,m}^{w,v} \log_2(1 + \eta_{k,m}^{w,v}).$$

The importance of such a constraint is to ensure a minimum download performance for all terminal nodes. When IPC performs ideally, each received SINR value reduces to a received SNR value, and the (minimum) received SINR constraint is replaced by a (minimum) received SNR constraint.

2. Based on the received SINR constraint in Equation (40) for the information element, $\zeta_{k,m}^{w,v}$ between the $m^{th}$ Tx of the $v^{th}$ transmitting device (access node) and the $k^{th}$ Rx of the $w^{th}$ receiving device (terminal node), a pre-weighting vector, $$\vec{\gamma} \triangleq \begin{bmatrix} \gamma_1 \\ \vdots \\ \gamma_{N_t} \end{bmatrix},$$

is selected such that the following transmit Power constraint in Equation (41) is met:

$$E\{\|\chi\{\vec{\alpha}'\}\|^2\} \leq P \quad (41)$$

where P is a pre-specified upper limit on the total transmitted power and $E\{\bullet\}$ denotes statistical averaging with respect to the information elements. The importance of such a constraint is to limit the average transmitted power for all terminal nodes.

Method "B":
If a pre-weighting vector, $$\vec{\gamma} \triangleq \begin{bmatrix} \gamma_1 \\ \vdots \\ \gamma_{N_t} \end{bmatrix},$$

is found which satisfies both the (minimum) received SINR constraint in Equation (40) and the (maximum) transmit Power constraint in Equation (41), then $\vec{\gamma}$ is optimized such that the sum rate $\sum_{w=1}^{U_r}\sum_{v=1}^{U_t}\sum_{k=1}^{N_r^w}\sum_{m=1}^{N_t^v} \mathcal{R}_{k,m}^{w,v}$ is increased (or maximized). This can be accomplished using an "adjusted" waterfilling strategy. The "regular" waterfilling strategy optimizes the sum rate with respect to $\vec{\gamma}$ under the transmit Power constraint in Equation (41). The "adjusted" waterfilling strategy includes the received SINR constraint in Equation (40) together with the transmit Power constraint in Equation (41) when optimizing the sum rate. There are several ways to implement the "adjusted" waterfilling strategy. For example:

Way 1. The first way has two steps:
  a. Find all ordering combinations and corresponding pre-weighting values which satisfy the received SINR constraint.
  b. Select the ordering combination with the largest corresponding sum rate using for example, the waterfilling method subject to the transmit power constraint.

Way 2. The second way has two steps:
  a. Find all ordering combinations and corresponding pre-weighting values which satisfy the transmit power constraint.
  b. Select the ordering combination with the largest corresponding sum rate using for example, the waterfilling method subject to the received SINR constraint.

Way 3. The third way has two steps:
  a. Find all ordering combinations and corresponding pre-weighting values which satisfy both the received SINR constraint and the transmit Power constraint.
  b. Select the ordering combination with the largest corresponding sum rate using for example two Lagrange multipliers when obtaining the solution to the sum rate optimization. The first Lagrange multiplier incorporates the received SINR constraint, while the second Lagrange multiplier incorporates the transmit power constraint.

Other ways to implement adjusted waterfilling strategies may also be used. If no ordering combination is found which satisfies the received SINR constraint, then use either Method V or Method VI below for Relaxing Received SINR constraint in Method "B."

1. If a pre-weighting vector, $$\vec{\gamma} \triangleq \begin{bmatrix} \gamma_1 \\ \vdots \\ \gamma_{N_t} \end{bmatrix},$$

which satisfies both the received SINR constraint in Equation (40) and the transmit Power constraint in Equation (41), cannot be found, then the largest absolute value in $\vec{\gamma}$ may be removed from $\vec{\gamma}$ in Equations (40) and (41) and placed in a set, $S_o$. This is repeated until both Equations (40) and (41) are satisfied. The pre-weighting elements in $S_o$ are forced to take a zero value, i.e. their corresponding signal elements are not transmitted.

2. Alternatively, the received SINR constraint in Equation (40) can be relaxed by reducing the constraint by a fixed factor, $\lambda$, for each transmitting device (access node), until the transmit Power constraint in Equation (41) is satisfied.

3. All optimized $N_t$ pre-weighting vectors (whether zero or non-zero), $$\vec{\gamma} \triangleq \begin{bmatrix} \gamma_1 \\ \vdots \\ \gamma_{N_t} \end{bmatrix},$$

are fed-back (e.g., as described with reference to step 609) by the transmitting devices (access nodes) to all $U_r$ receiving devices (terminal nodes).

The contributions of the presently disclosed systems and methods include the selection of $$\vec{\gamma} \triangleq \begin{bmatrix} \gamma_1 \\ \vdots \\ \gamma_{N_t} \end{bmatrix}$$

for a DL MU-MIMO based on Method "B."

Note: A difference between Method B for DL MU-MIMO and Method A for UL MU-MIMO is that for DL MU-MIMO, the complexity is mainly in the transmitting devices (access nodes) while for UL MU-MIMO, the complexity is mainly in the receiving devices (access nodes), depending on whether the pre-coding is linear or non-linear.

Method V for Relaxing Received SINR Constraint in Method "B":

Alternatively, if Equations (40) and (41) cannot be satisfied for any ordering of $\vec{\gamma}$, several remedies exist. For example, the maximum value, $S$, which is obtained as $$|\gamma_S|^2 \triangleq \max\{|\gamma_1|^2, |\gamma_2|^2, \ldots, |\gamma_{N_t}|^2\},$$

is removed from Equations (40) and (41), and placed in a set, $\vec{\gamma}\, \mathcal{S}$. These are repeated until both Equations (40) and (41) are satisfied. The formed set of squared values in $\vec{\gamma}\, \mathcal{S}$ is then replaced by i a zero value, i.e. the signal elements that correspond to $\vec{\gamma}\, \mathcal{S}$ are not transmitted.

Method VI for Relaxing Received SINR Constraint in Method "B":

Another remedy for the case when Equations (40) and (41) cannot be satisfied for any ordering of $\vec{\gamma}$, is to reduce Equation (40) by a factor, λ, which would allow for an ordering combination to be found which satisfies both Equations (40) and (41). In other words, instead of accommodating only a few of the terminal nodes as in the previous strategy, this strategy attempts to accommodate all terminal nodes in a fair fashion.

Note: When choosing between the two Methods for relaxing the received SINR constraint, one can rely on the variance of $\{|\gamma_1|^2, |\gamma_2|^2, \ldots, |\gamma_{N_t}|^2\}$. If the variance is larger than a pre-specified threshold, then Method V is selected, otherwise, Method VI is selected.

Method "C" for Selecting Ordering and Pre-Weighting for DL MU-MIMO:

Assumptions "C":
1. Since the network is a DL network, the method assumes that the $U_t$ transmitting devices (access nodes) are able to cooperate. This is a realistic assumption when the transmitting devices are access nodes belonging to the same network. Otherwise, the non-cooperating access nodes see one another as two separate interfering networks.
2. Since the network is a DL network, the method assumes that the channel matrix, $h_{Ch}$, (or portions of the channel matrix such as $h_{Ch}^w$) is known by the $U_t$ transmitting devices (access nodes) and by the $U_r$ receiving devices (terminal nodes). It is realistic to assume that the receiving devices are able to estimate their corresponding channel, i.e. $h_{Ch}^w$. However, for the transmitting devices to be able to estimate their corresponding channel requires the channel to be either slowly varying in time or reciprocal.
3. Based on the two previous assumptions that the channel matrix, $h_{Ch}$, (or portions of the channel matrix such as $h_{Ch}^w$) is known by the $U_t$ transmitting devices and that the $U_t$ transmitting devices are able to cooperate, the method assumes that partial IPC is selected at the $U_t$ transmitting devices (access nodes) with pre-weighting of the signals prior to transmission. This assumption can be realistically carried out using for example $Q^*_{Ch}$ as the pre-coding matrix, which forces the channel matrix $h_{Ch}$ to be a left triangular matrix $L_{Ch}$. Other pre-coding matrices may also be used.
4. Based on the previous assumption that partial IPC is selected, the method of reception is assumed to includes a filter across the antennas (Rxs) that belong to a single receiving device, followed by a partial SIC detector to remove the effects of the remaining portion of the channel. For example, using $Q^*_{Ch}$ as the pre-coding matrix, forces the channel matrix $h_{Ch}$ to be a left triangular matrix $L_{Ch}$. In order to remove the effects of the left triangular matrix $L_{Ch}$, a partial SIC detector is required. In this specific case, the first ordered Tx (terminal node antenna), which corresponds to the top diagonal element in $L_{Ch}$, contains ideally no interference. The second ordered Tx contains the effect of the first element, and so on.
5. Based on the previous two assumptions, the method assumes that the ordering combination of all $N_t$ signal elements is based on maximizing the sum rate. Since the selection of the pre-weighting elements affects their corresponding sum rate, the ordering combination of all $N_t$ signal elements is carried out simultaneously with the selection of the pre-weighting elements.

Constraints "C":
1. When a minimum performance is required per receiving device (terminal node), an equivalent desired received Signal-to-Interference & Noise Ratio (SINR), $\eta_{1_{k,m,o}}$, for the $m^{th}$ ordered signal element, $\alpha_{1_{k,m,o}}$, at the $k^{th}$ device must be constrained to have a lower bound, $\kappa_{1_{k,m,o}}$, for $1 \leq m \leq N_t$:

$$\eta_{1_{k,m,o}} \geq \kappa_{1_{k,m,o}} \quad (42)$$

Equation (42) is referred to as the received SINR constraint. The importance of such a constraint is to ensure no error propagation in the partial SIC detector.

2. Based on the received SINR constraint in Equation (42) for the $m^{th}$ ordered information element, $\alpha_{1_{k,m,o}}$, a pre-weighting vector, $$\vec{\gamma}_o \triangleq \begin{bmatrix} \gamma_{1_o} \\ \vdots \\ \gamma_{1_{N_t,o}} \end{bmatrix},$$

is selected such that the following transmit Power constraint is met:

$$E\{\|\chi\{\vec{\alpha}\,'\}\|^2\} \leq P \quad (43)$$

where P is a pre-specified upper limit on the total transmitted power, $E\{\cdot\}$ denotes statistical averaging with respect to the signal vector $\vec{\alpha}$. The importance of such a constraint is to limit the average transmitted power for all terminal nodes.

Method "C":

If a pre-weighting vector, $$\vec{\gamma}_o \triangleq \begin{bmatrix} \gamma_{1_o} \\ \vdots \\ \gamma_{1_{N_t,o}} \end{bmatrix},$$

is found which satisfies both the received SINR constraint in Equation (42) and the transmit Power constraint in Equation (43), then optimize $\vec{\gamma}_o$ such that the sum rate, $\sum_{w=1}^{U_r} \sum_{v=1}^{U_r} \sum_{k=1}^{N_r^w} \sum_{m=1}^{N_t} \mathcal{R}_{k,m}^{w,v}$ in Equation (34) is increased (or maximized). This can be accomplished using an "adjusted" waterfilling strategy. The "regular" waterfilling strategy optimizes the sum rate with respect to $\vec{\gamma}_o$ under the transmit Power constraint in Equation (43). The "adjusted" waterfilling strategy includes the received SINR constraint in Equation (42) together with the transmit Power constraint in Equation (43) when optimizing the sum rate. There are several ways to implement the "adjusted" waterfilling strategy. For example:

Way 1. The first way has two steps:
  a. Find all ordering combinations and corresponding pre-weighting values which satisfy the received SINR constraint.
  b. Select the ordering combination with the largest corresponding sum rate using for example, the waterfilling method subject to the transmit power constraint.

Way 2. The second way has two steps:
  a. Find all ordering combinations and corresponding pre-weighting values which satisfy the transmit power constraint.
  b. Select the ordering combination with the largest corresponding sum rate using for example, the waterfilling method subject to the received SINR constraint.
Way 3. The third way has two steps:
  a. Find all ordering combinations and corresponding pre-weighting values which satisfy both the received SINR constraint and the transmit Power constraint.
  b. Select the ordering combination with the largest corresponding sum rate using for example two Lagrange multipliers when obtaining the solution to the sum rate optimization. The first Lagrange multiplier incorporates the received SINR constraint, while the second Lagrange multiplier incorporates the transmit power constraint.
Other ways to implement adjusted waterfilling strategies may also be used. If no ordering combination is found which satisfies the received SINR constraint, then use either Method VII, VIII, IX or X below for Relaxing Received SINR constraint in Method "C."

1. If more than one ordering combination for the pre-weighting vector, $$\vec{\gamma}_o \triangleq \begin{bmatrix} \gamma_{1_{1,o}} \\ \vdots \\ \gamma_{1_{N_r,o}} \end{bmatrix},$$

are found which satisfy both the received SINR constraint in Equation (42) and the transmit Power constraint in Equation (43), then optimize $\vec{\gamma}_o$ for all ordering combinations such that the sum rate $\Sigma_{w=1}^{U_r} \Sigma_{v=1}^{U_r} \Sigma_{k=1}^{N_r^w} \Sigma_{m=1}^{N_t} \mathcal{R}_{k,m}^{w,v}$ in Equation (34) is maximized for each ordering combination, and select the ordering combination, which corresponds to the largest sum rate.

2. If a pre-weighting vector, $$\vec{\gamma}_o \triangleq \begin{bmatrix} \gamma_{1_{1,o}} \\ \vdots \\ \gamma_{1_{N_t,o}} \end{bmatrix},$$

which satisfies both the received SINR constraint in Equation (42) and the transmit Power constraint in Equation (43), cannot be found, then the largest absolute value in $\vec{\gamma}_o$ is removed from $\vec{\gamma}_o$ in Equations (42) and (43) and placed in a set, $\mathcal{S}_o$. This is repeated until both Equations (42) and (43) are satisfied. The pre-weighting elements in $\mathcal{S}_o$ are forced to take a zero value, i.e. their corresponding signal elements are not transmitted.

3. Alternatively, the received SINR constraint in Equation (42) can be relaxed by reducing the constraint by a fixed factor, $\lambda$, for each transmitting device (access nodes), until the transmit Power constraint in Equation (43) is satisfied.

4. All optimized pre-weighting vectors (whether zero or non-zero), $$\vec{\gamma}_o \triangleq \begin{bmatrix} \gamma_{1_{1,o}} \\ \vdots \\ \gamma_{1_{N_t,o}} \end{bmatrix},$$

are fed-back (e.g., as described with reference to step 609) by the transmitting devices (access nodes) to all $U_r$ receiving devices (terminal nodes) with their corresponding order. The contributions of the presently disclosed systems and methods include the selection of $$\vec{\gamma}_o \triangleq \begin{bmatrix} \gamma_{1_{1,o}} \\ \vdots \\ \gamma_{1_{N_t,o}} \end{bmatrix},$$

and its ordering combination, for a DL MU-MIMO based on Method "C."

Two major differences exist between Method "C" for DL MU-MIMO and Method "A" for UL MU-MIMO:
  Pre-weighting and pre-coding are both required for DL MU-MIMO in Method "C," while for UL MU-MIMO only pre-weighting is performed. This is explained as follows. The number, $N_t$, of Txs is usually larger than the number of Rxs per receiving device (terminal node) in DL MU-MIMO. For this reason, the pre-weighting and pre-coding functions are performed across all $N_t$ Txs. In other words, instead of selecting a scalar pre-weighting element $\gamma_m$ for the $m^{th}$ information element and a filter at the Rxs as in UL MU-MIMO, we combine in DL MU-MIMO the pre-weighting scalar with a filter to produce a pre-weighting and pre coding (pre-filter) vector with $N_t$ output elements for the $m^{th}$ signal element for $1 \leq m \leq N_t$, i.e. one element for each one of the $N_t$ Txs;
  Another difference between Method "C" for DL MU-MIMO and Method "A" for UL MU-MIMO is that for DL MU-MIMO, the complexity is mainly shared between the transmitting devices (access nodes) and the receiving devices (terminal nodes) while for UL MU-MIMO, the complexity is mainly in the receiving devices (access nodes).

An Embodiment for Pre-Weighting Selection in Method "C":
  Assume that the received SINR constraint in Equation (42) is written as $\eta_{1_{m,o}} \geq \kappa_{1_{m,o}}$ and that $Q^*_{Ch}$ is used as the pre-coding matrix in the transmitting devices where $Q^*_{Ch}$ is defined in Equation (38) as part of the LQ decomposition of $h_{Ch}$, i.e. $h_{Ch} = L_{Ch} Q_{Ch}$. In this case, the remaining effect from the channel is the left triangular matrix $L_{Ch}$, which can be removed using a partial SIC at the receiving devices. This approach is supported by the fact that the combination of partial IPC (and pre-weighting) at the transmitting devices and partial SIC at the receiving devices for DL MU-MIMO is equivalent to pre-weighting at the transmitting devices and full SIC at the receiving devices for UL MU-MIMO. In this case, an equivalent set of received SINR equations can be derived after filtering the received signals at the $w^{th}$ receiving device (terminal node) $N_r^w$ Rxs. At the $i^{th}$ iteration, we have $$\eta_{1_{i,o}}^w \triangleq \frac{E\{|\hat{\alpha}_{1_{i,o}}^{w\prime\prime}|^2\}}{E\left\{\left\|h_{Est_{1_{i,o}}}^w \begin{bmatrix} \theta_{1_{i,o}}^w \\ \vdots \\ \theta_{N_{r_{i,o}}^w}^w \end{bmatrix}\right\|^2\right\} + E\left\{\left|\sum_{l=2}^{N_r^{w\prime}-i+1} \hat{\alpha}_{l_{i,o}}^{w\prime\prime\prime}\right|^2\right\}} \geq \kappa_{1_{i,o}}^w \quad (44)$$

for $1 \leq i \leq N_r^{w\prime}$ and for $1 \leq w \leq U_r$, where $N_r^{w\prime}$ is the number of interfering signals out of the total $N_r$ signal elements, which remain in the received signal at the $w^{th}$ Rx due to the left triangular matrix $L_{Ch}$;

$\eta_{1_{i,o}}^w$ is the ordered received SINR for the first information element to be detected in the $i^{th}$ iteration at the $w^{th}$ receiving device (terminal node) using $N_r^w$ Rxs and its corresponding minimum required received SINR, $\kappa_{1_{i,o}}^w$;

$$\hat{\alpha}_{1_{i,o}}^{w\prime\prime} \triangleq h_{Est_{1_{i,o}}}^w \begin{bmatrix} \beta_{1_{i,o}}^w \\ \vdots \\ \beta_{N_{r_{i,o}}^w}^w \end{bmatrix}$$

$$= h_{Est_{1_{i,o}}}^w h_{Ch_{i,o}}^w \vec{\alpha}_{i,o}^{w\prime\prime} + h_{Est_{1_{i,o}}}^w \begin{bmatrix} \theta_{1_{i,o}}^w \\ \vdots \\ \theta_{N_{r_{i,o}}^w}^w \end{bmatrix}$$

$$= h_{Est_{1_{i,o}}}^W h_{Ch_{i,o}}^w x_{i,o}^w \begin{bmatrix} \gamma_{1_{i,o}}^w \alpha_{1_{i,o}}^w \\ 0 \\ \vdots \\ 0 \end{bmatrix} + h_{Est_{1_{i,o}}}^w \begin{bmatrix} \theta_{1_{i,o}}^w \\ \vdots \\ \theta_{N_{r_{i,o}}^w}^w \end{bmatrix}$$

is the estimated value of the 1$^{st}$ pre-coded and pre-weighted signal element, $\alpha_{1_{i,o}}^{w\prime\prime\prime}$, in $\vec{\alpha}_{i,o}^{w\prime\prime\prime}$ after filtering the received signal elements $$\begin{bmatrix} \beta_{1_{i,o}}^w \\ \vdots \\ \beta_{N_{r_{i,o}}^w}^w \end{bmatrix}$$

with a row vector, $h_{Est_{1_{i,o}}}^w$, at the $w^{th}$ receiving device (terminal node);

$h_{Est_{1_{i,o}}}^w \equiv 1 \times N_r^w$ is the 1$^{st}$ row vector of the estimation matrix $h_{Est_{i,o}}^w$ which is used estimate the 1$^{st}$ pre-coded and pre-weighted signal element, $\alpha_{1_{i,o}}^{w\prime\prime\prime}$, in $\vec{\alpha}_{i,o}^{w\prime\prime\prime}$; and $$\begin{bmatrix} \beta_{1_{i,o}}^w \\ \vdots \\ \beta_{N_{r_{i,o}}^w}^w \end{bmatrix} \equiv N_r^w \times 1$$

is a vector consisting of the received signals elements at the $w^{th}$ receiving device (terminal node), which remain after removing the effects of the (i−1) previously detected information elements;

$x_{i,o}^w$ is the ordered pre-coding matrix for the $i^{th}$ iteration at the $w^{th}$ receiving device (terminal node);

$$\hat{\alpha}_{l_{i,o}}^{w\prime\prime\prime} \triangleq h_{Est_{1_{i,o}}}^w h_{Ch_{i,o}}^w x_{i,o}^w \begin{bmatrix} 0 \\ \vdots \\ 0 \\ \gamma_{l_{i,o}}^w \alpha_{l_{i,o}}^w \\ 0 \\ \vdots \\ 0 \end{bmatrix}$$

the interference component corresponding to the $l^{th}$ element, $\alpha_{l_{i,o}}^{w\prime\prime\prime}$, in $\vec{\alpha}_{i,o}^{w\prime\prime\prime}$ after filtering the received signal elements $$\begin{bmatrix} \beta_{1_{i,o}}^w \\ \vdots \\ \beta_{N_{r_{i,o}}^w}^w \end{bmatrix}$$

with the row vector, $h_{Est_{1_{i,o}}}^w$ where $2 \leq l \leq N_r^{w\prime} - i + 1$; and $$h_{Est_{1_{i,o}}}^w \begin{bmatrix} \theta_{1_{i,o}}^w \\ \vdots \\ \theta_{N_{r_{i,o}}^w}^w \end{bmatrix}$$

is the noise component that results from filtering the noise vector $$\begin{bmatrix} \theta_{1_{i,o}}^w \\ \vdots \\ \theta_{N_{r_{i,o}}^w}^w \end{bmatrix}$$

with the row vector $h_{Est_{1_{i,o}}}^w$.

The relationship between the estimate, $\hat{\alpha}_{1_{i,o}}^{w\prime\prime\prime}$, of the pre-weighted signal element $\alpha_{1_{i,o}}^{w\prime\prime\prime}$ and the detected information element, $\check{\zeta}_{1_{i,o}}{}^w$, of the information element $\zeta_{1_{i,o}}{}^w$ is that $\hat{\alpha}_{1_{i,o}}{}^{w\prime\prime}$ must be divided by an a priori known factor, then a hard-decision detector is applied to its inverse to remove the 1:1 function which converts information element $\zeta_{1_{i,o}}{}^w$ to signal element $\alpha_{1_{i,o}}{}^w$, to obtain detected information element $\check{\zeta}_{1_{i,o}}{}^w$. The effect of information element $\zeta_{1_{i,o}}{}^w$ on the received signal elements $$\begin{bmatrix} \beta_{1_{i,o}} \\ \vdots \\ \beta_{N_{r_{i,o}}} \end{bmatrix}$$

is then removed using detected information element $\check{\zeta}_{1_{i,o}}{}^w$ assuming no error propagation. In order to justify such an assumption, the pre-weighting vector, $\vec{\gamma}_o$, must be selected to satisfy the (minimum) received SINR constraint in Equation (42) under the (maximum) Power constraint in Equation (43). However, since the signal vector, $\vec{\alpha}$, is unknown to the receiving devices, then two assumptions are made in Equation (44):

the elements of the signal vector, $\vec{\alpha}$, are independent identically distributed (iid) with zero mean and variance $\sigma_\alpha^2$ and the elements of the noise vector, $\vec{\theta}$, are independent identically distributed (iid) with zero mean and variance $\sigma_\theta^2$.

In other words, Equation (44) can re-written as $$\eta_{1_{i,o}}^w \triangleq \frac{\sigma_\alpha^2 |\xi_{1_{i,o}}^w|^2}{\sigma_\theta^2 h_{Est_{1_{i,o}}}^w h_{Est_{1_{i,o}}}^{w*} + \sigma_\alpha^2 \sum_{l=2}^{N_r^{w\prime}-i+1} |\xi_{l_{i,o}}^w|^2} \geq \kappa_{1_{i,o}}^w \quad (45)$$

where $$|\xi_{1_{i,o}}^w|^2 \triangleq h_{Est_{1_{i,o}}}^w h_{Ch_{i,o}}^w x_{i,o}^w \gamma_{1_{i,o}}^w \begin{bmatrix} 1 & 0 & \cdots & 0 \\ 0 & 0 & \cdots & 0 \\ \vdots & \vdots & \ddots & \vdots \\ 0 & 0 & \cdots & 0 \end{bmatrix} \gamma_{1_{i,o}}^{w*} x_{i,o}^{w*} h_{Ch_{i,o}}^{w*} h_{Est_{1_{i,o}}}^{w*} \quad (46a)$$

$$= |h_{Est_{1_{i,o}}}^w h_{Ch_{i,o}}^w \{x_{i,o}^w\}_1 \gamma_{1_{i,o}}^w|^2 \quad (46b)$$

and $$|\xi_{l_{i,o}}^w|^2 \triangleq h_{Est_{1_{i,o}}}^w h_{Ch_{i,o}}^w x_{i,o}^w \gamma_{l_{i,o}}^w \begin{bmatrix} 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \\ 0 & \vdots & \vdots & 1 & \vdots & \vdots & \vdots \\ 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \end{bmatrix} \quad (47a)$$

$$\gamma_{l_{i,o}}^{w*} x_{i,o}^{w*} h_{Ch_{i,o}}^{w*} h_{Est_{1_{i,o}}}^{w*}$$

$$= |h_{Est_{1_{i,o}}}^w h_{Ch_{i,o}}^w \{x_{i,o}^w\}_l \gamma_{1_{i,o}}^w|^2 \quad (47b)$$

where $\{x_{i,o}^w\}_l$ is the $l^{th}$ column vector in $x_{i,o}^w$. If the estimation filter, $h_{Est_{1_{i,o}}}^w$, is normalized, i.e.

$h_{Est_{1_{i,o}}}^w h_{Est_{1_{i,o}}}^{w*} = 1,$ then $\{x_{i,o}^w\}_l \gamma_{1_{i,o}}^w$ $$\eta_{1_{i,o}}^w \triangleq \frac{\sigma_\alpha^2 |\xi_{1_{i,o}}^w|^2}{\sigma_\theta^2 + \sigma_\alpha^2 \sum_{l=2}^{N_r^{w\prime}-i+1} |\xi_{l_{i,o}}^w|^2} \geq \kappa_{1_{i,o}}^w \quad (48a)$$

$$= \frac{|h_{Est_{1_{i,o}}}^w h_{Ch_{i,o}}^w \{x_{i,o}^w\}_1 \gamma_{1_{i,o}}^w|^2}{\frac{1}{v} + \sum_{l=2}^{N_r^{w\prime}-i+1} |h_{Est_{1_{i,o}}}^w h_{Ch_{i,o}}^w \{x_{i,o}^w\}_l \gamma_{1_{i,o}}^w|^2} \geq \kappa_{1_{i,o}}^w \quad (48b)$$

In this case, the (maximum) Power constraint can be re-written as $$E\{\|\chi\{\vec{\alpha}'\}\|^2\} = \sigma_\alpha^2 \{|\gamma_{1_{1,o}}|^2 + \ldots + |\gamma_{1_{N_{t,o}}}|^2\} \leq P \quad (49)$$

If the ordered pre-weighting vector, $\vec{\gamma}_o$, is found to satisfy both the SINR constraint in Equations (43) and the Power constraint in Equation (44), then the next step is to optimize the sum rate. This can be accomplished using an "adjusted" waterfilling strategy. Other strategies may also be used.

A Solution of Equation (48) in Method "C":
When $i=N_r^{w\prime}$, Equation (48) reduces to $$\frac{\sigma_\alpha^2 |\xi_{1_{N_r^{w\prime},o}}^w|^2}{\sigma_\theta^2} \geq \kappa_{1_{N_r^{w\prime},o}}^w,$$

or equivalently $$|\xi_{1_{N_r^{w\prime},o}}^w|^2 \geq \frac{\kappa_{1_{N_r^{w\prime},o}}^w}{v} \quad (50a)$$

where $$v \triangleq \sigma_\theta^2 / \sigma_\alpha^2$$

is the normalized SNR corresponding to the transmitted signal elements.

When i=$N_r^{w'}-1$, Equation (48) reduces to $$\frac{\sigma_{\tilde{a}}^2 \left|\xi_{1_{N_r^{w'}-1,o}}^w\right|^2}{\sigma_{\tilde{\theta}}^2 + \sigma_{\tilde{a}}^2 \left|\xi_{2_{N_r^{w'}-1,o}}^w\right|^2} \geq \kappa_{1_{N_r^{w'}-1,o}}^w,$$

or equivalently $$\left|\xi_{1_{N_r^{w'}-1,o}}^w\right|^2 \geq \kappa_{1_{N_r^{w'}-1,o}}^w \left(\frac{1}{v} + \left|\xi_{2_{N_r^{w'}-1,o}}^w\right|^2\right) \quad (50b)$$

When i=$N_r^{w'}-2$, Equation (48) reduces to $$\frac{\sigma_{\tilde{a}}^2 \left|\xi_{1_{N_r^{w'}-2,o}}^w\right|^2}{\sigma_{\tilde{\theta}}^2 + \sigma_{\tilde{a}}^2 \left|\xi_{2_{N_r^{w'}-2,o}}^w\right|^2 + \sigma_{\tilde{a}}^2 \left|\xi_{3_{N_r^{w'}-2,o}}^w\right|^2} \geq \kappa_{1_{N_t-2,o}}^w,$$

or equivalently $$\left|\xi_{1_{N_r^{w'}-2,o}}^w\right|^2 \geq \kappa_{1_{N_r^{w'}-2,o}}^w \left(\frac{1}{v} + \left|\xi_{2_{N_r^{w'}-2,o}}^w\right|^2 + \left|\xi_{3_{N_r^{w'}-2,o}}^w\right|^2\right) \quad (50c)$$

In general, at the $i^{th}$ iteration, we have $$\left|\xi_{1_{i,o}}^w\right|^2 \geq \kappa_{1_{i,o}}^w \left(\frac{1}{v} + \left|\xi_{2_{i,o}}^w\right|^2 + \left|\xi_{3_{i,o}}^w\right|^2 + \cdots + \left|\xi_{N_r^{w'}-i+1_{i,o}}^w\right|^2\right) \quad (50d)$$

for $1 \leq i \leq N_r^{w'}$. From Equation (51a), $$\gamma_{1_{N_r^{w'},o}}^w$$

can be derived by solving $$\left|h_{Est_{1_{N_r^{w'},o}}}^w h_{Ch_{N_r^{w'},o}}^w \{x_{N_r^{w'},o}^w\}_1 \gamma_{1_{N_r^{w'},o}}^w\right|^2 \geq \frac{\kappa_1^w{}_{N_r^{w'},o}}{v} \quad (51a)$$

From Equation (50b), $$\gamma_{1_{N_r^{w'}-1,o}}^w$$

can be derived by solving $$\left|h_{Est_{1_{N_r^{w'}-1,o}}}^w h_{Ch_{N_r^{w'}-1,o}}^w \{x_{N_r^{w'}-1,o}^w\}_1 \gamma_{1_{N_r^{w'}-1,o}}^w\right|^2 \geq \kappa_{1_{N_r^{w'}-1,o}}^w \left(\frac{1}{v} + \left|\xi_{2_{N_r^{w'}-1,o}}^w\right|^2\right) \quad (51b)$$

In general, from Equation (50d), $\gamma_{1_{i,o}}^w$ can be derived by solving $$\left|h_{Est_{1_{i,o}}}^w h_{Ch_{i,o}}^w \{x_{i,o}^w\}_1 \gamma_{1_{i,o}}^w\right|^2 \geq \quad (52)$$
$$\kappa_{1_{i,o}}^w \left(\frac{1}{v} + \left|\xi_{2_{i,o}}^w\right|^2 + \left|\xi_{3_{i,o}}^w\right|^2 + \cdots + \left|\xi_{N_r^{w'}-i+1_{i,o}}^w\right|^2\right)$$

After deriving the pre-weighting vector, $$\vec{\gamma}_o \triangleq \begin{bmatrix} \gamma_{1_{1,o}} \\ \vdots \\ \gamma_{1_{N_t,o}} \end{bmatrix},$$

the transmit Power constraint in Equation (49) is tested as follows $$\left\{|\gamma_{1_{1,o}}|^2 + \cdots + |\gamma_{1_{N_t,o}}|^2\right\} \leq \frac{P}{\sigma_{\tilde{a}}^2} \quad (53)$$

A Selection of the Ordering of $$\begin{bmatrix} \eta_1 \\ \vdots \\ \eta_{N_t} \end{bmatrix} \text{ into } \begin{bmatrix} \eta_{1_{1,o}}^w \\ \vdots \\ \eta_{1_{N_t,o}}^w \end{bmatrix}$$

in Method "C":

Based on Equations (52) and the transmit Power constraint in Equation (53), the ordering of $$\begin{bmatrix} \eta_1 \\ \vdots \\ \eta_{N_t} \end{bmatrix} \text{ into } \begin{bmatrix} \eta_{1_{1,o}}^w \\ \vdots \\ \eta_{1_{N_t,o}}^w \end{bmatrix}$$

is based on selecting $$\vec{\gamma}_o \triangleq \begin{bmatrix} \gamma_{1_{1,o}} \\ \vdots \\ \gamma_{1_{N_t,o}} \end{bmatrix}$$

in such a way as to maximize the sum rate.
One possible way for ordering $$\begin{bmatrix} \eta_{1_{1,o}}^w \\ \vdots \\ \eta_{1_{N_t,o}}^w \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (52) and (53), is to exhaustively search for all possible ordering combinations of $$\vec{\gamma}_o \triangleq \begin{bmatrix} \gamma_{1_{1,o}} \\ \vdots \\ \gamma_{1_{N_t,o}} \end{bmatrix}$$

until at least one ordering combination satisfies Equations (52) and (53). If one or more ordering combinations satisfy Equations (52) and (53), then the next step is to optimize the sum rate using an "adjusted" waterfilling strategy, and to select the ordering combination which offers the largest sum rate.

Another possible way for ordering $$\begin{bmatrix} \eta^w_{1_{1,o}} \\ \vdots \\ \eta^w_{1_{N_t,o}} \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (52) and (53), is to sort $$\begin{bmatrix} \dfrac{\kappa^w_1}{\| h^w_{Est_{1,o}} h^w_{Ch_{1,o}} \{x^w_{i1_o}\}_1 \|^2} \\ \vdots \\ \dfrac{\kappa^w_{N_r}}{\| h^w_{Est_{1_{N_r,o}}} h^w_{Ch_{N_r,o}} \{x^w_{N_r,o}\}_1 \|^2} \end{bmatrix}$$

from high to low for $1 \leq w \leq U_r$, where $h_{Est_m}^w \equiv 1 \times N_r^w$ is the $m^{th}$ row vector of the estimation matrix $h_{Est}^w$ at the $w^{th}$ receiving device (terminal node), which is used to estimate the $m^{th}$ signal element, $\alpha''_m$, in $\vec{\alpha}''$; and $h_{Ch}^w \equiv N_r^w \times N_t$ Channel between the $N_t$ Txs and the $w^{th}$ receiving device (terminal node).

Given that there are $U_r$ receiving devices, sorting $$\begin{bmatrix} \dfrac{\kappa^w_1}{\| h^w_{Est_{1,o}} h^w_{Ch_{1,o}} \{x^w_{i1_o}\}_1 \|^2} \\ \vdots \\ \dfrac{\kappa^w_{N_r}}{\| h^w_{Est_{1_{N_r,o}}} h^w_{Ch_{N_r,o}} \{x^w_{N_r,o}\}_1 \|^2} \end{bmatrix}$$

from high to low can result in more than one (up to $U_r$) unique ordering combination, which satisfy Equations (52) and (53). In this case, the next step is to optimize the sum rate using an "adjusted" waterfilling strategy for each ordering combination, and to select the ordering combination that offers the largest sum rate.

Alternatively, if Equations (52) and (53) cannot be satisfied for any ordering of $$\begin{bmatrix} \eta^w_{1_{1,o}} \\ \vdots \\ \eta^w_{1_{N_r,o}} \end{bmatrix},$$

several remedies exist:

Method VII for Relaxing received SINR constraint in Method "C":

For example, the maximum value, $$|\gamma_{1_{S,o}}|^2,$$

which is obtained as $$|\gamma_{1_{S,o}}|^2 \triangleq \max\{|\gamma_{1_{1,o}}|^2, |\gamma_{1_{2,o}}|^2, \ldots, |\gamma_{1_{N_t-1,o}}|^2\},$$

is removed from Equations (52) and (53), and placed in a set, $\vec{\gamma}\,\mathcal{S}$, and its corresponding indices, $\mathcal{S}$ is placed in another set, $\mathcal{S}_o$. These are repeated until both Equations (52) and (53) are satisfied. The formed set of squared values in $\vec{\gamma}\,\mathcal{S}$, is then replaced by a zero value, i.e. the corresponding information elements that correspond to $\vec{\gamma}\,\mathcal{S}$ are not transmitted.

Method VIII for Relaxing Received SINR Constraint in Method "C":

Another remedy for the case when Equations (52) and (53) cannot be satisfied for any ordering combination of $$\begin{bmatrix} \eta^w_{1_{1,o}} \\ \vdots \\ \eta^w_{1_{N_r,o}} \end{bmatrix},$$

is to reduce Equations (52) by a factor which would allow for an ordering combination to be found which satisfies both Equations (52) and (53). In other words, instead of accommodating only a few of the terminal nodes as in the previous strategy, this strategy attempts to accommodate all terminal nodes in a fair fashion.

Note: When choosing between the two Methods for relaxing the SINR constraint, one can rely on the variance of $$\{|\gamma_{1_{1,o}}|^2, |\gamma_{1_{2,o}}|^2, \ldots, |\gamma_{1_{N_t-1,o}}|^2\}.$$

If the variance is above a pre-specified threshold, then Method VII is selected, otherwise, Method VIII is selected.

Another Embodiment of Pre-Weighting Selection in Method "C":

For the special case of UL MU-MIMO where $N_r^w=1$, for all values of $1 \leq w \leq U_r$, i.e. each receiving device (terminal node) has only one antenna, DL MU-MIMO reduces to DL MU-MISO. In this case, the set of ordered SINR equations in Equation (49b) is written as:

$$\eta_{1_{i,o}}^w = \frac{\|h_{Ch_{i,o}}^w \{x_{i,o}^w\}_1 \gamma_{1_{i,o}}^w\|^2}{\frac{1}{v} + \sum_{l=2}^{N_t^w - i + 1} |h_{Ch_{i,o}}^w \{x_{i,o}^w\}_l \gamma_{1_{i,o}}^w|^2} \geq \kappa_{1_{i,o}}^w \quad (54)$$

Another Selection of the Ordering of $$\begin{bmatrix} \eta_1 \\ \vdots \\ \eta_{N_r} \end{bmatrix} \text{ into } \begin{bmatrix} \eta_{1_{1,o}}^w \\ \vdots \\ \eta_{1_{N_r,o}}^w \end{bmatrix}$$

in Method "C"

Based on Equation (54) and the Power constraint in Equation (53), the ordering of $$\begin{bmatrix} \eta_1 \\ \vdots \\ \eta_{N_r} \end{bmatrix}$$

into $$\begin{bmatrix} \eta_{1_{1,o}}^w \\ \vdots \\ \eta_{1_{N_r,o}}^w \end{bmatrix}$$

is based on selecting $$\vec{\gamma}_o \triangleq \begin{bmatrix} \gamma_{1_{1,o}} \\ \vdots \\ \gamma_{1_{N_t,o}} \end{bmatrix}$$

in such a way as to maximize the sum rate.

One possible way for ordering $$\begin{bmatrix} \eta_{1_{1,o}}^w \\ \vdots \\ \eta_{1_{N_r,o}}^w \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (53) and (54), is to exhaustively search for all possible ordering combinations of $$\vec{\gamma}_o \triangleq \begin{bmatrix} \gamma_{1_{1,o}} \\ \vdots \\ \gamma_{1_{N_t,o}} \end{bmatrix}$$

until at least one ordering combination is found which satisfies Equations (53) and (54). If one or more ordering combinations are found which satisfy Equations (53) and (54), then the next step is to optimize the sum rate using an "adjusted" waterfilling strategy, and to select the ordering combination, which offers the largest sum rate.

Another possible way for ordering $$\begin{bmatrix} \eta_{1_{1,o}}^w \\ \vdots \\ \eta_{1_{N_r,o}}^w \end{bmatrix}$$

and for selecting $$\vec{\gamma}_o \triangleq \begin{bmatrix} \gamma_{1_{i,o}} \\ \vdots \\ \gamma_{1_{N_t,o}} \end{bmatrix}$$

which satisfies the constraints in Equations (53) and (54), is to sort $$\begin{bmatrix} \frac{\kappa_1^w}{\|h_{Ch_{1,o}}^w \{x_{i1,o}^w\}_1\|^2} \\ \vdots \\ \frac{\kappa_{N_r}^w}{\|h_{Ch_{N_r,o}}^w \{x_{N_r,o}^w\}_1\|^2} \end{bmatrix}$$

from high to low for $1 \leq w \leq U_r$.

Given that there are $U_r$ receiving devices, sorting $$\begin{bmatrix} \dfrac{\kappa_1^w}{\|h_{Ch_{1,o}}^w\{x_{1\mathrm{1o}}^w\}_1\|^2} \\ \vdots \\ \dfrac{\kappa_{N_r}^w}{\|h_{Ch_{N_r,o}}^w\{x_{N_r,o}^w\}_1\|^2} \end{bmatrix}$$

from high to low can result in more than one (up to $U_r$) unique ordering which satisfy Equations (53) and (54). In this case, the next step is to optimize the sum rate using an "adjusted" waterfilling strategy for each ordering, and to select the ordering combination that offers the largest sum rate.

Method IX for Relaxing received SINR constraint in Method "C":

Alternatively, if Equations (53) and (54) cannot be satisfied for any ordering of $$\begin{bmatrix} \eta_{1,o}^w \\ \vdots \\ \eta_{1_{N_r,o}}^w \end{bmatrix},$$

several remedies exist. For example, the maximum value, $\mathcal{S}$, which is obtained as $$|\gamma_{1_{S,o}}|^2 \triangleq \max\{|\gamma_{1,o}|^2, |\gamma_{1_{2,o}}|^2, \ldots, |\gamma_{1_{N_t-1,o}}|^2\},$$

is removed from Equations (53) and (54), and placed in a set, $\vec{\gamma}\,\mathcal{S}$, and its corresponding indices, $\mathcal{S}$ is placed in another set, $\mathcal{S}_o$. These are repeated until both Equations (53) and (54) are satisfied. The formed set of squared values in $\vec{\gamma}\,\mathcal{S}$, is then replaced by a zero value, i.e. the corresponding information elements that correspond to $\vec{\gamma}\,\mathcal{S}$ are not transmitted.

Method X for Relaxing Received SINR Constraint in Method "C":

Another remedy for the case when Equations (53) and (54) cannot be satisfied for any ordering of $$\begin{bmatrix} \eta_{1,o}^w \\ \vdots \\ \eta_{1_{N_r,o}}^w \end{bmatrix},$$

is to reduce Equation (53) by a factor which would allow for an ordering combination to be found which satisfies both Equation (53) and (54). In other words, instead of accommodating only a few of the terminal nodes as in the previous strategy, this strategy attempts to accommodate all terminal nodes in a fair fashion.

Note: When choosing between the two Methods for relaxing the SINR constraint, one can rely on the variance of $$\{|\gamma_{1,o}|^2, |\gamma_{1_{2,o}}|^2, \ldots, |\gamma_{1_{N_t-1,o}}|^2\}.$$

If the variance is above a pre-specified threshold, then Method IX is selected, otherwise, Method X is selected.

Method "D" for Selecting Ordering and Pre-Weighting for DL MU-MIMO:

Assumptions "D":

1. Since the network is a DL network, the method assumes that the $U_t$ transmitting devices (access nodes) are able to cooperate. This is a realistic assumption when the transmitting devices are access nodes belonging to the same network. Otherwise, the non-cooperating access nodes see one another as separate interfering networks.
2. Since the network is a DL network, the method assumes that the channel matrix, $h_{Ch}$, (or portions of the channel matrix such as $h_{Ch}^w$) is known by the $U_t$ transmitting devices (access nodes) and by the $U_r$ receiving devices (terminal nodes). It is realistic to assume that the receiving devices are able to estimate their corresponding channel, i.e. $h_{Ch}^w$. However, for the transmitting devices to be able to estimate their corresponding channel requires the channel to be either slowly varying in time or reciprocal.
3. Based on the two previous assumptions that the channel matrix, $h_{Ch}$, (or portions of the channel matrix such as $h_{Ch}^w$) is known by the $U_t$ transmitting devices and that the $U_t$ transmitting devices are able to cooperate, the method assumes that no pre-coding is selected at the $U_t$ transmitting devices (access nodes) with pre-weighting of the signals prior transmission. This assumption can be realistically carried out.
4. Based on the previous assumption that no pre-coding is selected, the method of reception is assumed to include a filter followed by a full SIC detector.
5. Based on the previous two assumptions, the method assumes that the ordering of all $N_t$ signal elements is based on their corresponding received Signal-to-Noise & Interference Ratio (SINR), $\eta_{k,m}$, ordered into $\eta_{1_{k,m,o}}$, from high to low, where the interference at the $i^{th}$ iteration is due to the $N_t-i$ remaining signal elements. Since the selection of the pre-weighting elements affects their corresponding received SINR, the ordering of all $N_t$ information elements based on their corresponding received SINR is carried out simultaneously with the selection of the pre-weighting elements.

Constraints "D":

1. When a minimum performance is required per receiving device (terminal node), an equivalent desired received Signal-to-Interference & Noise Ratio (SINR), $\eta_{1_{k,m,o}}$, for the $m^{th}$ ordered signal element, $\alpha_{1_{m,o}}$, at the $k^{th}$ Tx, must be constrained to have a lower bound, $\kappa_{1_{k,m,o}}$, for $1\leq m \leq N_t$ and or $1\leq k \leq N_r$:

$$\eta_{1_{k,m,o}} \geq \kappa_{1_{k,m,o}} \quad (55)$$

Equation (55) is referred to as the (minimum) received SINR constraint. The importance of such a constraint is to ensure no error propagation from the SIC.

2. Based on the received SINR constraint in Equation (55) for the $m^{th}$ ordered information element, $\alpha_{1_{m,o}}$, a pre-weighting vector, $$\vec{\gamma}_o \triangleq \begin{bmatrix} \gamma_{1,o} \\ \vdots \\ \gamma_{1_{N_t,o}} \end{bmatrix},$$

is selected such that the following Power constraint is met:

$$E\{\|\vec{\alpha}'\|^2\} \leq P \tag{56}$$

where P is a pre-specified upper limit on the total transmitted power and E{•} denotes statistical averaging with respect to the information elements. The importance of such a constraint is to limit the average transmitted power for all terminal nodes.

Method "D":

If a pre-weighting vector, $$\vec{\gamma}_o \triangleq \begin{bmatrix} \gamma_{1_{1,o}} \\ \vdots \\ \gamma_{1_{N_t,o}} \end{bmatrix},$$

is found which satisfies both the SINR constraint in Equation (55) and the Power constraint in Equation (56), then the method optimizes $\vec{\gamma}_o$ such that the sum rate in Equation (34) is increased (or maximized). This can be accomplished using an "adjusted" waterfilling strategy. The "regular" waterfilling strategy optimizes the sum rate with respect to $\vec{\gamma}_o$ under the Power constraint in Equation (56). The "adjusted" waterfilling strategy includes the SINR constraint in Equation (55) together with the Power constraint in Equation (56) when optimizing the sum rate. There are several ways to implement the "adjusted" waterfilling strategy. For example:

Way 1. The first way has two steps:
 a. Find all ordering combinations and corresponding pre-weighting values which satisfy the received SINR constraint.
 b. Select the ordering combination with the largest corresponding sum rate using for example, the waterfilling method subject to the transmit power constraint.

Way 2. The second way has two steps:
 a. Find all ordering combinations and corresponding pre-weighting values which satisfy the transmit power constraint.
 b. Select the ordering combination with the largest corresponding sum rate using for example, the waterfilling method subject to the received SINR constraint.

Way 3. The third way has two steps:
 a. Find all ordering combinations and corresponding pre-weighting values which satisfy both the received SINR constraint and the transmit Power constraint.
 b. Select the ordering combination with the largest corresponding sum rate using for example two Lagrange multipliers when obtaining the solution to the sum rate optimization. The first Lagrange multiplier incorporates the received SINR constraint, while the second Lagrange multiplier incorporates the transmit power constraint.

Other ways to implement adjusted waterfilling strategies may also be used. If no ordering combination is found which satisfies the received SINR constraint, then use either Method XI, XII, XIII or XIV below for Relaxing Received SINR constraint in Method "D."

1. If more than one ordering for the pre-weighting vector, $$\vec{\gamma}_o \triangleq \begin{bmatrix} \gamma_{1_{1,o}} \\ \vdots \\ \gamma_{1_{N_t,o}} \end{bmatrix},$$

are found which satisfy both the SINR constraint in Equation (55) and the Power constraint in Equation (56), then $\vec{\gamma}_o$ is optimized for all ordering combinations such that the sum rate is maximized for each ordering combination. The ordering combination, which corresponds to the largest sum rate is selected.

2. If a pre-weighting vector, $$\vec{\gamma}_o \triangleq \begin{bmatrix} \gamma_{1_{1,o}} \\ \vdots \\ \gamma_{1_{N_t,o}} \end{bmatrix},$$

which satisfies both the received SINR constraint in Equation (55) and the transmit Power constraint in Equation (56), cannot be found then the largest absolute value in $\vec{\gamma}_o$ is removed from $\vec{\gamma}_o$ in Equations (55) and (56) and placed in a set, $S_o$. This is repeated until both Equations (55) and (56) are satisfied. The pre-weighting elements in $S_o$ are forced to take a zero value, i.e. their corresponding information elements are not transmitted.

3. Alternatively, the received SINR constraint in Equation (55) can be relaxed by reducing the pre-weighting elements by a fixed factor, λ, for each transmitting device (access nodes), until the Power constraint in Equation (56) is satisfied.

4. All optimized $N_t$ pre-weighting vectors (whether zero or non-zero), $$\vec{\gamma}_o \triangleq \begin{bmatrix} \gamma_{1_{1,o}} \\ \vdots \\ \gamma_{1_{N_t,o}} \end{bmatrix},$$

are fed-back (e.g., as described with reference to step 609) by the receiving devices (access nodes) to all $U_r$ receiving devices (terminal nodes) with their corresponding order.

The contributions of the presently disclosed systems and methods include the selection of $$\vec{\gamma}_o \triangleq \begin{bmatrix} \gamma_{1_{1,o}} \\ \vdots \\ \gamma_{1_{N_t,o}} \end{bmatrix}$$

and its ordering combination, for a DL MU-MIMO based on Method "D."

An Embodiment for Pre-Weighting Selection in Method "D":

Assume that the received SINR constraint in Equation (55) is written as $\eta_{1_{k,m,o}} \geq \kappa_{1_{k,m,o}}$.

Since IPC and pre-weighting at the transmitting devices for DL MU-MIMO are equivalent to pre-weighting at the transmitting devices and SIC at the receiving devices for UL MU-MIMO, then SIC is adopted here in the present embodiment for selecting ordering and pre-weighting. In other words, an equivalent set of received SINR equations can be derived after filtering the received signals at the $w^{th}$ receiving device (terminal node) using $N_r^w$ Rxs. At the $i^{th}$ iteration, we have $$\eta_{1_{i,o}}^w \triangleq \frac{E\{|\hat{\alpha}_{1_{i,o}}^w|^2\}}{E\left\{\left\|h_{Est_{1_{i,o}}}^w \begin{bmatrix} \theta_{1_{i,o}}^w \\ \vdots \\ \theta_{N_{r_{i,o}}^w}^w \end{bmatrix}\right\|^2\right\} + E\{|\sum_{l=2}^{N_t-i+1} \hat{\alpha}_{l_{i,o}}^w|^2\}} \geq \kappa_{1_{i,o}}^w \quad (57)$$

for $1 \leq i \leq N_r$, for $1 \leq w \leq U_r$, where

- $\eta_{1_{i,o}}^w$ is the ordered received SINR for the first information element to be detected in the $i^{th}$ iteration at the $w^{th}$ receiving device (terminal node) using $N_r^w$ Rxs and its corresponding minimum required SINR, $\kappa_{1_{i,o}}^w$;

- $\hat{\alpha}_{1_{i,o}}^w \triangleq h_{Est_{1_{i,o}}}^w \begin{bmatrix} \beta_{1_{i,o}}^w \\ \vdots \\ \beta_{N_{r_{i,o}}^w}^w \end{bmatrix}$ $= h_{Est_{1_{i,o}}}^w h_{Ch_{i,o}}^w \vec{\alpha}_{i,o}^{w_1} + h_{Est_{1_{i,o}}}^w \begin{bmatrix} \theta_{1_{i,o}}^w \\ \vdots \\ \theta_{N_{r_{i,o}}^w}^w \end{bmatrix}$ $= h_{Est_{1_{i,o}}}^w h_{Ch_{i,o}}^w \begin{bmatrix} \gamma_{1_{i,o}}^w \alpha_{1_{i,o}}^w \\ 0 \\ \vdots \\ 0 \end{bmatrix} + h_{Est_{1_{i,o}}}^w \begin{bmatrix} \theta_{1_{i,o}}^w \\ \vdots \\ \theta_{N_{r_{i,o}}^w}^w \end{bmatrix}$ is the estimated value of the $1^{st}$ pre-weighted signal element, $\alpha_{1_{i,o}}^{w_1}$, in $\vec{\alpha}_{i,o}^{w_1}$ after filtering the received signal elements $\begin{bmatrix} \beta_{1_{i,o}}^w \\ \vdots \\ \beta_{N_{r_{i,o}}^w}^w \end{bmatrix}$ with a row vector, $h_{Est_{1_{i,o}}}^w$, at the $w^{th}$ receiving device (terminal node);

- $h_{Est_{1_{i,o}}}^w \equiv 1 \times N_r^w$ is the $1^{st}$ row vector of the estimation matrix $h_{Est_{i,o}}^w$ which is used to estimate the $1^{st}$ pre-weighted signal element, $\alpha_{1_{i,o}}^{w_1}$, in $\vec{\alpha}_{i,o}^{w_1}$; and

- $\begin{bmatrix} \beta_{1_{i,o}}^w \\ \vdots \\ \beta_{N_{r_{i,o}}^w}^w \end{bmatrix} \equiv N_r^w \times 1$ is a vector consisting of the received signal elements at the $w^{th}$ receiving device (terminal node), which remain after removing the effects of the $(i-1)$ previously detected information element;

$\vec{\alpha}_{i,o}^{w_1}$ is the ordered pre-weighted signal vector for the $i^{th}$ iteration at the $w^{th}$ receiving device (terminal node);

- $\hat{\alpha}_{l_{i,o}}^{w_1} \triangleq = h_{Est_{1_{i,o}}}^w h_{Ch_{i,o}}^w \begin{bmatrix} 0 \\ \vdots \\ 0 \\ \gamma_{l_{i,o}}^w \alpha_{l_{i,o}}^w \\ 0 \\ \vdots \\ 0 \end{bmatrix}$ is the interference component corresponding to the $l^{th}$ element, $\alpha_{l_{i,o}}^{w_1}$, in $\vec{\alpha}_{i,o}^{w_1}$ after filtering the received signal elements $\begin{bmatrix} \beta_{1_{i,o}} \\ \vdots \\ \beta_{N_{r_{i,o}}} \end{bmatrix}$ with the row vector, $h_{Est_{1_{i,o}}}^w$ where $2 \leq l \leq N_r - i + 1$; and

- $h_{Est_{1_{i,o}}}^w \begin{bmatrix} \theta_{1_{i,o}}^w \\ \vdots \\ \theta_{N_{r_{i,o}}^w}^w \end{bmatrix}$ is the noise component that results from filtering the noise vector $\begin{bmatrix} \theta_{1_{i,o}}^w \\ \vdots \\ \theta_{N_{r_{i,o}}^w}^w \end{bmatrix}$ with the row vector $h_{Est_{1_{i,o}}}^w$.

The relationship between the estimate, $\hat{\alpha}_{1_{i,o}}^w$, of the pre-weighted signal element $\alpha_{1_{i,o}}^w$ and the detected information element, $\check{\zeta}_{1_{i,o}}^w$, of the information element $\zeta_{1_{i,o}}^w$ is that estimated pre-weighted signal element $\hat{\alpha}_{1_{i,o}}^w$ must be divided by an a priori known factor, then a reverse operation to the 1:1 function which converts information element $\zeta_{1_{i,o}}^w$ to signal element $\alpha_{1_{i,o}}^w$ must be undertaken. For example, when the 1:1 function which converts information element $\vec{\zeta}^{v}{}_{1_{i,o}}^w$ to signal element $\alpha_{1_{i,o}}^w$ is an encoder, the reverse operation is a decoder; when the 1:1 function which converts information element $\zeta_{1_{i,o}}^w$ to signal element $\alpha_{1_{i,o}}^w$ is a scrambler, the reverse operation is a de-scrambler; and when the 1:1 function which converts information element $\vec{\zeta}^{v}{}_{1_{i,o}}^w$ to signal element $\alpha_{1_{i,o}}^w$ is an interleaver, the reverse operation is a de-interleaver. Finally, a hard-decision detector is applied to $\hat{\zeta}_{1_{i,o}}^w$ to obtain detected information element $\check{\zeta}_{1_{i,o}}^w$. The effect of information element $\zeta_{1_{i,o}}^w$ on the received signal elements $$\begin{bmatrix} \beta_{1_{i,o}} \\ \vdots \\ \beta_{N_{r_{i,o}}} \end{bmatrix}$$

is then removed using detected information element $\check{\zeta}_{1_{i,o}}^w$ assuming no error propagation. In order to justify such an assumption, the pre-weighting vector, $\vec{\gamma}_o$, must be selected to satisfy the (minimum) received SINR constraint in Equation (55) under the (maximum) transmit Power constraint in Equation (56). However, since the signal vector, $\vec{\alpha}$, is unknown to the receiving devices, then two assumptions are made in Equation (57):

the elements of the signal vector, $\vec{\alpha}$, are independent identically distributed (iid) with zero mean and variance $\sigma_\alpha^2$ and the elements of the noise vector are independent identically distributed (iid) with zero mean and variance $\sigma_\theta^2$.

In other words, Equation (39) can re-written as $$\eta_{1_{i,o}}^w \triangleq \frac{\sigma_\alpha^2 |\xi_{1_{i,o}}^w|^2}{\sigma_\theta^2 h_{Est_{1_{i,o}}}^w h_{Est_{1_{i,o}}}^{w*} + \sigma_\alpha^2 \sum_{l=2}^{N_t-i+1} |\xi_{l_{i,o}}^w|^2} \geq \kappa_{1_{i,o}}^w \quad (58)$$

where $$|\xi_{1_{i,o}}^w|^2 \triangleq h_{Est_{1_{i,o}}}^w h_{Ch_{i,o}}^w \gamma_{1_{i,o}}^w \begin{bmatrix} 1 & 0 & \cdots & 0 \\ 0 & 0 & \cdots & 0 \\ \vdots & \vdots & \ddots & \vdots \\ 0 & 0 & \cdots & 0 \end{bmatrix} \gamma_{1_{i,o}}^{w*} h_{Ch_{i,o}}^{w*} h_{Est_{1_{i,o}}}^{w*} \quad (59a)$$

$$= |\{h_{Est_{1_{i,o}}} h_{Ch_{i,o}}\}_1 \gamma_{1_{i,o}}^2|^2 \quad (59b)$$

and $$|\xi_{l_{i,o}}^w|^2 \triangleq \quad (60a)$$

$$h_{Est_{1_{i,o}}}^w h_{Ch_{i,o}}^w \gamma_{l_{i,o}}^w \begin{bmatrix} 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \\ 0 & \vdots & \vdots & 1 & \vdots & \vdots & \vdots \\ 0 & \cdots & 0 & 0 & 0 & \cdots & 0 \\ \vdots & \ddots & \vdots & \vdots & \vdots & \ddots & \vdots \\ 0 & \cdots & 0 & 0 & 0 & \cdots & 0 \end{bmatrix} \gamma_{l_{i,o}}^{w*} h_{Ch_{i,o}}^{w*} h_{Est_{1_{i,o}}}^{w*}$$

$$= |\{h_{Est_{1_{i,o}}} h_{Ch_{i,o}}\}_l \gamma_{l_{i,o}}^2|^2 \quad (60b)$$

where $$\{h_{Est_{1_{i,o}}} h_{Ch_{i,o}}\}_l$$

is the $l^{th}$ element in $$h_{Est_{1_{i,o}}} h_{Ch_{i,o}}.$$

It the estimation filter, $$h_{Est_{1_{i,o}}}^w,$$

is normalized, i.e.

$$h_{Est_{1_{i,o}}}^w h_{Est_{1_{i,o}}}^{w*} = 1,$$

then $$\eta_{1_{i,o}}^w \triangleq \frac{\sigma_\alpha^2 |\xi_{1_{i,o}}^w|^2}{\sigma_\theta^2 + \sigma_\alpha^2 \sum_{l=2}^{N_t-i+1} |\xi_{l_{i,o}}^w|^2} \geq \kappa_{1_{i,o}}^w \quad (61a)$$

$$= \frac{|\{h_{Est_{1_{i,o}}} h_{Ch_{i,o}}\}_1 \gamma_{1_{i,o}}^w|^2}{\frac{1}{v} + \sum_{l=2}^{N_t-i+1} |\{h_{Est_{1_{i,o}}} h_{Ch_{i,o}}\}_l \gamma_{l_{i,o}}^w|^2} \geq \kappa_{1_{i,o}}^w \quad (61b)$$

In this case, the Power constraint can be re-written as $$E\{\|\vec{\alpha}'\|^2\} = \sigma_\alpha^2 \{|\gamma_{1_{1,o}}|^2 + \ldots + |\gamma_{1_{N_{t,o}}}|^2\} \leq P \quad (62)$$

If the ordered pre-weighting vector, $\vec{\gamma}_o$, is found to satisfy both the SINR constraint in Equations (61) and the Power constraint in Equation (62), then the next step is to optimize the sum rate in Equation (18). This can be accomplished using an "adjusted" waterfilling strategy.

A Solution of Equation (61b) in Method "D":

When $i=N_t$, Equation (61b) reduces to $$\frac{\sigma_\alpha^2 |\xi_{1_{N_t,o}}^w|^2}{\sigma_\theta^2} \geq \kappa_{1_{N_t,o}}^w,$$

or equivalently $$|\xi_{1_{N_t,o}}^w|^2 \geq \frac{\kappa_{1_{N_t,o}}^w}{v} \qquad (63a)$$

where $$v \triangleq \sigma_\theta^2 / \sigma_\alpha^2$$

is the SNR corresponding to the transmitted signal elements.

When $i=N_t-1$, Equation (61b) reduces to $$\frac{\sigma_\alpha^2 |\xi_{1_{N_t-1,o}}^w|^2}{\sigma_\theta^2 + \sigma_\alpha^2 |\xi_{2_{N_t-1,o}}^w|^2} \geq \kappa_{1_{N_t-1,o}}^w,$$

or equivalently $$|\xi_{1_{N_t-1,o}}^w|^2 \geq \kappa_{1_{N_t-1,o}}^w\left(\frac{1}{v} + |\xi_{2_{N_t-1,o}}^w|^2\right) \qquad (63b)$$

When $i=N_t-2$, Equation (43) reduces to $$\frac{\sigma_\alpha^2 |\xi_{1_{N_t-2,o}}^w|^2}{\sigma_\theta^2 + \sigma_\alpha^2 |\xi_{2_{N_t-2,o}}^w|^2 + \sigma_\alpha^2 |\xi_{3_{N_t-2,o}}^w|^2} \geq \kappa_{1_{N_t-2,o}}^w,$$

or equivalently $$|\xi_{1_{N_t-2,o}}^w|^2 \geq \kappa_{1_{N_t-2,o}}^w\left(\frac{1}{v} + |\xi_{2_{N_t-2,o}}^w|^2 + |\xi_{3_{N_t-2,o}}^w|^2\right) \qquad (63c)$$

In general, at the $i^{th}$ iteration, we have $$|\xi_{1_{i,o}}^w|^2 \geq \kappa_{1_{i,o}}^w\left(\frac{1}{v} + |\xi_{2_{i,o}}^w|^2 + |\xi_{3_{i,o}}^w|^2 + \cdots + |\xi_{N_t-i+1_{i,o}}^w|^2\right) \qquad (63d)$$

for $1 \leq i \leq N_t$. From Equation (63a), $$\gamma_{1_{N_r,o}}$$

can be derived by solving $$\left|\{h_{Est_{1_{N_t,o}}} h_{Ch_{N_t,o}}\}_1 \gamma_{1_{N_t,o}}^w\right|^2 \geq \frac{\kappa_{1_{N_t,o}}^w}{v} \qquad (64a)$$

From Equation (63b), $$\gamma_{1_{N_t-1,o}}$$

can be derived by solving $$\left|\{h_{Est_{1_{N_t-1,o}}} h_{Ch_{N_t-1,o}}\}_1 \gamma_{1_{N_t-1,o}}^w\right|^2 \geq \kappa_{1_{N_t-1,o}}^w\left(\frac{1}{v} + |\xi_{2_{N_t-1,o}}^w|^2\right) \qquad (64b)$$

In general, from Equation (63d), $\gamma_{1_{i,o}}^w$ can be derived by solving $$\left|\{h_{Est_{1_{i,o}}} h_{Ch_{i,o}}\}_1 \gamma_{1_{i,o}}^w\right|^2 \geq \qquad (64d)$$
$$\kappa_{1_{i,o}}^w\left(\frac{1}{v} + |\xi_{2_{i,o}}^w|^2 + |\xi_{3_{i,o}}^w|^2 + \cdots + |\xi_{N_t-i+1_{i,o}}^w|^2\right)$$

After deriving the pre-weighting vector, $$\vec{\gamma}_o \triangleq \begin{bmatrix} \gamma_{1_{1,o}} \\ \vdots \\ \gamma_{1_{N_t,o}} \end{bmatrix},$$

the Power constraint in Equation (62) is tested as follows $$|\gamma_{1_{1,o}}|^2 + \cdots + |\gamma_{1_{N_t,o}}|^2 \leq \frac{P}{\sigma_\alpha^2} \qquad (65)$$

A Selection of the Ordering of $$\begin{bmatrix} \eta_1 \\ \vdots \\ \eta_{N_r} \end{bmatrix} \text{ into } \begin{bmatrix} \eta_{1_{1,o}}^w \\ \vdots \\ \eta_{1_{N_t,o}}^w \end{bmatrix}$$

in Method "D":

Based on Equations (64) and the Power constraint in Equation (65), the ordering of $$\begin{bmatrix} \eta_1 \\ \vdots \\ \eta_{N_t} \end{bmatrix} \text{ into } \begin{bmatrix} \eta_{1_{1,o}}^w \\ \vdots \\ \eta_{1_{N_t,o}}^w \end{bmatrix}$$

is based on selecting $$\vec{\gamma}_o \triangleq \begin{bmatrix} \gamma_{1_{1,o}} \\ \vdots \\ \gamma_{1_{N_t,o}} \end{bmatrix}$$

in such a way as to maximize the sum rate. One possible way for ordering $$\begin{bmatrix} \eta^w_{1_{1,o}} \\ \vdots \\ \eta^w_{1_{N_t,o}} \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (64) and (65), is to exhaustively search for all possible ordering combinations of $$\vec{\gamma}_o \triangleq \begin{bmatrix} \gamma_{1_{1,o}} \\ \vdots \\ \gamma_{1_{N_t,o}} \end{bmatrix}$$

until at least one ordering combination satisfies Equations (64) and (65). If one or more ordering combinations satisfy Equations (64) and (65), then the next step is to optimize the sum rate using an "adjusted" waterfilling strategy, and to select the ordering combination which offers the largest sum rate.

Another possible way for ordering $$\begin{bmatrix} \eta^w_{1_{1,o}} \\ \vdots \\ \eta^w_{1_{N_t,o}} \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (64) and (65), is to sort $$\begin{bmatrix} \frac{\kappa_1}{\|h^w_{Est_1} h^w_{Ch}\|^2} \\ \vdots \\ \frac{\kappa_{N_t}}{\|h^w_{Est_{N_t}} h^w_{Ch}\|^2} \end{bmatrix}$$

from high to low for $1 \le w \le U_r$, where $h_{Est_m}^w \equiv 1 \times N_r^w$ is the $m^{th}$ row vector of the estimation matrix $h_{Est}^w$ at the $w^{th}$ receiving device (terminal node), which is used to estimate the $m^{th}$ pre-weighted signal element, $\alpha'_m$, in $\vec{\alpha}'$; and $h_{Ch}^w \equiv N_r^w \times N_t$ Channel between the $N_t$ Txs and the $w^{th}$ receiving device (terminal node).

Given that there are $U_r$ receiving devices, sorting $$\begin{bmatrix} \frac{\kappa_1}{\|h^w_{Est_1} h^w_{Ch}\|^2} \\ \vdots \\ \frac{\kappa_{N_t}}{\|h^w_{Est_{N_t}} h^w_{Ch}\|^2} \end{bmatrix}$$

from high to low can result in more than one (up to $U_r$) unique ordering combination, which satisfy Equations (64) and (65). In this case, the next step is to optimize the sum rate using an "adjusted" waterfilling strategy for each ordering combination, and to select the ordering combination that offers the largest sum rate.

Alternatively, if Equations (64) and (65) cannot be satisfied for any ordering of $$\begin{bmatrix} \eta^w_{1_{1,o}} \\ \vdots \\ \eta^w_{1_{N_t,o}} \end{bmatrix},$$

several remedies exist:

Method XI for Relaxing Received SINR Constraint in Method "D":

For example, the maximum value, $S$, which is obtained as $$|\gamma_{1_{S,o}}|^2 \triangleq \max\{|\gamma_{1_{1,o}}|^2, |\gamma_{1_{2,o}}|^2, \ldots, |\gamma_{1_{N_t-1,o}}|^2\},$$

is removed from Equations (64) and (65), and placed in a set, $\vec{\gamma}_S$, and its corresponding indices, $S$ is placed in another set, $S_o$. These are repeated until both Equations (64) and (65) are satisfied. The formed set of squared values in $\vec{\gamma}_S$, is then replaced by a zero value, i.e. the corresponding information elements that correspond to $\vec{\gamma}_S$ are not transmitted.

Method XII for Relaxing Received SINR Constraint in Method "D":

Another remedy for the case when Equations (64) and (65) cannot be satisfied for any ordering combination of $$\begin{bmatrix} \eta^w_{1_{1,o}} \\ \vdots \\ \eta^w_{1_{N_r,o}} \end{bmatrix},$$

is to reduce Equation (64) by a factor which would allow for an ordering combination to be found which satisfies both Equations (64) and (65). In other words, instead of accommodating only a few of the terminal nodes as in the previous strategy, this strategy attempts to accommodate all terminal nodes in a fair fashion.

Note: When choosing between the two Methods for relaxing the SINR constraint, one can rely on the variance of $$\{|\gamma_{1_{1,o}}|^2, |\gamma_{1_{2,o}}|^2, \ldots, |\gamma_{1_{N_t-1,o}}|^2\}.$$

If the variance is above a pre-specified threshold, then Method XI is selected, otherwise, Method XII is selected.

Another Embodiment of Pre-Weighting Selection in Method "D":

For the special case of UL MU-MIMO where $N_r^w=1$, for all values of $1 \leq w \leq U_r$, i.e. each receiving device (terminal node) has only one antenna, DL MU-MIMO reduces to DL MU-MISO. In this case, the set of ordered SINR equations in Equation (61b) is written as:

$$\eta^w_{1_{i,o}} = \frac{|\{h_{Ch_{i,o}}\}_1 \gamma^w_{1_{i,o}}|^2}{\frac{1}{v} + \sum_{l=2}^{N_t-i+1} |\{h_{Ch_{i,o}}\}_l \gamma^w_{1_{i,o}}|^2} \geq \kappa^w_{1_{i,o}} \quad (66)$$

Another Selection of the Ordering of $$\begin{bmatrix} \eta_1 \\ \vdots \\ \eta_{N_r} \end{bmatrix} \text{ into } \begin{bmatrix} \eta^w_{1_{1,o}} \\ \vdots \\ \eta^w_{1_{N_t,o}} \end{bmatrix}$$

in Method "D"

Based on Equation (66) and the Power constraint in Equation (65), the ordering of $$\begin{bmatrix} \eta_1 \\ \vdots \\ \eta_{N_t} \end{bmatrix} \text{ into } \begin{bmatrix} \eta^w_{1_{1,o}} \\ \vdots \\ \eta^w_{1_{N_t,o}} \end{bmatrix}$$

is based on selecting $$\vec{\gamma}_o \triangleq \begin{bmatrix} \gamma_{1_{1,o}} \\ \vdots \\ \gamma_{1_{N_t,o}} \end{bmatrix}$$

in such a way as to maximize the sum rate.

One possible way for ordering $$\begin{bmatrix} \eta^w_{1_{1,o}} \\ \vdots \\ \eta^w_{1_{N_t,o}} \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix}$$

which satisfies the constraints in Equations (65) and (66), is to exhaustively search for all possible ordering combinations of $$\vec{\gamma}_o \triangleq \begin{bmatrix} \gamma_{1_{1,o}} \\ \vdots \\ \gamma_{1_{N_t,o}} \end{bmatrix}$$

until at least one ordering combination is found which satisfies Equations (65) and (66). If one or more ordering combinations are found which satisfy Equations (65) and (66), then the next step is to optimize the sum rate using an "adjusted" waterfilling strategy, and to select the ordering combination, which offers the largest sum rate.

Another possible way for ordering $$\begin{bmatrix} \eta^w_{1_{1,o}} \\ \vdots \\ \eta^w_{1_{N_t,o}} \end{bmatrix}$$

and for selecting $$\vec{\gamma}_o \triangleq \begin{bmatrix} \gamma_{1_{1,o}} \\ \vdots \\ \gamma_{1_{N_t,o}} \end{bmatrix},$$

which satisfies the constraints in Equations (65) and (66), is to sort $$\begin{bmatrix} \frac{\kappa_1}{\|h^w_{Ch}\|^2} \\ \vdots \\ \frac{\kappa_{N_t}}{\|h^w_{Ch}\|^2} \end{bmatrix}$$

from high to low for $1 \leq w \leq U_r$. Given that there are $U_r$ receiving devices, sorting $$\begin{bmatrix} \frac{\kappa_1}{\|h_{Ch}^w\|^2} \\ \vdots \\ \frac{\kappa_{N_t}}{\|h_{Ch}^w\|^2} \end{bmatrix}$$

from high to low can result in more than one (up to $U_r$) unique ordering which satisfy Equations (65) and (66). In this case, the next step is to optimize the sum rate using an "adjusted" waterfilling strategy for each ordering, and to select the ordering combination that offers the largest sum rate.

Method XIII for Relaxing Received SINR Constraint in Method "D":

Alternatively, if Equations (65) and (66) cannot be satisfied for any ordering of $$\begin{bmatrix} \eta_{1,o}^w \\ \vdots \\ \eta_{1_{N_t},o}^w \end{bmatrix},$$

several remedies exist. For example, the maximum value, $S$, which is obtained as $$|\gamma_{1_{S,o}}|^2 \triangleq \max\{|\gamma_{1,o}|^2, |\gamma_{1_{2,o}}|^2, \ldots, |\gamma_{1_{N_t-1,o}}|^2\},$$

is removed from Equations (65) and (66), and placed in a set, $\vec{\gamma} S$, and its corresponding indices, $S$ is placed in another set, $S_o$. These are repeated until both Equations (65) and (66) are satisfied. The formed set of squared values in $\vec{\gamma} S$, is then replaced by a zero value, i.e. the corresponding information elements that correspond to $\vec{\gamma} S$ are not transmitted.

Method XIV for Relaxing Received SINR Constraint in Method "D":

Another remedy for the case when Equations (65) and (66) cannot be satisfied for any ordering of $$\begin{bmatrix} \eta_{1,o}^w \\ \vdots \\ \eta_{1_{N_t},o}^w \end{bmatrix},$$

is to reduce Equation (66) by a factor which would allow for an ordering combination to be found which satisfies both Equation (65) and (66). In other words, instead of accommodating only a few of the terminal nodes as in the previous strategy, this strategy attempts to accommodate all terminal nodes in a fair fashion.

Note: When choosing between the two Methods for relaxing the SINR constraint, one can rely on the variance of $$\{|\gamma_{1,o}|^2, |\gamma_{1_{2,o}}|^2, \ldots, |\gamma_{1_{N_t-1,o}}|^2\}.$$

If the variance is above a pre-specified threshold, then Method XIII is selected, otherwise, Method XIV is selected.

The foregoing systems and methods and associated devices and modules are susceptible to many variations. Additionally, for clarity and concision, many descriptions of the systems and methods have been simplified. For example, the figures generally illustrate one or few of each type of device, but a communication system may have many of each type of device. Additionally, features of the various embodiments may be combined in combinations that differ from those described above.

As described in this specification, various systems and methods are described as working to optimize particular parameters, functions, or operations. This use of the term optimize does not necessarily mean optimize in an abstract theoretical or global sense. Rather, the systems and methods may work to improve performance using algorithms that are expected to improve performance in at least many common cases. For example, the systems and methods may work to optimize performance judged by particular functions or criteria. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of any method or algorithm and the processes of any block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein.

What is claimed is:

1. A method for receiving uplink communications in network node of a communication system, the method comprising:
    determining an ordering combination and determining pre-weighting values associated with the ordering combination for use by at least one terminal node at least by:
        generating a set of possible ordering combinations;
        determining, for each possible ordering combinations, pre-weighting values that satisfy one of the transmit power constraint and the minimum performance constraint;
        identifying each one of the set of possible ordering combinations that have determined pre-weighting values that satisfy the other one of the transmit power constraint and the minimum performance constraint;
        for each of the identified possible ordering combinations, adjusting the corresponding pre-weighting values based on a sum-rate maximization function; and
        selecting one of the identified possible ordering combinations based on a predicted sum-rate associated with each of the identified possible ordering combinations;
    providing the pre-weighting values to the at least one terminal node;
    receiving a signal for each of at least one antenna, each received signal comprising a plurality of transmitted signals from the at least one terminal node based at least in part on the pre-weighting values; and
    processing the received signal for each of the at least one antenna using the determined ordering combination and the determined pre-weighting values.

2. The method of claim 1, wherein determining the ordering combination and the pre-weighting values further includes utilizing a sum-rate maximization function.

3. The method of claim 1, wherein determining the ordering combination and the pre-weighting values comprises evaluating at least one of a plurality of possible ordering combinations.

4. The method of claim 1, wherein, in the identifying step, none of the set of possible ordering combinations have determined pre-weighting values that satisfy the other one of the transmit power constraint and the minimum performance constraint.

5. The method of claim 4, wherein determining the ordering combination and the pre-weighting values further comprises:
    adjusting the minimum performance constraint; and
    repeating the determining step and the identifying step.

6. The method of claim 4, wherein determining the ordering combination and the pre-weighting values further comprises:
    setting, for each one of the set of possible ordering combinations, at least one pre-weighting value associated with the possible ordering combination to zero; and
    repeating the determining step and the identifying step.

7. The method of claim 1, wherein determining the ordering combination and the pre-weighting values comprises:
    generating a set of possible ordering combinations, and
    for each one of the set of possible ordering combinations:
        determining pre-weighting values that satisfy one of the transmit power constraint and the minimum performance constraint, and
        evaluating whether the determined pre-weighting values associated with the respective possible ordering combination satisfy the other one of the transmit power constraint and the minimum performance constraint.

8. The method of claim 7, further comprising, for each one of the set of possible ordering combinations:
    in the case that the determined pre-weighting values associated with the respective possible ordering combination do not satisfy the other one of the transmit power constraint and the minimum performance constraint,
    calculating a pre-weighting metric based on the determined pre-weighting values, and
    in the case that the pre-weighting metric is at or above a threshold, setting at least one of the pre-weighting values associated with the possible ordering combination to zero and repeating the evaluating step, and
    in the case that the pre-weighting metric is below a threshold, adjusting all of the pre-weighting values associated with the possible ordering combination and repeating the evaluating step.

9. The method of claim 1, wherein processing the received signal for each of the at least one antenna using the determined ordering combination comprises performing successive interference cancelation on the received signal for each of the at least one antenna in accordance with the determined ordering combination.

10. The method of claim 1, wherein the at least one antenna is provided in the network node.

11. An access node, comprising:
    a transceiver module configured to communicate with at least one terminal node including receiving a signal via each of at least one antenna, each received signal comprising a plurality of signals transmitted from the at least one terminal node based at least in part on pre-weighting values; and
    a processor module coupled to the transceiver module and configured to
        determine an ordering combination for use in processing at least one of the received signals and determine pre-weighting values associated with the ordering combination for use by the at least one terminal node at least by:

generating a set of possible ordering combinations;

determining, for each possible ordering combinations, pre-weighting values that satisfy one of a transmit power constraint and a minimum performance constraint;

identifying each one of the set of possible ordering combinations that have determined pre-weighting values that satisfy the other one of the transmit power constraint and the minimum performance constraint;

for each of the identified possible ordering combinations, adjusting the corresponding pre-weighting values based on a sum-rate maximization function; and selecting one of the identified possible ordering combinations based on predicted sum-rate associated with each of the identified possible ordering combinations;

provide the pre-weighting values to the transceiver module for communication to the at least one terminal node; and process the at least one of the received signals using the determined ordering combination and the determined pre-weighting values.

12. The access node of claim 11, wherein determination of the ordering combination and the pre-weighting values by the processor module comprises utilizing a sum-rate maximization function.

13. The access node of claim 11, wherein determination of the ordering combination and the pre-weighting values by the processor module comprises evaluating at least one of a plurality of possible ordering combinations.

14. The access node of claim 11, wherein, in the identifying step, none of the set of possible ordering combinations have determined pre-weighting values that satisfy the other one of the transmit power constraint and the minimum performance constraint.

15. The access node of claim 14, wherein determination of the ordering combination and the pre-weighting values by the processor module further comprises:

adjusting the minimum performance constraint; and
repeating the determining step and the identifying step.

16. The access node of claim 14, wherein determination of the ordering combination and the pre-weighting values by the processor module further comprises:

setting, for each one of the set of possible ordering combinations, at least one pre-weighting value associated with the possible ordering combination to zero; and
repeating the determining step and the identifying step.

17. The access node of claim 11, wherein determination of the ordering combination and the pre-weighting values by the processor module comprises:

generating a set of possible ordering combinations, and for each one of the set of possible ordering combinations:

determining pre-weighting values that satisfy one of the transmit power constraint and the minimum performance constraint, and evaluating whether the determined pre-weighting values associated with the respective possible ordering combination satisfy the other one of the transmit power constraint and the minimum performance constraint.

18. The access node of claim 17, wherein the processor module is further configure to, for each one of the set of possible ordering combinations, in the case that the determined pre-weighting values associated with the respective possible ordering combination do not satisfy the other one of the transmit power constraint and the minimum performance constraint, calculate a pre-weighting metric based on the determined pre-weighting values, and in the case that the pre-weighting metric is at or above a threshold, set at least one of the pre-weighting values associated with the possible ordering combination to zero and repeat the evaluating step, and in the case that the pre-weighting metric is below a threshold, adjust all of the pre-weighting values associated with the possible ordering combination and repeat the evaluating step.

19. The access node of claim 11, wherein processing of the at least one of the received signals using the determined ordering combination by the processor module comprises performing successive interference cancelation on the at least one received signal in accordance with the determined ordering combination.

20. The access node of claim 11, further comprising the at least one antenna.

21. The method of claim 1, wherein determining the ordering combination and the pre-weighting values further includes utilizing a sum-rate maximization function.

22. The access node of claim 11, wherein the minimum performance constraint is based on at least a received signal-to-interference-plus-noise ratio.

* * * * *